US009530456B2

(12) United States Patent
Arai et al.

(10) Patent No.: US 9,530,456 B2
(45) Date of Patent: Dec. 27, 2016

(54) DATA PROCESSING SYSTEM HAVING DATA REPRODUCTION INDEPENDENT OF DATA PROCESSING

(71) Applicant: SONY CORPORATION, Tokyo (JP)

(72) Inventors: Toshiyuki Arai, Tokyo (JP); Takashi Kumagai, Tokyo (JP); Hajime Inai, Kanagawa (JP); Hiroaki Sato, Kanagawa (JP); Fumitake Yodo, Tokyo (JP); Masami Oyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/693,697

(22) Filed: Dec. 4, 2012

(65) Prior Publication Data

US 2013/0094334 A1     Apr. 18, 2013

Related U.S. Application Data

(63) Continuation of application No. 13/358,297, filed on Jan. 25, 2012, now Pat. No. 8,345,365, which is a
(Continued)

(30) Foreign Application Priority Data

Oct. 29, 1999 (JP) .................................... 11-309482
Sep. 7, 2000 (JP) ................................. 2000-272063

(51) Int. Cl.
*G11B 5/00* (2006.01)
*G11B 31/00* (2006.01)
(Continued)

(52) U.S. Cl.
CPC ......... *G11B 31/00* (2013.01); *G11B 20/00007* (2013.01); *G11B 20/10527* (2013.01);
(Continued)

(58) Field of Classification Search
None
See application file for complete search history.

(56) References Cited

U.S. PATENT DOCUMENTS 4,413,289 A     11/1983   Weaver et al.
4,811,325 A      3/1989   Sharples et al.
(Continued)

FOREIGN PATENT DOCUMENTS

EP          0283727      9/1988
EP          0762756      3/1997
(Continued)

OTHER PUBLICATIONS

Masayuki Kawamura, "all of MDs", Japan, published by Denpa Shinbunsha Co., Ltd., Aug. 31, 1998, pp. 102-103, 113-115 and 132-133.
(Continued)

*Primary Examiner* — Dismery Mercedes
(74) *Attorney, Agent, or Firm* — Oblon, McClelland, Maier & Neustadt, L.L.P.

(57) ABSTRACT

A processing unit performs a method including controlling a reading-out of data from a first storage medium at a predetermined read-out data rate to produce inputted data, and controlling a compression of the inputted data to produce first compressed data of a first compressed format. The method includes controlling a storage of the first compressed data in a second storage medium at a faster writing data rate than the predetermined read-out data rate, controlling a reading-out of second compressed data of a second compressed format from the second storage medium, and controlling a decompression of the second compressed data to produce decompressed data. The method also includes controlling simultaneously the storage of the first compressed data in the second storage medium, the reading-out of the second compressed data from the second storage medium,
(Continued)

and audibly reproducing the decompressed data. The first compressed format is different from the second compressed format.

12 Claims, 41 Drawing Sheets

Related U.S. Application Data continuation of application No. 11/434,723, filed on May 17, 2006, now Pat. No. 8,159,766, which is a continuation of application No. 09/697,917, filed on Oct. 27, 2000, now Pat. No. 7,126,770.

(51) Int. Cl.

| | | |
|---|---|---|
| G11B 20/00 | (2006.01) | |
| G11B 20/10 | (2006.01) | |
| G11B 27/00 | (2006.01) | |
| G11B 27/034 | (2006.01) | |
| G11B 27/10 | (2006.01) | |
| G11B 27/11 | (2006.01) | |
| G11B 27/32 | (2006.01) | |
| G11B 27/34 | (2006.01) | |
| H04R 5/02 | (2006.01) | |

(52) U.S. Cl.
CPC .......... *G11B 27/005* (2013.01); *G11B 27/034* (2013.01); *G11B 27/105* (2013.01); *G11B 27/11* (2013.01); *G11B 27/329* (2013.01); *G11B 27/34* (2013.01); *H04R 5/02* (2013.01); *G11B 2220/213* (2013.01); *G11B 2220/2525* (2013.01); *G11B 2220/2545* (2013.01); *G11B 2220/2562* (2013.01)

(56) References Cited

U.S. PATENT DOCUMENTS

| | | |
|---|---|---|
| 5,224,087 A | 6/1993 | Maeda et al. |
| 5,253,275 A * | 10/1993 | Yurt et al. ..................... 375/240 |
| 5,331,617 A * | 7/1994 | Fuma ..................... G11B 7/004 369/47.12 |
| 5,343,452 A * | 8/1994 | Maeda ............. G11B 11/10597 369/124.06 |
| 5,357,614 A * | 10/1994 | Pattisam et al. ................ 710/68 |
| 5,367,523 A * | 11/1994 | Chang et al. .................. 370/235 |
| 5,390,158 A * | 2/1995 | Furuhashi .................. 369/47.47 |
| 5,410,526 A | 4/1995 | Maeda et al. |
| 5,412,628 A | 5/1995 | Yamazaki et al. |
| 5,485,447 A | 1/1996 | Minoda |
| 5,491,498 A * | 2/1996 | Koyama et al. .............. 345/519 |
| 5,532,991 A | 7/1996 | Sasaki |
| 5,555,229 A * | 9/1996 | Kojima ............ G11B 20/00007 369/124.06 |
| 5,557,541 A * | 9/1996 | Schulhof ......... G11B 20/00007 360/15 |
| 5,581,530 A * | 12/1996 | Iizuka et al. .................... 369/93 |
| 5,586,093 A | 12/1996 | Honda et al. |
| 5,589,993 A * | 12/1996 | Naimpally .................... 386/314 |
| 5,590,108 A | 12/1996 | Mitsuno et al. |
| 5,592,511 A * | 1/1997 | Schoen et al. ................ 375/220 |
| 5,682,360 A * | 10/1997 | Oshima .................. G11B 5/012 360/59 |
| 5,687,150 A | 11/1997 | Nonaka et al. |
| 5,699,336 A * | 12/1997 | Maeda ............. G11B 11/10595 369/30.23 |
| 5,737,290 A | 4/1998 | Ohmori |
| 5,739,979 A | 4/1998 | Busch |
| 5,740,140 A * | 4/1998 | Arataki et al. ............... 369/53.45 |
| 5,740,143 A * | 4/1998 | Suetomi .................... 369/47.33 |
| 5,768,236 A | 6/1998 | Kihara |
| 5,805,086 A | 9/1998 | Brown et al. |
| 5,822,288 A | 10/1998 | Shinada |
| 5,828,638 A | 10/1998 | Inagawa et al. |
| 5,841,979 A * | 11/1998 | Schulhof et al. .............. 709/237 |
| 5,859,815 A * | 1/1999 | Inoue ................. G11B 11/10595 369/30.09 |
| 5,864,853 A * | 1/1999 | Kimura et al. |
| 5,889,747 A | 3/1999 | Hisamatsu et al. |
| 5,901,119 A | 5/1999 | Inoue |
| 5,930,446 A | 7/1999 | Kanda |
| 5,995,306 A | 11/1999 | Contreras et al. |
| 6,044,225 A * | 3/2000 | Spencer et al. .................. 710/52 |
| 6,065,094 A * | 5/2000 | Akiyama ......... G11B 20/10527 710/52 |
| 6,069,993 A * | 5/2000 | Kawara ................. H04N 5/783 386/353 |
| 6,097,557 A * | 8/2000 | Inoue ................. G10H 1/0058 360/13 |
| 6,111,844 A * | 8/2000 | Lacy et al. ............... 369/124.06 |
| 6,205,104 B1 | 3/2001 | Nagashima et al. |
| 6,292,440 B1 * | 9/2001 | Lee ........................ G11B 19/04 369/7 |
| 6,351,442 B1 * | 2/2002 | Tagawa ................ G06Q 20/123 369/275.3 |
| 6,366,953 B2 | 4/2002 | Inoue |
| 6,449,226 B1 * | 9/2002 | Kumagai .......... G06F 17/30017 369/47.1 |
| 6,493,299 B2 * | 12/2002 | Sato ........................ G11B 7/28 369/47.12 |
| 6,603,718 B1 * | 8/2003 | Ozawa ............ G11B 20/00086 369/47.1 |
| 6,675,233 B1 * | 1/2004 | Du ........................ G06F 1/3203 710/14 |
| 6,678,227 B1 * | 1/2004 | Kondo ............ G11B 20/10527 369/47.33 |
| 6,694,030 B1 * | 2/2004 | Van Steenbrugge ........ 381/94.5 |
| 6,892,024 B1 * | 5/2005 | Shimizu et al. ............... 386/328 |
| 7,167,425 B2 | 1/2007 | Kudo et al. |
| 7,532,419 B2 | 5/2009 | Arai et al. |

FOREIGN PATENT DOCUMENTS

| | | |
|---|---|---|
| EP | 0851423 | 7/1998 |
| GB | 2343986 | 5/2000 |
| JP | 5-234252 | 9/1993 |
| JP | 5-334800 | 12/1993 |
| JP | 7-85638 | 3/1995 |
| JP | 8-102141 | 4/1996 |
| JP | 8-153376 | 6/1996 |
| JP | 8-287611 | 11/1996 |
| JP | 9-163309 | 6/1997 |
| JP | 9-320194 | 12/1997 |
| JP | 9-320195 | 12/1997 |
| JP | 10-261265 | 9/1998 |
| JP | 11-66736 | 3/1999 |
| JP | 11-66823 | 3/1999 |
| JP | 11-66824 | 3/1999 |
| JP | 11-86421 | 3/1999 |
| JP | 11086421 A * | 3/1999 |
| JP | A-11-86421 | 3/1999 |
| JP | 11-232847 | 8/1999 |
| JP | 11-260045 | 9/1999 |
| WO | WO 94/20960 | 9/1994 |
| WO | WO96/33579 | 10/1996 |
| WO | 9916075 | 4/1999 |
| WO | WO99/33265 | 7/1999 |
| WO | WO00/07368 | 2/2000 |

OTHER PUBLICATIONS

Office Action issued Mar. 6, 2012, in Japanese Patent Application No. 2000-272063.

\* cited by examiner

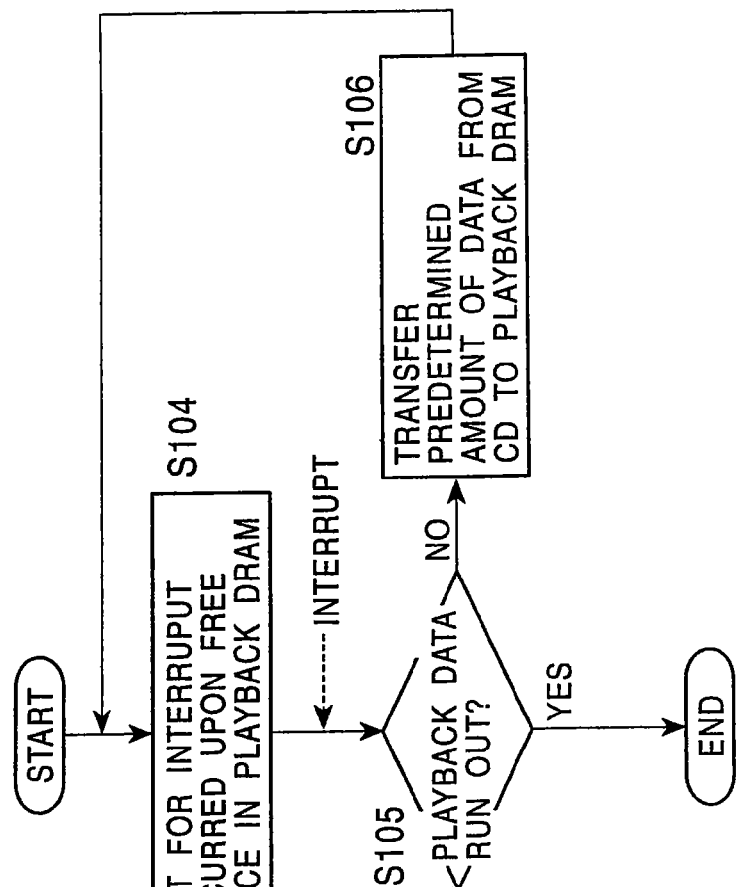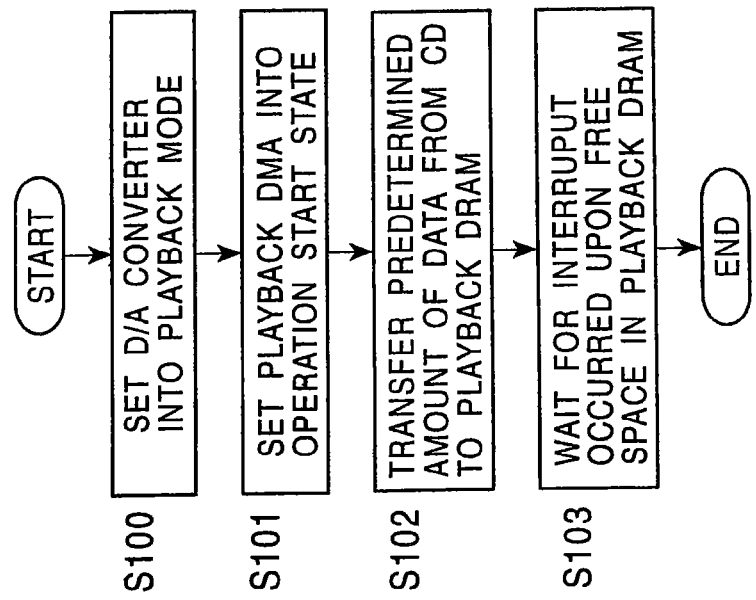
FIG. 13A
FIG. 13B

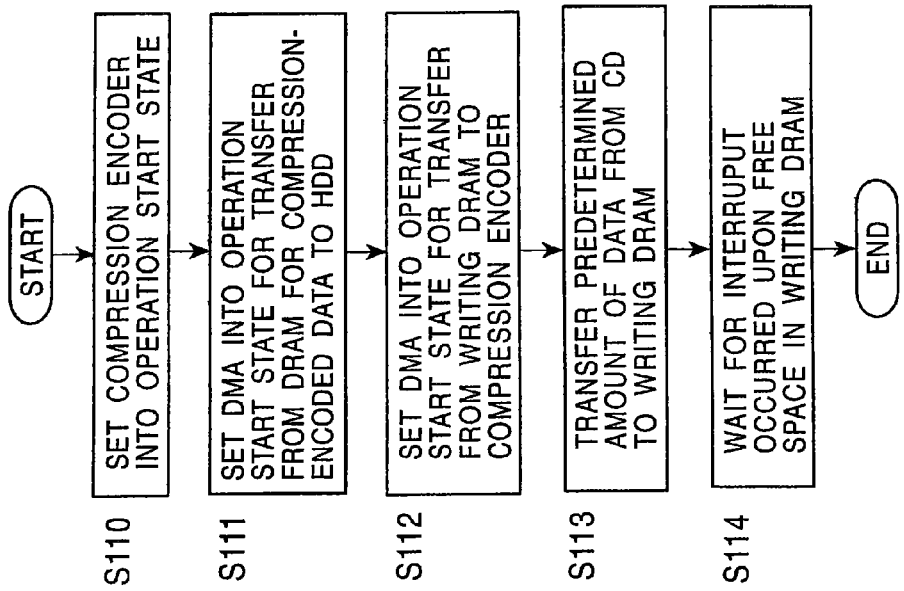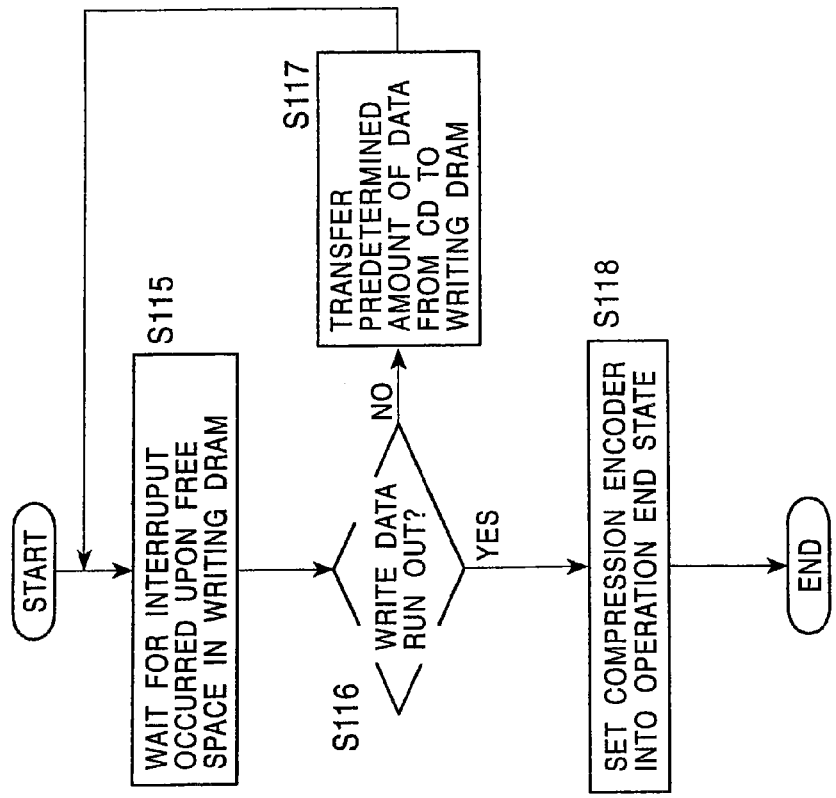

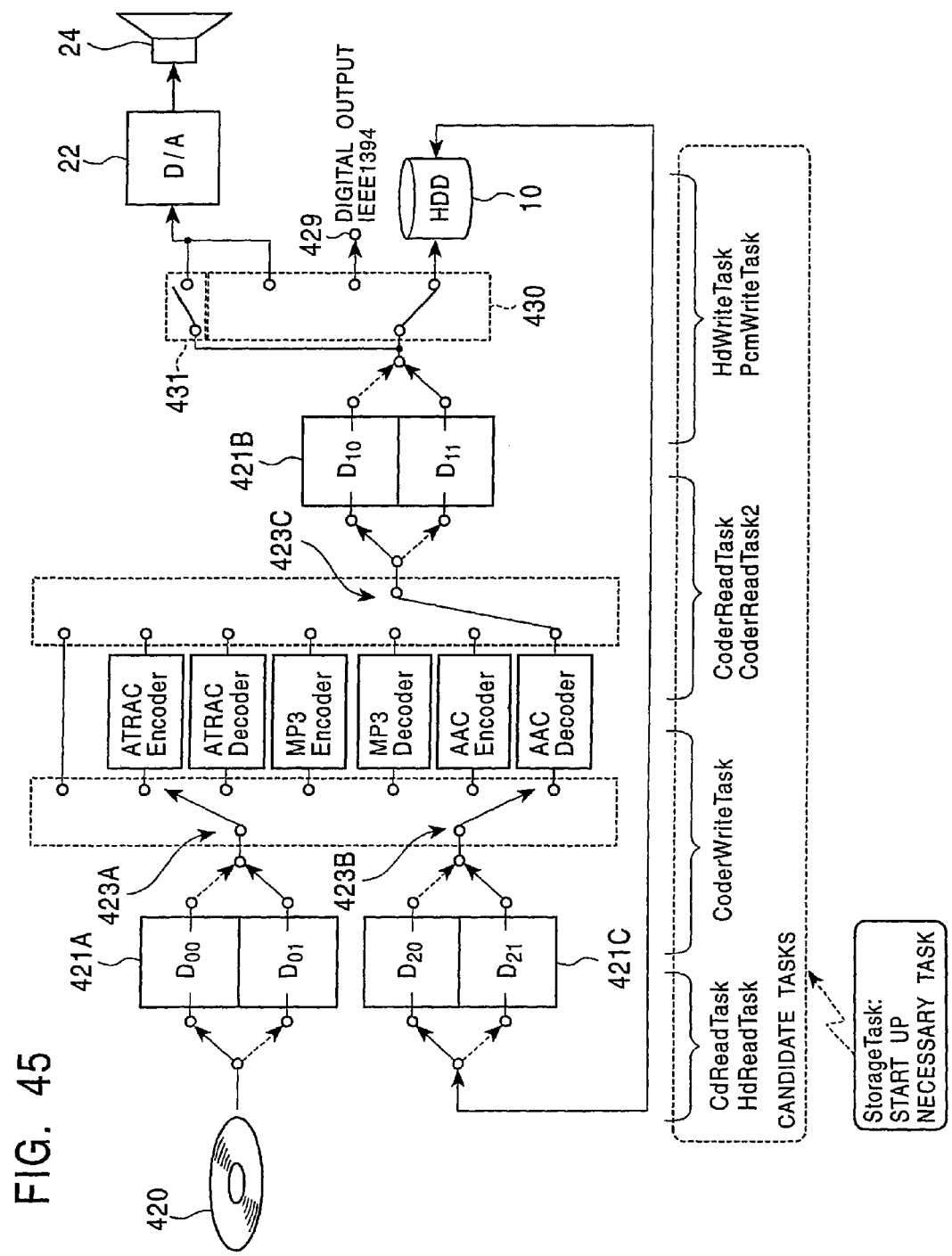

DATA PROCESSING SYSTEM HAVING DATA REPRODUCTION INDEPENDENT OF DATA PROCESSING

CROSS-REFERENCE TO RELATED APPLICATIONS

This application is a continuation of and claims the benefit of priority under 35 U.S.C. §120 from U.S. Ser. No. 13/358,297, filed Jan. 25, 2012, which is a continuation of U.S. Ser. No. 11/434,723, filed May 17, 2006, now U.S. Pat. No. 8,159,766, issued Apr. 17, 2012, which is a continuation of U.S. Ser. No. 09/697,917, filed on Oct. 27, 2000, now U.S. Pat. No. 7,126,770, issued Oct. 24, 2006, and in turn claims priority to JP11-309482, filed Oct. 29, 1999, and JP2000-272063, filed Sep. 7, 2000. The entire contents of all of those documents are hereby incorporated by reference.

BACKGROUND OF THE INVENTION

1. Field of the Invention

The present invention relates to a data writing and reproducing apparatus and method for transferring and storing audio data, which is written in a removable recording medium such as a music CD (Compact Disc), in a built-in storage medium at a higher data rate than the rate prescribed for playback of the music CD.

2. Description of the Related Art

A so-called CD changer containing many CDs and automatically reproducing audio data recorded on the CDs is well known. In such a CD changer, several tens to several hundreds of CDs are contained in one housing, and one of the CDs is selected with a predetermined operation for automatic playback. Audio data recorded on the CDs can be reproduced orderly for each of the CDs or at random, in units of one CD or one piece of music recorded on each CD, by selecting a plurality of CDs. That type of CD changer is mostly employed in stationary fashion, that is, by being installed in a room.

The above-described CD changer, however, had a difficulty in realizing continuous playback because a CD exchange time was required even in the automatic playback mode. Also, a CD changer containing 100, 200 or more CDs was very inconvenient to carry and install in place because of the increased size and weight of the housing.

To overcome those problems, instead of the CD changer, there has been proposed an audio server employing a storage medium, such as a hard disk drive, which is relatively small in size, but has a large storage capacity. In the audio server, audio data recorded on each CD is read, and the read-out audio data is coded and compressed by a predetermined method. The compressed data is written and stored in the hard disk drive. By using a hard disk drive having a storage capacity on the order of 6 GByte, data of about 1000 pieces of music can be written. The audio server is superior to the above-described CD changer in that continuous playback can be easily realized because of not requiring exchanging CDs unlike the CD changer, and in that the housing size can be reduced even though a larger amount of music data can be written in one unit of the hard disk drive.

Further, in the audio server, when audio data recorded on a CD is written and stored in a hard disk drive, the audio data can be handled in the same manner as ordinary digital data. Accordingly, data can be written and stored in a shorter time than the playback time prescribed for a musical composition or the like, which has been recorded on a CD, by rotating the CD at a higher speed than the standard rotational speed prescribed for the CD and thereby reading the data out of the CD at a higher rate.

In the conventional audio server described above, however, during the time in which audio data recorded on a CD is written and stored in a hard disk drive, the audio server is exclusively employed for the process of writing and storing the data. This has given rise to a problem that the user has nothing to do other than just waiting until the writing process has ended.

For example, even when a 20×CD-ROM drive capable of rotating at an average rotational speed about 20 times as fast as the prescribed speed is employed for playback of a CD, about three minutes is required for a CD having a record time of 60 minutes until the writing process has ended. Such a waiting time makes the user feel irritated and impatient. To avoid the above drawback, it has been proposed to provide a user interface such as a certain display on an audio server. Even with the proposal, however, the user is obliged to wait until the end of the writing process while viewing a message, for example, "Under Copying", indicated on a screen of the display to inform the user of such a state that the process of writing and storing the data is being executed, while hearing a beep or other like tones.

On the other hand, there has also been proposed a portable audio data player using a hard disk drive or a semiconductor memory as a storage or recording medium. The portable audio data player is connected to the above-described audio server, and audio data stored in the audio server is transferred to the portable audio data player and stored in the storage or recording medium. Assuming that the storage or recording medium has a capacity on the order of 200 MB, for example, audio data can be stored with a playback time of several tens of minutes.

When audio data is transferred from the audio server to the portable audio data player in such a way, a similar problem as described above has also been experienced, that is to say, the user has to just wait until the end of the data transfer.

SUMMARY OF THE INVENTION

An object of the present invention is therefore to provide an apparatus and method for writing and reproducing data, wherein, when audio data recorded on a CD is played back to be recorded and stored in a built-in hard disk drive at a higher data rate than that prescribed for the CD, the audio data recorded on the CD can be written in the hard disk drive at a high data rate while the CD is being played back at the prescribed reference data rate.

To achieve the above object, according to a first aspect of the present invention, there is provided an apparatus for writing and reproducing data comprising a processing unit for processing inputted data; a storage unit for storing the processed data in a storage medium; a decompression unit for decompressing processed data stored in the storage medium; a reproducing unit for reproducing the decompressed data; and a control unit for controlling the storage unit to store the processed data in the storage medium during reproduction of the decompressed data by the reproducing unit.

Also, according to a second aspect of the present invention, there is provided an apparatus for writing and reproducing data comprising a converting unit for converting inputted compression data of a first compression format into data of a second compression format; an outputting unit for outputting the converted data; a reproducing unit for reproducing data corresponding to the converted data; and a control unit for controlling the outputting unit to output the converted data during reproduction of the data by the reproducing unit.

According to a third aspect of the present invention, there is provided an apparatus for writing and reproducing data comprising a processing unit for processing inputted data as the need arises; an outputting unit for outputting data supplied from the processing unit; a reproducing unit for reproducing the supplied data, and a control unit for controlling the outputting unit to output the supplied data during reproduction of the supplied data by the reproducing unit.

According to a fourth aspect of the present invention, there is provided a method for writing and reproducing data comprising the steps of processing inputted data; storing the processed data in a storage medium; decompressing processed data stored in the storage medium; reproducing the decompressed data; and controlling storage of the processed data in the storage medium during reproduction of the decompressed data.

According to a fifth aspect of the present invention, there is provided a method for writing and reproducing data comprising the steps of converting inputted compression data of a first compression format into data of a second compression format; outputting the converted data; reproducing data corresponding to the converted data; and controlling the output of the converted data during reproduction of the converted data.

According to a sixth aspect of the present invention, there is provided a method for writing and reproducing data comprising the steps of processing inputted data as the need arises; outputting data supplied from the processing unit; reproducing the supplied data; controlling the output of the supplied data during reproducing the supplied data.

With the first and fourth aspects of the present invention as described above, inputted data is processed and stored in the storage medium. The control unit performs control such that the processed data is stored in the storage medium while the processed data stored in the storage medium is decompressed and reproduced. Therefore, the inputted data can be reproduced and, at the same time, stored in the storage medium.

With the second and fifth aspects of the present invention, inputted compression data is outputted after conversion of a compression format, and data corresponding to the converted data is reproduced. The control unit performs control such that the converted data is outputted while data corresponding to the converted data is reproduced. Therefore, the inputted compression data can be outputted while the format conversion thereof is carried out.

With the third and sixth aspects of the present invention, inputted data is processed and outputted as the need arises, and the processed data is reproduced. The control unit performs control such that the processed data is outputted while the processed data is reproduced.

BRIEF DESCRIPTION OF THE DRAWINGS

FIGS. 13A and 13B are flowcharts showing the reproducing process executed when the audio data is written in the HDD while being reproduced from the CD;

FIGS. 14A and 14B are flowcharts showing the writing process executed when the audio data is written in the HDD while being reproduced from the CD;

FIG. 45 is a functional block diagram representing the case where the tasks are allocated to respective components of the music server according to the fifth modification of the embodiment.

DESCRIPTION OF THE PREFERRED EMBODIMENTS

Figure 1:
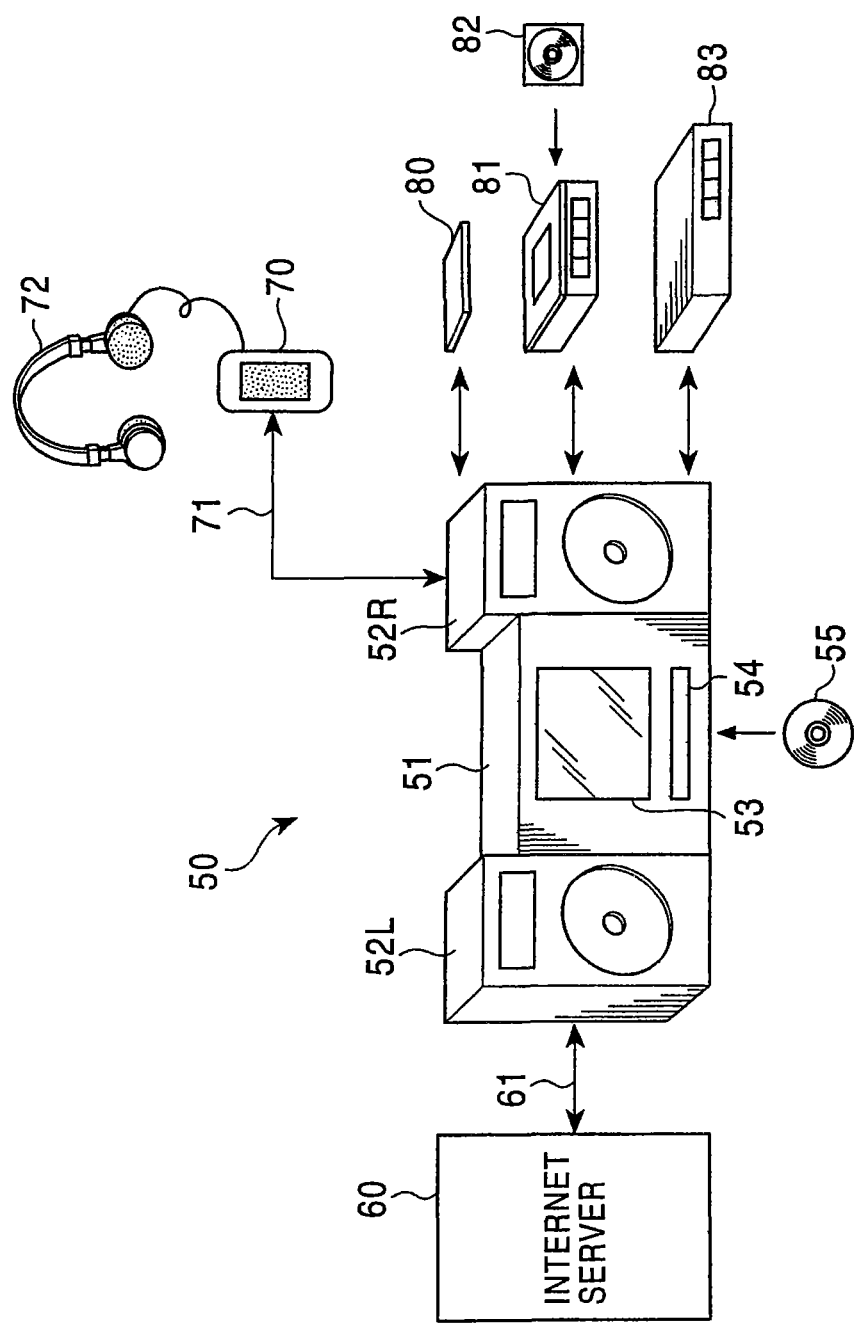
FIG. 1 is a diagram schematically showing a music server according to one embodiment of the present invention and a system employing the music server.

One embodiment of the present invention will be described below with reference to the drawings. FIG. 1 schematically shows a music server to which the present invention is applied, and a system employing the music server. A music server 50 comprises a main server unit 51 and a pair of left and right speaker units 52L, 52R. The main server unit 51 includes a display unit 53 comprising an LCD (Liquid Crystal Display) panel, and a CD loader 54 through which a CD is inserted into the main server unit 51.

Though not shown in FIG. 1, the main server unit 51 also includes a console comprising a plurality of control switches with which the user can control the function of the main server unit 51. A signal receiving portion for receiving an infrared signal, for example, may be provided on the main server unit 51 to remotely control the function of the main server unit 51 by a remote commander. Further, the main server unit 51 includes a controller as described below, and various operations of the main server unit 51 are controlled by the controller in accordance with predetermined programs stored in, for example, a ROM beforehand.

When the user loads a CD 55 in the main server unit 51 through the CD loader 54 and performs a predetermined operation on the console (not shown), playback of the CD 55 is started. A playback signal reproduced from the CD 55 is outputted through speaker units 52L, 52R so that the user may enjoy music recorded on the CD 55. When the CD 55 includes text data, such as the titles of musical compositions, the titles and so on are displayed on the display unit 53 in accordance with the text data.

The music server 50 includes a large-capacity storage system in the form of a hard disk drive, for example. The storage medium in the form of a hard disk can write therein playback data reproduced from the CD 55 which has been loaded in the main server unit 51 through the CD loader 54, when the user performs a predetermined operation on the console (not shown). On that occasion, it is possible to select one of an ordinary writing method of writing the data at the same transfer rate as the standard playback rate of the CD 55 and a high-rate writing method of writing the data at a transfer rate higher than the standard playback rate of the CD 55. In the writing at a high transfer rate, after completion of a billing process according to a predetermined procedure, the user is allowed to select a CD or select a piece of music recorded on a CD and to write played-back data, that is, audio data reproduced from the CD, at a transfer rate higher than the standard playback rate of the CD.

In the music server 50, the audio data reproduced from the CD 55 is coded and compressed by a predetermined method such as ATRAC and then written as compressed audio data. In this way, about 1000 pieces of music can be written or stored in a hard disk having a typical capacity of 6 GByte. A list of the titles of musical compositions written or stored in the hard disk is displayed on the display unit 53. In accordance with the music titles displayed on the display unit 53, the user can select and play back any desired one of the musical compositions written or stored in the hard disk. Because a hard disk is adapted for random access, the music server 50 can read a large amount of audio data written or stored in the hard disk in any desired sequence and reproduce the audio data in a continuous manner.

While various methods are available for compression-coding, this embodiment employs a method called ATRAC2 (Adaptive Transform Acoustic Coding 2) and disclosed in U.S. Pat. No. 5,717,821. This is a compression-coding method used in the portable audio data player described above and is an advanced version of ATRAC. More specifically, according to ATRAC2, compression-coding of audio data is performed in a combination of transform coding and entropy coding by utilizing the masking effect and the frequency dependency of a minimum audible limit based on the auditory properties. Audio data can be encoded and decoded at a high bit rate with a relatively small scale of hardware while maintaining high sound quality. Other methods, such as ATRAC3, MPEG2 AAC (Advance Audio Codec), MP3 (MPEG1 Audio Layer 3), TwinVQ (Transform-Domain Weighted Interleave Vector Quantization), or MS Audio (WMA: Windows Media Audio) may be used instead. Note that the compression-coding method is not limited to ATRAC2, and ATRAC3, which is a further advanced version of ATRAC2, is also usable.

The music server 50 can be connected to an external system, such as an Internet server 60 via a communication line 61, such as a public telephone line. By connecting the music server 50 to the Internet server 60 via the communication line 61, the user can obtain various information from the Internet. The Internet server 60 includes a database, such as title information of commercially available music CDs. A specific key is allocated for the user to utilize the database. By operating the specific key at the time of utilizing the database, the user can obtain data attendant on individual Cds, such as title information of the CDs.

The Internet server 60 also executes the billing process for the music server 50 depending on the service supplied to the user. When the user performs the above-described high-rate writing for the CD 55, data indicating that the music server 50 is going to carry out the high-rate writing is communicated to the Internet server 60. The billing process is thereby executed for the user who is going to perform the high-rate recording. Then, the user is allowed to select a CD or a piece of music and to perform the high-rate recording.

The billing process has been described above as being executed by the Internet server 60 that includes various additional information attendant on CDs, but the present invention is not limited to such an example. As an alternative, the billing process may be executed by another server connected to the Internet. As a further alternative, the billing process may be executed via a dedicated network separate from the Internet.

A portable recording and playback unit 70 includes a storage medium comprising a hard disk or a flash memory, such as a semiconductor memory, a magnetic memory or an optical memory. Any other suitable storage or recording medium is also usable so long as it can follow the playback data rate of music. By connecting the portable recording and playback unit 70 to the music server 50 through a connecting line 71, the audio data recorded in the music server 50 can be transferred to the portable recording and playback unit 70 for writing of the audio data in the storage medium of the unit 70. At this time, on the side of the music server 50, the audio data that has been transferred to the portable recording and playback unit 70 is brought into such a state that the transferred audio data still remains in the storage medium, such as a hard disk or a flash memory, but cannot be reproduced. The storage or recording medium used in the portable recording and playback unit 70 has a capacity on the order of 200 MByte and can store or record audio data for several tens of music pieces. Note that, in the following description, a storage device or medium comprising a semiconductor memory, such as a flash memory, and a recording medium in the form of a disk, such as a hard disk will be referred to together as a storage medium.

The above-mentioned transfer method used in the present invention, that is, transfer of the type that when audio data is transferred, the audio data is stored in a storage medium at the transfer destination while the transferred audio data still remains on a storage medium at the transfer source but cannot be reproduced, is referred to as "movement". By utilizing this "movement", unlimited copying of the audio data can be prohibited.

Although the music server 50 and the portable recording and playback unit 70 are connected to each other through the connecting line 71 in the above-described example, the present invention is not limited to such an arrangement. For example, mutually fitting portions may be provided on the music server 50 and the portable recording and playback unit 70. Thus, the portable recording and playback unit 70 may be jointly fitted to the music server 50 so that data is directly transferred between the server 50 and the unit 70. Instead of electrical connection, audio data may be transferred between the music server 50 and the portable recording and playback unit 70 with an infrared signal, for example, by providing, in both the server 50 and the unit 70, interfaces for transferring data with an infrared signal in conformity with the IrDA (Infrared Data Association) standards.

Further, the music server 50 can transfer information between itself and various media by providing predetermined interfaces in the music server 50. For example, by providing an interface adapted for a PC card 80 in the music server 50, audio data supplied via the PC card 80 can be taken into the music server 50, and data can be transferred between a personal computer and the music server 50. Also, by providing a serial digital interface using an optical cable in the music server 50, audio data can be transferred between the music server 50 and another digital audio data recording and playback unit, such as a disk recorder 81, using a small-sized magneto-optical disk with a diameter of 64 mm. In this example, a disk cartridge 82 containing a small-sized magneto-optical disk therein is loaded in the disk recorder 81, and audio data reproduced from the magneto-optical disk in the disk cartridge 82 is supplied to the music server 50. Likewise, by providing an IEEE 1394 interface or the like in the music server 50, a set-top box 83 for CATV (Cable Television) and satellite broadcasting can be connected to the server 50. IEEE 1394 is the interface standard stipulated by the Institute of Electrical and Electronics Engineers.

A PC card 80, which is a card type peripheral device for personal computers in conformity with the standards jointly stipulated by the PCMCIA (Personal Computer Memory Card International Association) in USA and JEIDA (Japan Electronic Industry Development Association) in Japan can also be inserted in the main server unit 51.

The music server 50 may include, as an incorporated application, a WWW (World Wide Web) browser. By connecting the music server 50 to the Internet server 60 via the communication line 61, the music server 50 can search various contents described in HTML (Hypertext Markup Language) and residing on the Internet, and can display the desired information on the display unit 53.

With the construction described above, the user can not only reproduce the audio data stored or written in the music server 50 for listening to the audio data through the speaker units 52L, 52R, but the user can also load the CD 55 in the server 50 through the CD loader 54 for playback of the CD 55.

Through communication between the music server 50 and the Internet server 60, the music server 50 can automatically obtain the title information of the CD 55, which is loaded in the music server 50 through the CD loader 54, from the Internet server 60 via the communication line 61. The information obtained from the Internet server 60 is stored in the music server 50, and the stored title information are displayed on the display unit 53 of the music server 50 as needed.

More specifically, the information specific to the user, hereinafter referred to as user information, such as the user ID data of the music server 50, is sent from the music server 50 to the Internet server 60. On the side of the Internet server 60, the checking process and the billing process are executed in accordance with the received user information. Also, the media information of a CD requested by the user or a CD under playback is sent from the music server 50 to the Internet server 60. In accordance with the received media information, the Internet server 60 searches for additional information attendant on the audio data, such as the song title, the names of the artist, composer and songwriter, words, and a jacket image. Then, the Internet server 60 transmits the information regarding the CD requested by the user back to the music server 50.

For example, the TOC (Table Of Contents) information of the CD 55 is sent as the media information to the Internet server 60. A database capable of searching for additional information corresponding to the audio data based on the TOC information is constructed in the Internet server 60. The Internet server 60 may also obtain the additional information by searching another WWW server on the Internet. The Internet server 60 searches for the additional information corresponding to the audio data by using the received TOC information as the media information. For example, the search can be made based on time information of each musical composition recorded on the CD 55, the time information being included in the TOC information.

The additional information obtained by the search is sent from the Internet server 60 to the music server 50. In the music server 50, the received additional information is displayed on the display unit 53 and written in a hard disk drive together with the TOC information of the CD 55 by a CPU, described later in connection with FIG. 2. The additional information obtained by the search can be displayed on the music server 50 with the incorporated WWW browser software, by sending the additional information from the Internet server 60 to the music server 50 in the form of an HTML file.

If another URL (Uniform Resource Locator) is described in the additional information, the user can access, from the music server 50, the home page on the Internet indicated by the other URL.

Further, by communicating data between the music server 50 and the Internet server 60, the music server 50 can write the audio data of the CD 55, which is loaded in the music server 50 through the CD loader 54, in the storage medium of the music server 50 in about two minutes for each CD, for example, at a higher data rate than the standard playback data rate prescribed for the CD 55. When no communication is made between the music server 50 and the Internet server 60, the music server 50 stores the audio data of the CD 55 in the storage medium of the music server 50 at the same data rate as the standard playback data rate prescribed for the CD 55.

By connecting the music server 50 to the portable recording and playback unit 70 through the connecting line 71, the audio data stored or written in the music server 50 can be transferred and moved to the portable recording and playback unit 70. The moved audio data can be reproduced by the portable recording and playback unit 70 even when the server 50 and the unit 70 are not connected through the connecting line 71, allowing the user to listen to the reproduced audio data with a headphone 72, for example. On the side of the music server 50, the transferred and moved audio data is brought into a state where it cannot be reproduced.

Figure 2:
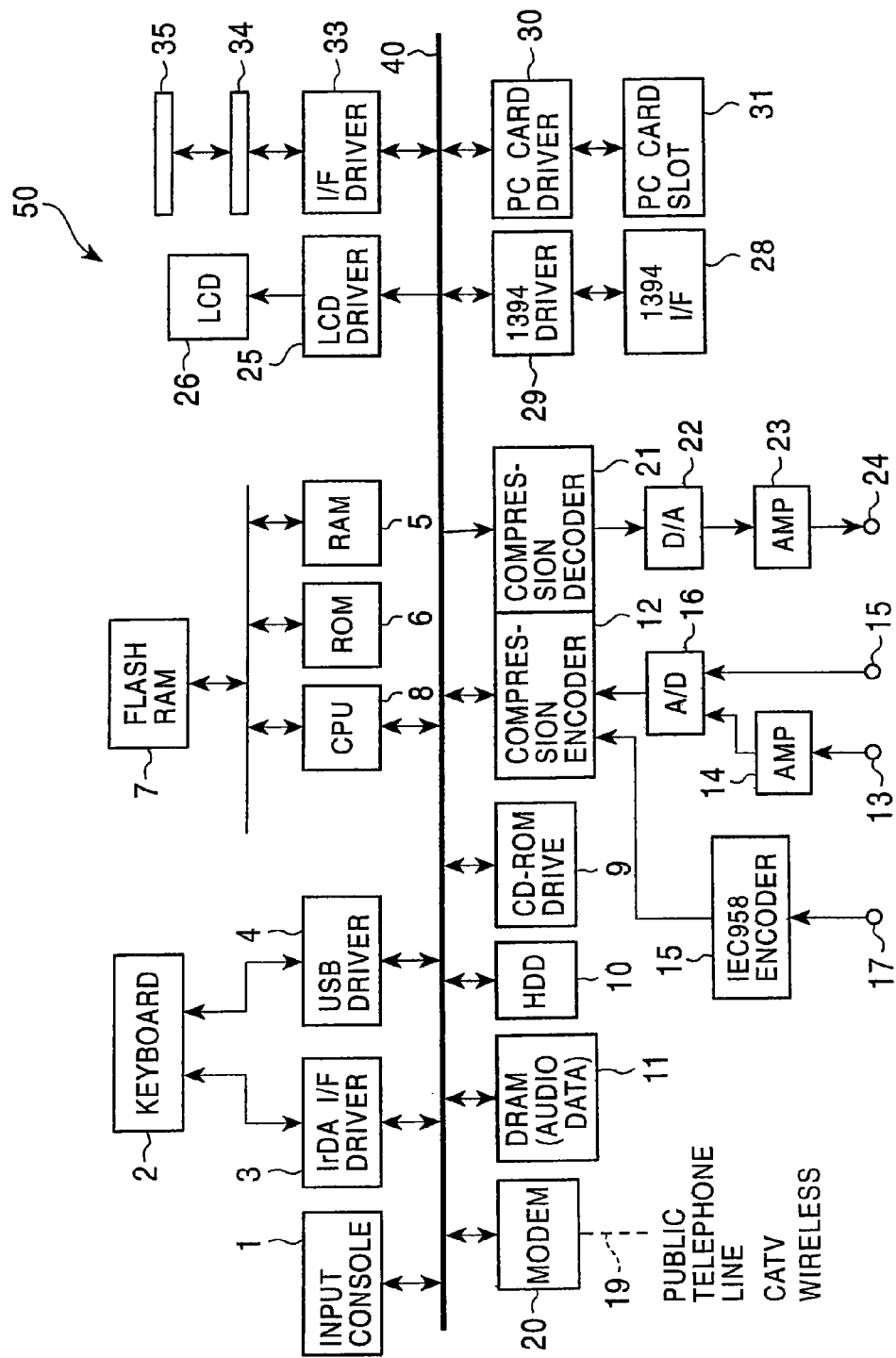
FIG. 2 is a block diagram showing one example of construction of the music server.

FIG. 2 shows one example of construction of the music server 50. Similarly to the construction of an ordinary personal computer, the music server 50 comprises a RAM 5, a ROM 6, a flash memory 7, and a CPU 8 which are interconnected via a bus 40. The CPU 8 functions as a controller and controls the overall operation of the music server 50.

Programs for controlling the operation of the music server 50 are stored in the ROM 6 beforehand. In the music server 50, the stored programs enable the CPU 8 to execute the operation corresponding to the user's manipulation made on an input console 1. A data area and a task area, which are required for execution of the programs, are temporarily secured in the RAM 5 and the flash memory 7. A program loader is stored in the ROM 6 so that a program itself may be loaded in the flash memory 7 with the program loader stored in the ROM 6.

The input console 1 comprises a plurality of push- and rotary-type control keys and a plurality of switches operated respectively by the control keys. The input console 1 is not limited to such an example, but may comprise a rotatable push-type control member called a jog dial, a touch panel formed on an LCD, or the like. As a matter of course, the input console 1 may comprise a switch mechanism responsive to pressing by the user. A signal corresponding to the user's manipulation made on the input console 1 is supplied to the CPU 8 via the bus 40. In accordance with the signal from the input console 1, a control signal for controlling the operation of the music server 50 is produced by the CPU 8. The music server 50 is operated in accordance with the control signal produced by the CPU 8.

An infrared interface (IrDA I/F) driver 3 and/or a USB (Universal Serial Bus) driver 4 are connected to the bus 40. A keyboard 2 is designed to be connectable to the drivers 3, 4 by radio communication or electrical connection. Using the keyboard 2, the user can easily enter, for example, the music title, the name of the artist, etc. corresponding to the audio data to be written. Also, data may be transferred through the infrared interface driver 3 or the USB driver 4, which can be considered optional.

A CD-ROM drive 9 is connected to the bus 40, and the CD 55 is loaded in the CD-ROM drive 9 through the CD loader 54 as described above. In the CD-ROM drive 9, the audio data is read out of the CD 55 at the standard playback data rate prescribed for the CD 55. The CD-ROM drive 9 can also read the audio data of the CD 55 at a higher date rate, such as 16 or 32 times as fast as the prescribed standard playback data rate.

The CD-ROM drive 9 is not limited to the above-mentioned example, but may be adaptable for any other suitable disk-shaped recording medium in which audio data is stored, for example, a magneto-optical disk or a DVD (Digital Versatile Disk). Alternatively, a drive adaptable for a memory card is also usable. Further, data read by the CD-ROM drive 9 is not limited to audio data, and image data, text data, program data, can also be read by the CD-ROM drive 9.

A hard disk drive (hereinafter abbreviated to HDD) 10 is connected to the bus 40. Audio data read by the CD-ROM drive 9 is written in the HDD 10. As a pre-process for writing the audio data in the HDD 10, the audio data read by the CD-ROM drive 9 is supplied to a compression encoder 12 via the bus 40 and an audio DRAM 11.

The compression encoder 12 executes the compression-coding process of the audio data by the compressing method disclosed in the above-cited U.S. Pat. No. 5,717,821, for example. A compression bit rate of the audio data by the compression encoder 12 is selected from two low and high bit rates under control of the CPU 8. The low compression bit rate corresponds to the standard playback data rate prescribed for the CD 55 in connection with the CD-ROM drive 9. The compression bit rate is switched over depending on the playback data rate of the CD 55 in the CD-ROM drive 9. For example, an encoding algorithm depending on the compression bit rate is operated in the compression encoder 12.

The manner of changing the compression bit rate in the compression encoder 12 is not limited to the above-described example. As an alternative, the compression bit rate may be changed by switching over the clock frequency of the compression encoder 12, or by preparing separate units of hardware. Further, the compression encoder 12 capable of high-rate compression may be operated at a low compression bit rate through thinning of the processing. The compressed audio data resulting from the compression-coding executed by the compression encoder 12 is written and stored in the HDD 10 through the DRAM 11.

Although the compressed audio data resulting from the compression-coding executed by the compression encoder 12 is written in the HDD 10 in this embodiment, the audio data read by the CD-ROM drive 9 may be directly supplied to the HDD 10 to be written and stored in a hard disk of the HDD 10.

In this embodiment, a sound signal inputted from a microphone, which is connected to a terminal 13, through an amplifier 14 and a sound signal inputted from a line input terminal 15 are supplied to the compression encoder 12 through an A/D converter 16. Those sound signals can be thus written in the HDD 10 after being subjected to compression-coding by the compression encoder 12. Further, a digital optical signal is supplied to the compression encoder 12 from a digital optical input terminal 17 through an IEC 958 (International Electrotechnical Commission 958) encoder 18. A sound signal supplied as a digital optical signal can be thus written on the disk of the HDD 10 after the compression-coding by the compression encoder 12.

The compression encoder 12 has been described as using the encoding algorithm disclosed in the above-cited U.S. Pat. No. 5,717,821, but the present invention is not limited to that example. The compression encoder 12 may use any other suitable encoding algorithm so long as it can compress information. In addition to the above-described algorithms, other encoding algorithms such as PASC (precision adaptive sub-band coding), RealAudio (trade name), and LiquidAudio (trade name) are also usable in the compression encoder 12.

A modem 20 is connected to the bus 40. An external network 19, such as a public telephone line, CATV, a satellite line or wireless communication, is connected to the modem 20. The music server 50 can communicate with the external network 19 through the modem 20.

The music server 50 is connected to the Internet via the external network 19 for communication with the Internet server 60 in a remote location. Various information including a request signal, the media information regarding the CD 55 loaded in the CD-ROM drive 9, the user ID data assigned to the music server 50 in one-to-one relation beforehand and other user information, as well as billing information for the user, are transmitted from the music server 50 to the Internet server 60.

When the various information such as the media information and the user information are transmitted to the Internet server 60, the Internet server 60 executes the checking process and the billing process in accordance with the received user information, such as the user ID data, and searches for the additional information corresponding to the audio data based on the received media information, the located additional information being sent back to the music server 50.

Although the additional information corresponding to the audio data is sent back to the music server 50 in the above example, the audio data may be directly supplied via the external network 19 in response to a user's request. In other words, the user can download audio data from the Internet server 60 by using the music server 50. Thus, audio data can be sent back in accordance with the media information. This feature enables the user to obtain a bonus track of a predetermined CD through communication.

The compressed audio data, which has been written and stored in the HDD 10 after being coded and compressed by the compression encoder 12, is read out of the HDD 10 for reproduction and the read-out data is supplied to a compression decoder 21 via the bus 40. The compressed audio data read out of the HDD 10 is decoded and decompressed in the compression decoder 21, and the decoded audio data is fed out at a terminal 24 through a D/A converter 22 and an amplifier 23. The audio data is then supplied from the terminal 24 to the speaker units 52L, 52R of FIG. 1 for playback of music. Though not shown in FIG. 2, there are actually provided two signal lines from the D/A converter 22 to the terminal 24 through the amplifier 23 corresponding to stereo outputs. Likewise, two terminals 24 are also provided corresponding to stereo outputs.

The compression decoder 21 uses a decoding algorithm corresponding to the encoding algorithm used in the compression encoder 12. The compression decoder 21 and the compression encoder 12 may implement their functions through software processing executed by the CPU 8 without resorting to hardware.

A liquid crystal display (LCD) device 26, which constitutes the display unit 53, is connected to the bus 40 through an LCD driver 25. A drawing control signal is supplied from the CPU 8 to the LCD driver 25 via the bus 40. The LCD 26 is operated by the LCD driver 25 in accordance with the supplied drawing control signal, and the desired display is made on the display unit 53.

For example, an operating menu of the music server 50 is displayed on the LCD 26. As another example, a title list of the compressed audio data, which has been written and stored in the HDD 10, is displayed on the LCD 26. Display of the title list on the LCD 26 is performed based on data stored in the HDD 10 because the additional information transmitted from the Internet server 60 is supplied to the HDD 10 after being decoded. As still another example, a folder or a jacket image corresponding to the compressed audio data, which has been selected for reproduction, may be displayed on the LCD 26 in accordance with the additional information transmitted from the Internet server 60.

When the user operates a remote control device, not shown, in the input console 1 or the keyboard 2 based on the display on the LCD 26, the CPU 8 starts reproducing control of the audio data instructed by the user. Further, based on the display on the LCD 26, the user can instruct the CPU 8 to control not only erasure of the selected audio data, but also copying and movement of the selected audio data to an external device. For example, where the input console 1 is in the form of a touch panel provided on the LCD 26, the user can operate the music server 50 by touching the touch panel following the display on the LCD 26. Thus, the user can manage and control the audio data written and stored in the HDD 10 by utilizing the LCD 26 as an interface.

This embodiment is adapted for IEEE 1394 and a PC card to interface between the music server 50 and external general information equipment. To that end, an IEEE 1394 interface 28 is connected to the bus 40 through an IEEE 1394 driver 29. Likewise, a PC card slot 31 is connected to the bus 40 through a PC card driver 30.

Data can be transferred between the music server 50 and a personal computer through the IEEE 1394 interface 28. Also, the IEEE 1394 interface 28 enables audio data to be taken in from an IRD (Integrated Receiver/Decoder) for satellite broadcasting, a small-sized magneto-optical disk or an optical disk with a diameter of about 64 mm, a DVD (Digital Versatile Disk: trade name), and a digital video tape. By loading a PC card into the PC card slot 31, it is possible to easily achieve system expansion including various peripheral equipment, such as an external storage or any other media drive, a modem, a terminal adapter, and a capture board.

An interface 34 serves as an interface through which audio data is transferred between the music server 50 and another corresponding recording and playback apparatus. The another recording and playback apparatus comprises the above-mentioned portable recording and playback unit 70 shown in FIG. 1. Alternatively, the other recording and playback apparatus may comprise another music server.

The interface 34 is connected to the bus 40 through an interface driver 33. The other recording and playback apparatus includes an interface 35 matched with the interface 34. By electrically connecting both the interfaces 34 and 35 through the predetermined connecting line 71, the audio data written and stored in the HDD 10 can be transferred from the music server 50 to the other recording and playback apparatus.

Figure 3:
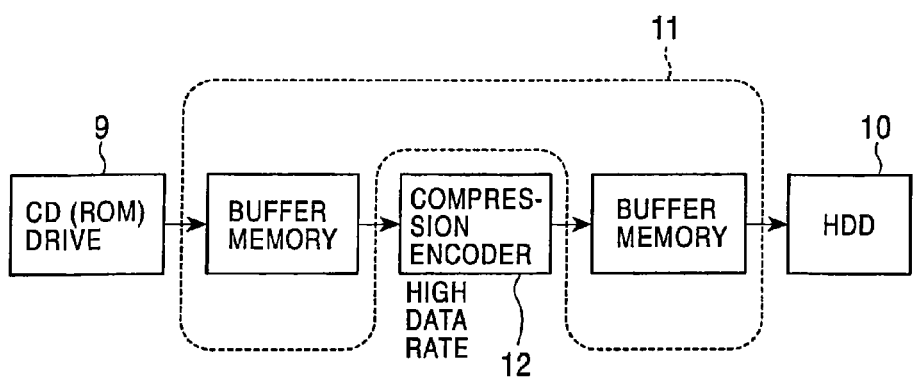
FIG. 3 schematically shows a signal flow in the process during which audio data is read by a CD-ROM drive and written in a hard disk drive.

FIG. 3 schematically shows a signal flow in the process during which audio data is read by the CD-ROM drive 9 and written in the HDD 10. The audio data read by the CD-ROM drive 9 is first stored in the DRAM 11 serving as a buffer memory via the bus 40. The audio data is read out of the DRAM 11 at predetermined timing and supplied to the compression encoder 12 via the bus 40. The compression encoder 12 is set, as described above, to the predetermined compression bit rate corresponding to the playback data rate of the CD-ROM drive 9. The audio data is coded and compressed by the compression encoder 12 and then stored again in the DRAM 11 serving as a buffer memory. The compressed audio data is read out of the DRAM 11 at predetermined timing and supplied to the HDD 10 via the bus 40 for writing on the disk of the HDD 10. On this occasion, as described above, the information of the CD 55 under playback by the CD-ROM drive 9 is transmitted to the Internet server 60, and the additional information attendant on the CD 55 transmitted from the Internet server 60 is also written on the disk of the HDD 10. Then, the additional information is managed by the CPU 8 as one group of data, together with the compressed audio data obtained from the audio data that has been read out of the CD 55.

Figure 4:
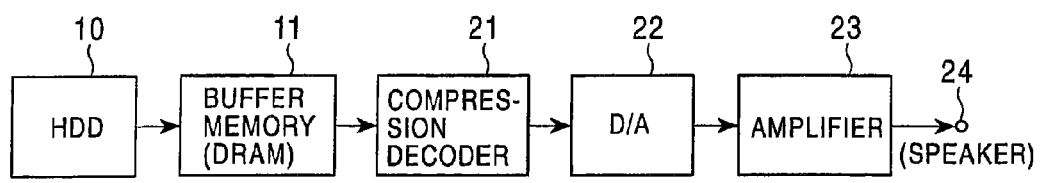
FIG. 4 schematically shows a signal flow in the process during which compressed audio data is read out of the hard disk drive and introduced to a terminal after being subjected to the reproducing process.

FIG. 4 schematically shows a signal flow in the process during which the compressed audio data is read out of the HDD 10 and introduced to the terminal 24 after being subjected to the reproducing process. The compressed audio data read out of the HDD 10 is once stored in the DRAM 11 serving as a buffer memory via the bus 40. The compressed audio data is read out of the DRAM 11 at a predetermined timing and supplied to the compression decoder 21 via the bus 40. The compressed audio data is decoded and decompressed by the compression decoder 21, and resulting audio data is supplied to the D/A converter 22. The audio data is converted into an analog sound signal by the D/A converter 22 and is introduced, as a playback output, to the terminal 24 after being amplified by the amplifier 23. If a speaker is connected to the terminal 24, the user can enjoy the played-back music through the speaker. On this occasion, the additional information read out from the disk of the HDD 10 along with the compressed audio data is decoded by the CPU 8 and the music title and the like are displayed on the display unit 53.

Figure 5:
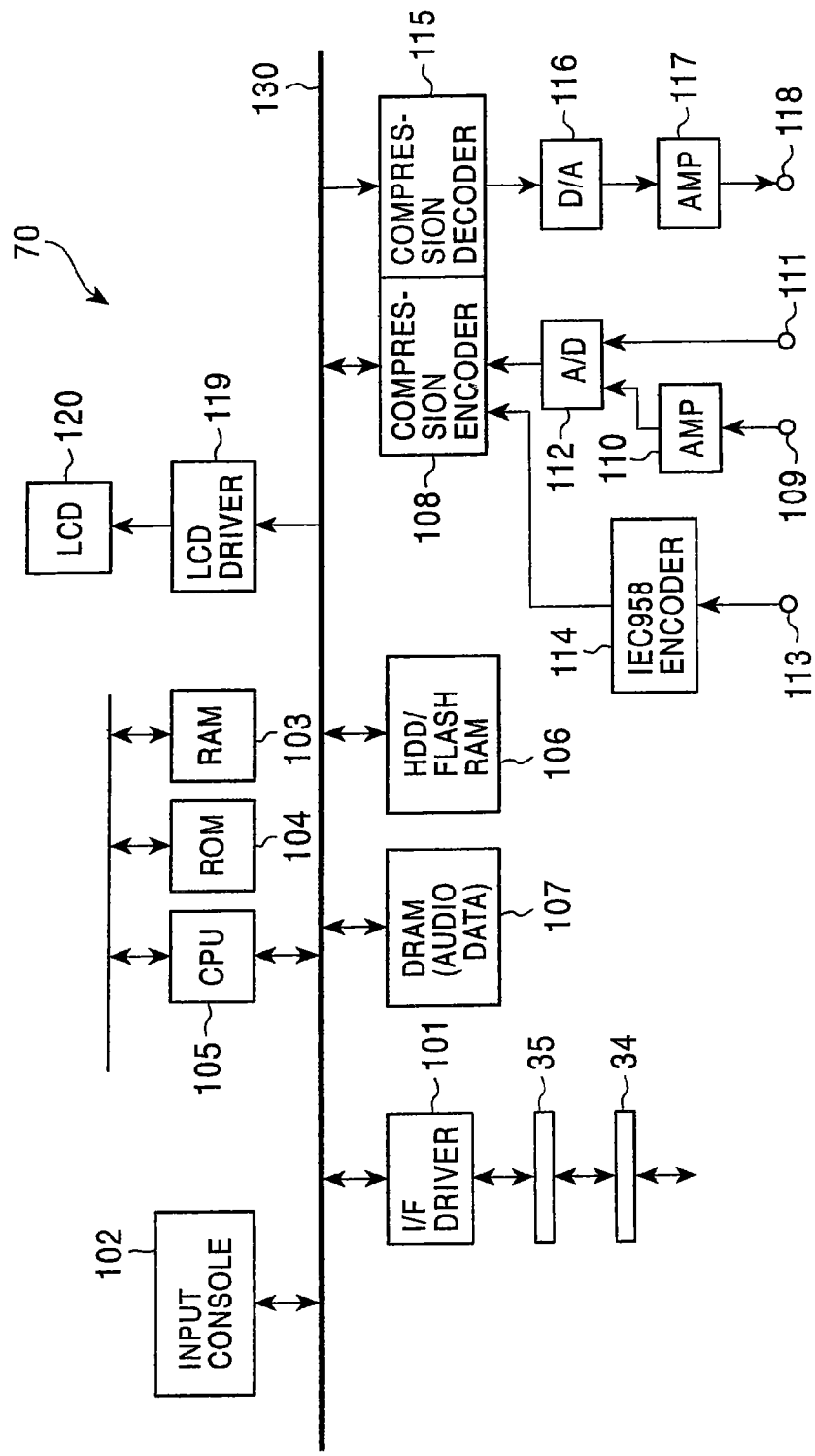
FIG. 5 is a block diagram showing one example of construction of a portable recording and playback unit.

FIG. 5 shows one example of construction of the portable recording and playback unit 70 that is employed as the above-mentioned other recording and playback apparatus. The portable recording and playback unit 70 has basically the same construction as that of the music server 50 shown in FIG. 2. Usually, the interface 34 on the side of the music server 50 is disconnected from the interface 35 on the side of the portable recording and playback unit 70, and the unit 70 is carried as a single unit with the user.

Similarly to the construction of an ordinary personal computer, the portable recording and playback unit 70 comprises a RAM 103, a ROM 104, and a CPU 105, which are interconnected via a bus 130. Of course, a flash memory may also be provided as with the above-described construction of the music server 50. The CPU 105 functions as a controller and controls the overall operation of the portable recording and playback unit 70.

Programs for controlling the operation of the portable recording and playback unit 70 are stored in the ROM 104 beforehand. In the portable recording and playback unit 70, the stored programs enable the CPU 105 to execute the operation corresponding to the user's manipulation made on an input console 102. A data area and a task area, which are required for execution of the programs, are temporarily secured in the RAM 103.

The input console 102 comprises, for example, a plurality of push- and rotary-type control keys and a plurality of switches operated respectively by the control keys. The input console 102 is not limited to such an example, but may comprise a rotatable push-type control member called jog dial, a touch panel formed on an LCD, or the like. As a matter of course, the input console 102 may comprise a mechanical switch mechanism responsive to pressing by the user. A signal corresponding to the user's manipulation made on the input console 102 is supplied to the CPU 105 via the bus 130. In accordance with the signal outputted from the input console 102 corresponding to the user's manipulation of the control key made on the input console 102, the CPU 105 produces a control signal for controlling the operation of the portable recording and playback unit 70. The operation of the portable recording and playback unit 70 is switched over and controlled in accordance with the control signal produced by the CPU 105.

The audio data, which is read out of the HDD 10 and instructed to be transferred from the music server 50 to the portable recording and playback unit 70, is transferred or supplied to the unit 70 through the interface 34, the interface 35, and the connecting line between both the interfaces 34, 35. At the same time, the additional information corresponding to the audio data, which has been instructed to be transferred, is also transmitted to the portable recording and playback unit 70 along with the transferred audio data. Where mutually fitting portions are provided on the music server 50 and the portable recording and playback unit 70, both the interfaces 34, 35 are directly connected to each other so that the audio data is transferred between the server 50 and the unit 70. Alternatively, where IrDA interfaces are provided on both the server 50 and the unit 70, the audio data is transferred between the server 50 and the unit 70 using an infrared signal.

The audio data transferred from the music server 50 to the portable recording and playback unit 70 is supplied to an HDD 106, which is an audio data storing medium built in the unit 70, via an interface driver 101 and the bus 130 for writing on a platter of the HDD 106.

The audio data storing medium in the portable recording and playback unit 70 is not limited to the HDD 106, but may comprise a flash memory, for example. Further, any other suitable storing or recording medium, such as a magneto-optical disk, can also be used as the audio data storing medium so long as it is able to follow the playback data rate of the audio data. When the audio data storing medium in the portable recording and playback unit 70 has a storage capacity on the order of 200 MByte, it can store several tens of music pieces. The platter of the HDD 106 in the unit 70 records thereon the audio data transmitted from the music server 50 along with the additional information corresponding to the transmitted audio data.

In this embodiment, the audio data transferred and written in the HDD 106 is compressed audio data that has been already subjected to the compression-coding in the music server 50. The present invention is not limited to this embodiment, and the portable recording and playback unit 70 may be supplied with audio data, which has not been coded and compressed, for writing on the platter of the HDD 106. In such a case, the audio data played back and read out of the CD 55 loaded in the CD-ROM drive 9 of the music server 50 is directly supplied to the portable recording and playback unit 70 through the interface driver 101. It is, however, needless to say that when the audio data is directly supplied to the unit 70 the amount of audio data that can be stored in the unit 70 is noticeably restricted.

As a pre-process for writing the audio data on the platter of the HDD 106, the supplied audio data is temporarily stored in an audio DRAM 107 connected to the bus 130. The audio data read out of the DRAM 107 is supplied to a compression encoder 108 via the bus 130. The compression encoder 108 executes the compression-coding process of the audio data by the same encoding algorithm as used in the compression encoder 12 of the music server 50. The audio data coded and compressed by the compression encoder 108 is supplied to the DRAM 107 and temporarily stored in the DRAM 107 again. Finally, the compressed audio data stored in the DRAM 107 is read and written on the platter of the HDD 106.

As described above, when the compressed audio data stored in the HDD 10 is instructed to move, that is, to be transmitted and transferred from the music server 50 to the portable recording and playback unit 70, the compressed audio data in the HDD 10 is brought into such a state that the transferred audio data still remains in the HDD 10 but cannot be read out of the HDD 10 for reproduction. The compressed audio data having been moved to the unit 70 can be reproduced at the movement source, that is, in the music server 50, only when the moved audio data is returned back to the storage medium at the movement source, that is, to the HDD 10 in the music server 50. At this time, the compressed audio data returned to the music server 50 is deleted from the storage medium at the movement destination, that is, the platter of the HDD 106 in the unit 70.

In this embodiment, a sound signal inputted from a microphone, which is connected to a terminal 109, through an amplifier 110 and a sound signal inputted from a line input terminal 111 are supplied to the compression encoder 108 through an A/D converter 112. Those sound signals supplied through the A/D converter 112 can be written in the HDD 106 after being coded and compressed by the compression encoder 108. Further, a digital optical signal is supplied to the compression encoder 108 from a digital optical input terminal 113 through an IEC 958 encoder 114. A sound signal supplied as a digital optical signal can be thus written on the platter of the HDD 106 after being coded and compressed by the compression encoder 108. If the portable recording and playback unit 70 is a play-only unit that is able to only reproduce the compressed audio data, the above-mentioned A/D converter 112 and encoder 108 can be all dispensed with.

The compressed audio data is read out of the HDD 106 for reproduction and is supplied to the compression decoder 115 via the bus 130. The supplied compressed audio data is subjected to the decompressing process in the compression decoder 115, and resulting decoded and decompressed audio data is fed out at a terminal 118 through a D/A converter 116 and an amplifier 117. For example, the headphone 72 is connected to the terminal 118. The user can listen to the played-back music by putting on the headphone 72. Though not shown in FIG. 5, there are actually provided two signal lines from the D/A converter 116 to the terminal 118 through the amplifier 117 corresponding to stereo outputs for L- and R-channels. Likewise, two terminals 118 are also provided corresponding to stereo outputs for L- and R-channels.

An LCD 120 is connected to the bus 130 through an LCD driver 119. A drawing control signal is supplied from the CPU 105 to the LCD driver 119 via the bus 130. The LCD 120 is operated in accordance with the supplied drawing control signal, and certain display is made on the LCD 120. An operating menu of the portable recording and playback unit 70, a title list of the audio data stored in the HDD 106, and the like are displayed on the LCD 120. As another example, a folder or a jacket image corresponding to the audio data, which has been selected from the audio data stored in the HDD 106 for reproduction, may be displayed on the LCD 120 in accordance with the additional information stored in the HDD 106.

When the user operates a pointing device in the input console 102 based on the display on the LCD 120, one set of the compressed audio data stored in the HDD 106 is selected and reproduced. Further, based on the display on the LCD 120, the user can instruct the CPU 105 to control erasure, copying and movement of the selected compressed audio data. For example, the user can input an instruction for operating the portable recording and playback unit 70 by touching a touch panel provided on the input console 102 following the display on the LCD 120. Thus, the user can control management, writing and reproduction of the compressed audio data stored in the HDD 106 by utilizing the LCD 120 as an interface.

Though not shown in FIG. 5, the portable recording and playback unit 70 is driven by a battery. Therefore, the unit 70 includes a power supply unit and a charging unit, the power supply unit comprising, as a power supply source, a general secondary battery or dry cell. Where the music server 50 and the portable recording and playback unit 70 are directly connected to each other through a connecting line or mutually fitting portions, electric power is supplied to the charging unit together with transfer of the audio data for charging the secondary battery in the unit 70. As a matter of course, the secondary battery in the unit 70 may be charged using an external charging power source. Incidentally, either one of a non-charging power source using a dry cell or a charging power source using a secondary battery may be provided as the power supply unit.

Figure 6:
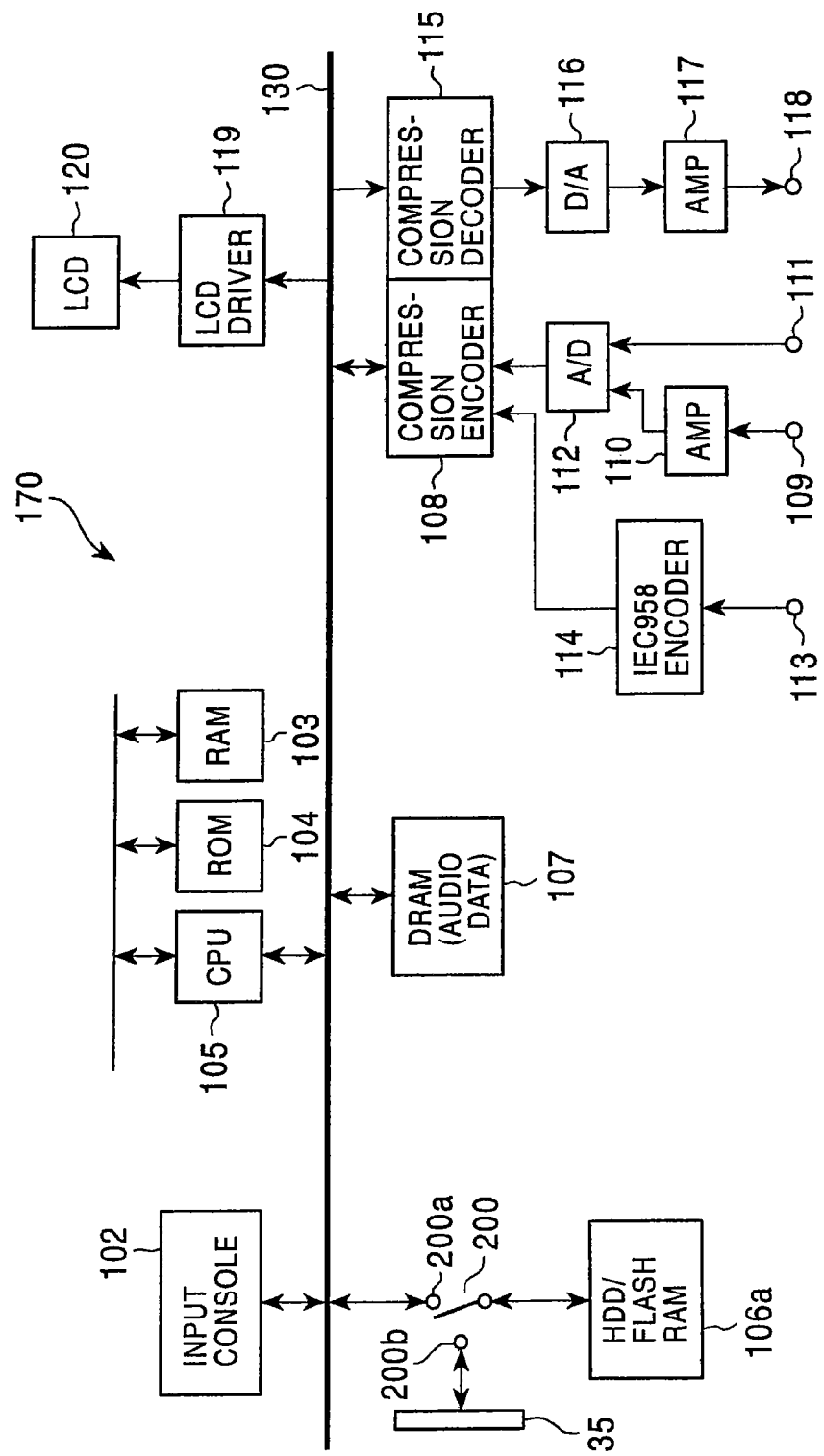
FIG. 6 is a block diagram showing another example of the portable recording and playback unit.

FIG. 6 shows another example of the portable recording and playback unit 70. Note that components in FIG. 6 in common with those in FIG. 5 are denoted by the same numerals and a detailed description thereof is not repeated here. A portable recording and playback unit 170 shown in FIG. 6 differs in construction from the unit 70 shown in FIG. 5 in that a switch circuit 200 is interposed between an I-MD or a flash memory 106a and the bus 130. One contact terminal 200a of the switch circuit 200 is connected to the bus 130, and the other contact terminal 200b is connected to the interface 35. The HDD 106a and the bus 130 are separable by the switch circuit 200.

When the compressed audio data is transferred from the music server 50, the switch circuit 200 is changed over to the side of the contact terminal 200b for selection of the contact terminal 200b. The HDD 106a and the bus 130 of the music server 50 are thereby directly connected to each other through the interfaces 34 and 35. Looking the HDD 106a from the CPU 8 of the music server 50 in such a condition, the HDD 106a appears as a storage medium in the music server 50. Accordingly, the CPU 8 of the music server 50 can directly control the HDD 106a. This arrangement enables the compressed audio data to be more easily moved and copied between the music server 50 and the portable recording and playback unit 170 under control of the CPU.

Figure 7:
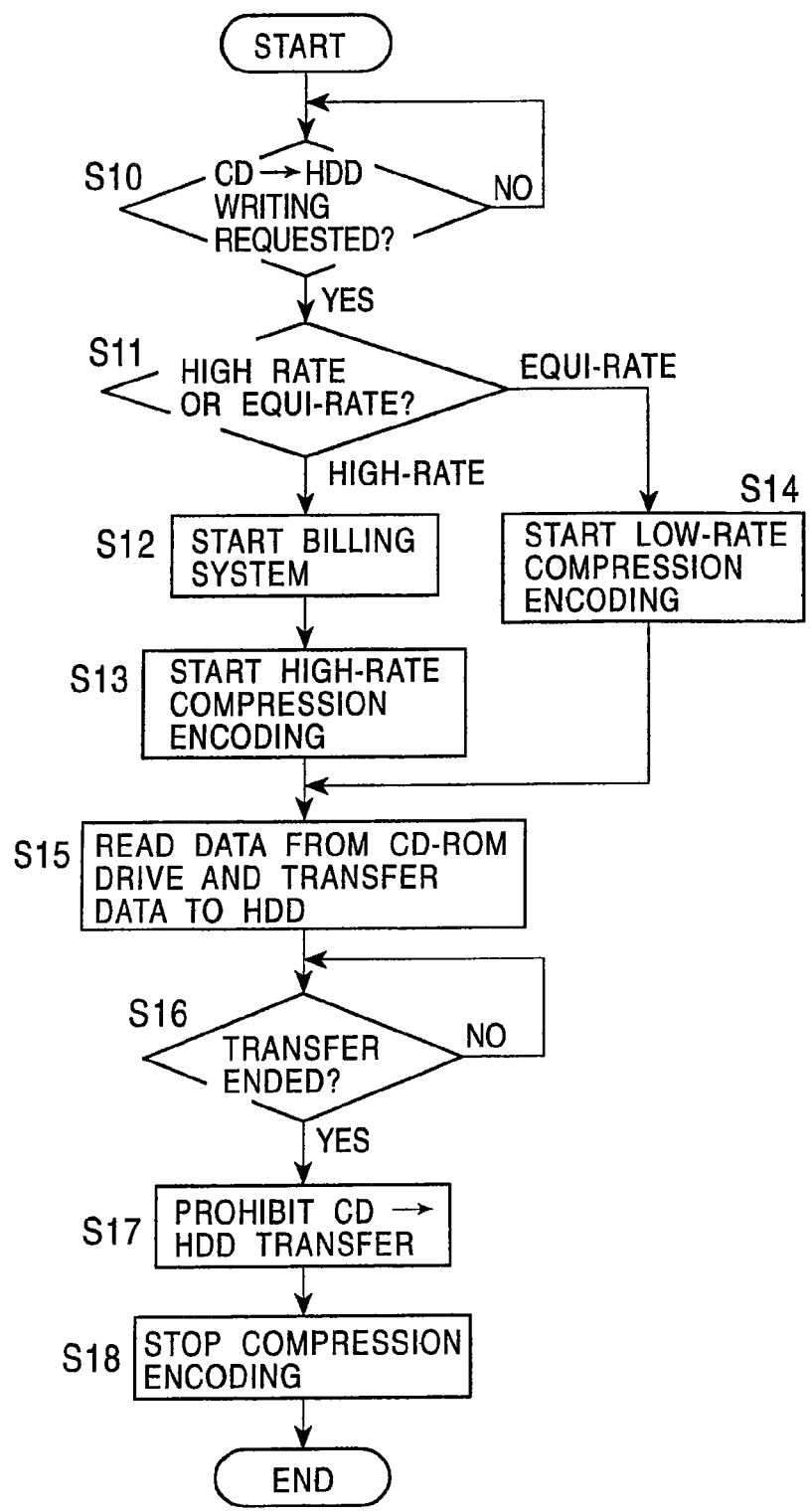
FIG. 7 is a flowchart showing one example of processing executed in the music server when audio data on a CD is written in the hard disk drive.

The operation of the system thus constructed will be described below. A description is first made of the function executed by the music server 50 alone. FIG. 7 is a flowchart showing one example of processing executed when audio data on the CD 55 loaded in the CD-ROM drive 9 is written on the disk of the HDD 10 in the music server 50.

In first step S10, the CPU waits for a request from the user for writing the audio data of the CD 55 in the HDD 10. If the user enters a writing request through the input console 1, for example, the process goes to step S11. In step S11, it is determined whether the writing requested by the user is "high-rate writing" or "equi-rate writing". A writing method, that is, "high-rate writing" or "equi-rate writing", can be designated by the user at the same time as when a writing request is entered in above step S10. The term "equi-rate writing" used herein means the operation of reading the audio data at the standard data rate prescribed for the CD 55 and writing the read data on the platter of the HDD 10. The term "high-rate writing" used herein means the operation of reading the audio data at a data rate two or more times as fast as the standard data rate prescribed for the CD 55 and writing the read data on the disk of the HDD 10.

If "high-rate writing" is designated in step S11, the process goes to step S12. In step S12, a billing system in the server 50 or 60 is started up. Processing executed by the billing system in the servers 50 or 60 will be described later. After the billing process is executed by the billing system in the music server 50 and the high-rate writing is permitted by the Internet server 60 or another device, the process goes to step S13 where the high-rate compressing process is started in the compression encoder 12. The process then goes to step S15.

On the other hand, if "equi-rate writing" is designated in step S11, the process goes to step S14 where the low-rate compressing process is started in the compression encoder 12. The process then goes to step S15.

In step S15, the CD-ROM drive 9 is driven at the predetermined speed under control of the CPU 8, and the audio data recorded on the CD 55, which is loaded in the CD-ROM drive 9, is read out of the CD 55. The read audio data is coded and compressed by the compression encoder 12 and transferred to the HDD 10 for writing on its disk.

If it is determined in step S16 that the audio data read out of the CD 55 has been completely transferred to the HDD 10 after the compression, data transfer from the CD-ROM drive 9 to the HDD 10 is prohibited in step S17. In next step S18, the compression-coding process by the compression encoder 12 is stopped.

Figure 8:
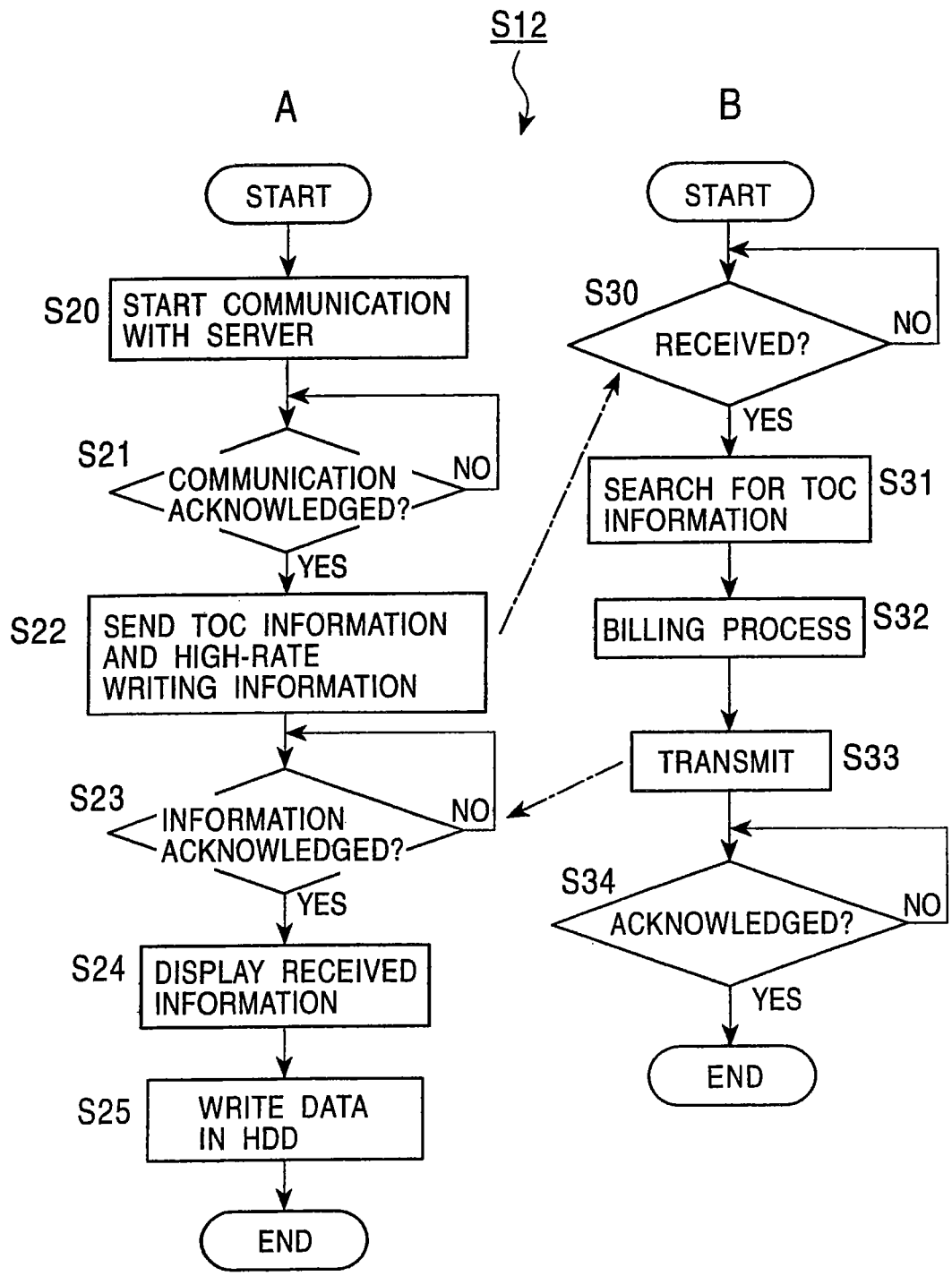
FIG. 8 is formed of flowcharts A and B showing one example of the billing process executed when the CD audio data is written in the hard disk drive at a high data rate.

A and B in FIG. 8 are flowcharts showing one example of the billing process executed by the billing system in step S12 of the flowchart shown in FIG. 7. The billing process is executed through data communication between the music server 50 and the Internet server 60. Flowchart A shows the billing process executed by the billing system in the music server 50, and flowchart B shows the billing process executed by the billing system in the Internet server 60.

After the start of the billing process, in step S20 of A, data communication is started between the music server 50 and the Internet server 60 in accordance with a predetermined protocol. If it is confirmed in step S21 that connection between both the servers 50 and 60 is established to be ready for communication between both the servers 50 and 60, the process goes to step S22.

In step S22, the TOC information of the CD 55, which is loaded in the CD-ROM drive 9 and from which the audio data is transferred and written in the HDD 10, is sent from the music server 50 to the Internet server 60 along with the user ID corresponding to the music server 50. Together with the TOC information of the CD 55, high-rate writing information indicating selection of the high-rate writing is sent from the music server 50 to the Internet server 60.

On the other hand, in B, the Internet server 60 waits until the user ID, the high-rate writing information and the TOC information are supplied or transmitted from the music server 50 in step S30. If the user ID, the high-rate writing information and the TOC information are received by the Internet server 60, a database in the Internet server 60 or an external database is searched in step S31 based on the transmitted TOC information. The CD 55 is identified by the search for information corresponding to the TOC information.

The billing process is executed in next step S32. An amount of money to be billed is computed based on information, such as the number of musical compositions which have been subjected to the high-rate writing. The billing can be performed by drawing the billed amount on the account, which has been opened with a bank and designated by the user, in accordance with the credit card number of the user registered in advance and corresponding to the user ID. The billing method is not limited to the above example. For example, the billing can be performed on the side of the music server 50 by a method of providing a function of reading a prepaid card in the music server 50, sending the preset billed amount to the music server 50, and subtracting the billed amount from the prepaid card inserted by the user. Under control of the Internet server 60, it is also possible to change the billed amount depending on the contents of the CD 55 and to prohibit writing of the audio data read out of the CD 55 on the platter of the HDD 10 in accordance with the TOC information.

In step S33, the billing information is sent to the music server 50. Then, as shown in A of FIG. 8, the substance of the transmitted billing information is acknowledged on the side of the music server 50 in step S23. Also, whether the billing information has been received by the music server 50 is acknowledged on the side of the Internet server 60 in step S34. When the billing information has been correctly received by the music server 50 without errors, this fact can be acknowledged by transmitting acknowledgement data from the music server 50 to the Internet server 60.

Returning to A of FIG. 8, if the billing information received on the side of the music server 50 is acknowledged in step S23, the process goes to step S24 where the received billing information, etc. are displayed on the display unit 53. In step S25, the audio data is read out of the CD 55 at a high bit rate by the CD-ROM drive 9 and subjected to the compression-coding process at a high compression bit rate in the compression encoder 12. The compressed audio data from the compression encoder 12 is supplied to the HDD 10 and written to the disk of the HDD 10. Step S25 corresponds to step S15 in FIG. 7.

Figure 9:
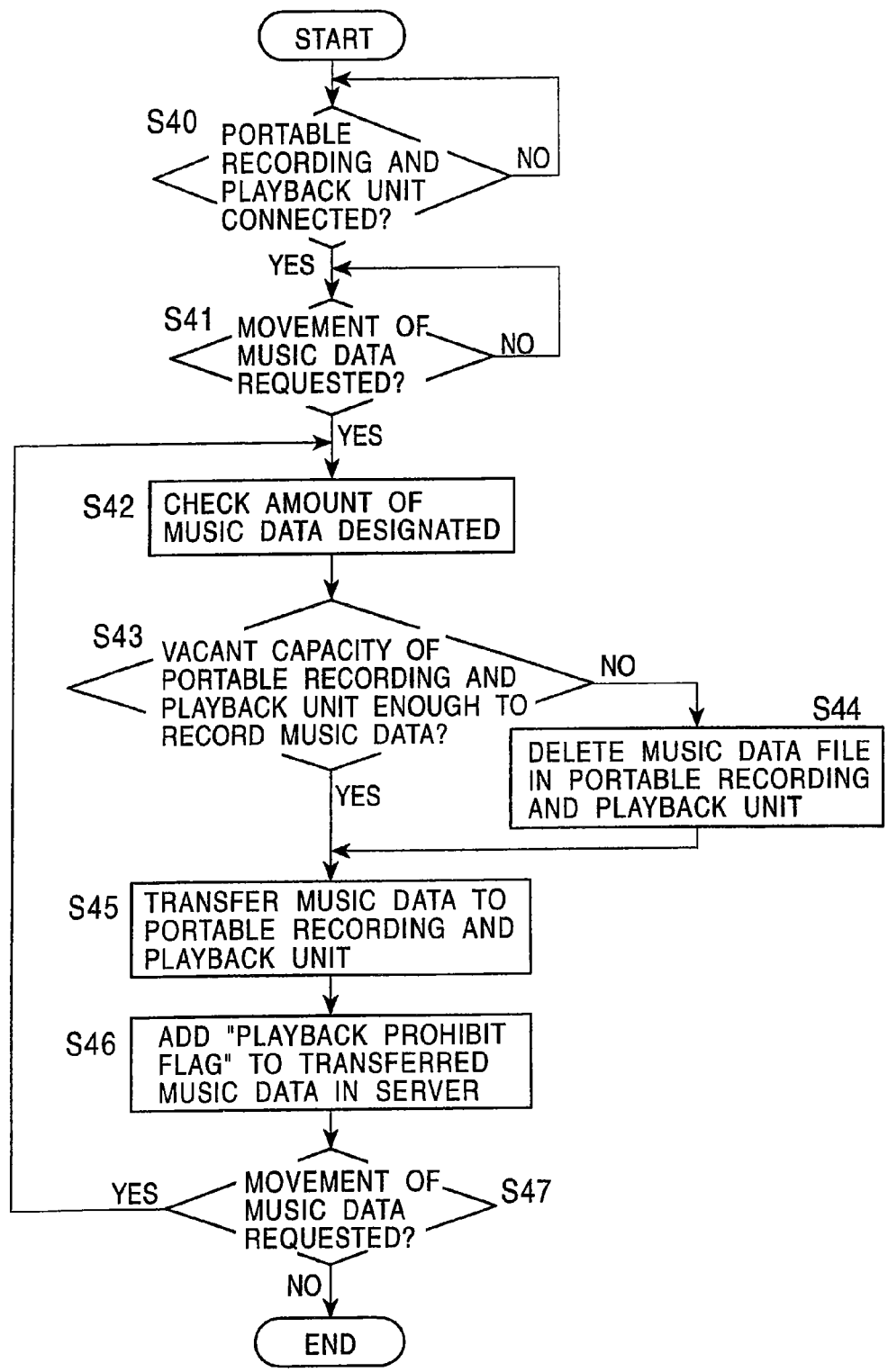
FIG. 9 is a flowchart showing one example of processing to move the audio data according to the present invention.

In this embodiment of the present invention, the music server 50 and the portable recording and playback unit 70 can operate in a cooperative manner. For example, when audio data is moved from the music server 50 to the portable recording and playback unit 70, the cooperation is carried out between the server 50 and the unit 70. FIG. 9 shows a flowchart of one example of the movement of audio data.

First, it is determined in step S40 whether the music server 50 and the portable recording and playback unit 70 are connected at the interfaces 34 and 35. The CPU 8 can detect the connection between the music server 50 and the portable recording and playback unit 70 by transferring a predetermined signal between the server 50 and the unit 70. A manner of detecting the connection between the music server 50 and the portable recording and playback unit 70 is not limited to such an example, but may be performed with a mechanical detecting mechanism. In other words, a mechanical switch mechanism may be provided at a joint portion between the server 50 and the unit 70, so that the CPU 8 can detect the connection between them.

If the connection between the music server 50 and the portable recording and playback unit 70 is confirmed in step S40, the CPU 8 determines in next step S41 whether it is requested to move the audio data, which is written and stored in the HDD 10, to the portable recording and playback unit 70. For example, a list of information about the compressed audio data stored in the HDD 10, including the music titles and so on, is displayed on the display unit 53, and the user selects one set of the compressed audio data from the list displayed on the display unit 53 by using the pointing device in the input console 1. Further, an instruction for movement of the selected compressed audio data to the portable recording and playback unit 70 is entered by the user through the input console 1.

Various approaches are conceivable to enter an instruction for movement of the selected audio data through the input console 1. For example, a button for instructing movement of the selected audio data is displayed on the display unit 53, and the user designates the button by using the pointing device in the input console 1. As another example, an icon is displayed on the display unit 53 for each set of the compressed audio data, and the user moves a desired one of the icons onto an icon indicating the portable recording and playback unit 70 as the movement destination, which is also displayed on the display unit 53, in the so-called drag and drop fashion. As a matter of course, an instruction for movement of the selected audio data may be entered by operating a control switch provided on the input console 1. The CPU 8 detects such an input operation and determines whether an instruction for movement of the selected audio data has been made.

If it is determined in step S41 that the movement of the compressed audio data is requested, the file size, i.e., the data amount, of the compressed audio data, for which the movement has been instructed, is checked in step S42 by the CPU 8 of the music server 50. In next step S43, an empty storage capacity available for writing, of the HDD 106 is checked by the CPU 105 of the portable recording and playback unit 70 which can transmit and receive data to and from the CPU 8. Then, the free space of the HDD 106 is compared with the file size of the compressed audio data, which has been checked in step S43 and for which the movement has been instructed, by the CPU 8 of the music server 50. In accordance with a comparison result in step S42, it is determined whether the compressed audio data, for which the movement has been instructed, can be written in the HDD 106. If the writing in the HDD 106 is possible, the process goes to step S45 where transfer of the compressed audio data, for which the movement from the server 50 to the unit 70 has been instructed, is started.

On the other hand, if the CPU 8 determines in step S43 that the available free space of the HDD 106 in the portable recording and playback unit 70 is insufficient, the process goes to step S44. In step S44, the compressed audio data already written in the HDD 106 is deleted automatically or through a predetermined procedure or method by the CPU 105 of the unit 70, so that the compressed audio data for which the movement has been instructed may be written in the HDD 106. Thereafter, the process goes to step S45.

Deletion of the compressed audio data in step S44 can be automatically performed under control of the CPU 105 in accordance with a predetermined parameter for the compressed audio data already written in the HDD 106. One example of conceivable approaches is to count the number of times of reproduction for each set of the compressed audio data written in the HDD 106 of the portable recording and playback unit 70 and to delete the compressed audio data in the order of the increasing number of times of reproduction from the HDD 106, starting from the minimum one. As an alternative, the compressed audio data written in the HDD 106 may be deleted in accordance with the date at which the data was written in the HDD 106, starting from the oldest date.

When the compressed audio data is automatically deleted in step S44 from the HDD 106, there is a possibility that the compressed audio data important for the user may be deleted from the HDD 106. To prevent such an undesirable occurrence, a warning can be displayed on the display unit 53 of the music server 50 or the LCD 120 of the portable recording and playback unit 70 to indicate the fact that the unit 70 is in a state ready for operation to automatically delete the compressed audio data from the HDD 106, or represent a list of the data to be deleted. The compressed audio data is then deleted from the HDD 106 after confirmation by the user. Another conceivable method is to display a list of the compressed audio data already written in the HDD 106 on the display unit 53 of the music server 50 or the LCD 120 of the portable recording and playback unit 70 and to prompt the user to select the compressed audio data to be deleted.

When the HDD 106 comes into a state capable of writing one of plural sets of the compressed audio data written in the HDD 10, for which the movement has been instructed, through the above-described processing in steps S43 and S44, transmission or transfer of the compressed audio data from the music server 50 to the portable recording and playback unit 70 is started in step S45: Specifically, the compressed audio data read out of the HDD 10 is supplied to the portable recording and playback unit 70 via the bus 40 and the interface 34. In the portable recording and playback unit 70, the compressed audio data supplied via the interface 34 is written in the HDD 106 via the interface 35.

The compressed audio data having been transferred to the portable recording and playback unit 70 still remains in the HDD 10 of the music server 50 as it is before the transmission to the unit 70. In this embodiment, reproduction of the compressed audio data that has been transferred to the unit 70, that is, playback of the compressed audio data that has been moved to the unit 70 and still remains in the HDD 10, is prohibited on the side of the music server 50 in step S46. For example, at the time when the compressed audio data has been transferred to the unit 70, a playback prohibit flag indicating prohibition of reproduction is set for the relevant compressed audio data in the HDD 10. With the playback prohibit flag thus set, the CPU 8 of the music server 50 prohibits reproduction of the compressed audio data that has been transferred to the unit 70. This means that the compressed audio data stored in the HDD 10 has been virtually moved from the music server 50 to the portable recording and playback unit 70. Accordingly, the system is managed such that only one of the same plural sets of the compressed audio data can be reproduced by the server 50 or the unit 70 at any time, whereby unauthorized copying of the compressed audio data is prevented.

In next step S47, it is determined whether another set of the compressed audio data is requested to be moved to the portable recording and playback unit 70. If the movement of another set of the compressed audio data is requested, the process returns to step S42. If the movement of a further set of the compressed audio data is not requested again, a series of the processes for moving the audio data are ended.

In the above description, one of plural sets of the compressed audio data stored in the HDD 10 is transferred from the server 50 to the unit 70 in steps S42-S46 of the flowchart shown in FIG. 9. The present invention is not limited to such an example, however, and plural sets of the compressed audio data may be moved together from the server 50 to the unit 70.

In the embodiment described above, the compressed audio data, which has been moved from the HDD 10 of the music server 50 as the movement source, is only prohibited from being reproduced, and the compressed audio data still remains itself in the HDD 10. The present invention is not limited to the above-described embodiment, however, and the compressed audio data having been moved may be deleted from the HDD 10, that is to say, the data itself may be erased.

The above embodiment has been described in connection with the case of moving the compressed audio data from the music server 50 to the portable recording and playback unit 70. Movement of the compressed audio data in the opposite direction, that is, movement of the compressed audio data written in the HDD 106 of the portable recording and playback unit 70 to the HDD 10 of the music server 50, however, can also be executed in accordance with similar processing to that shown in the flowchart of FIG. 9.

In that case, when the compressed audio data, which has been moved from the music server 50 to the portable recording and playback unit 70, is moved back from the unit 70 to the music server 50, the playback prohibit flag having been set to one of plural sets of the compressed audio data stored in the HDD 10, which has been moved back from the unit 70, is cleared in the music server 50. Clearing of the playback prohibit flag allows the compressed audio data existing in the music server 50 as the movement source to be reproduced again. On that occasion, the compressed audio data, which has been stored in the HDD 106 of the unit 70 and moved therefrom, is itself erased from the HDD 106. As an alternative, the management data for the compressed audio data, which has been moved from the HDD 106, is deleted from a management table of the HDD 106.

Figure 10:
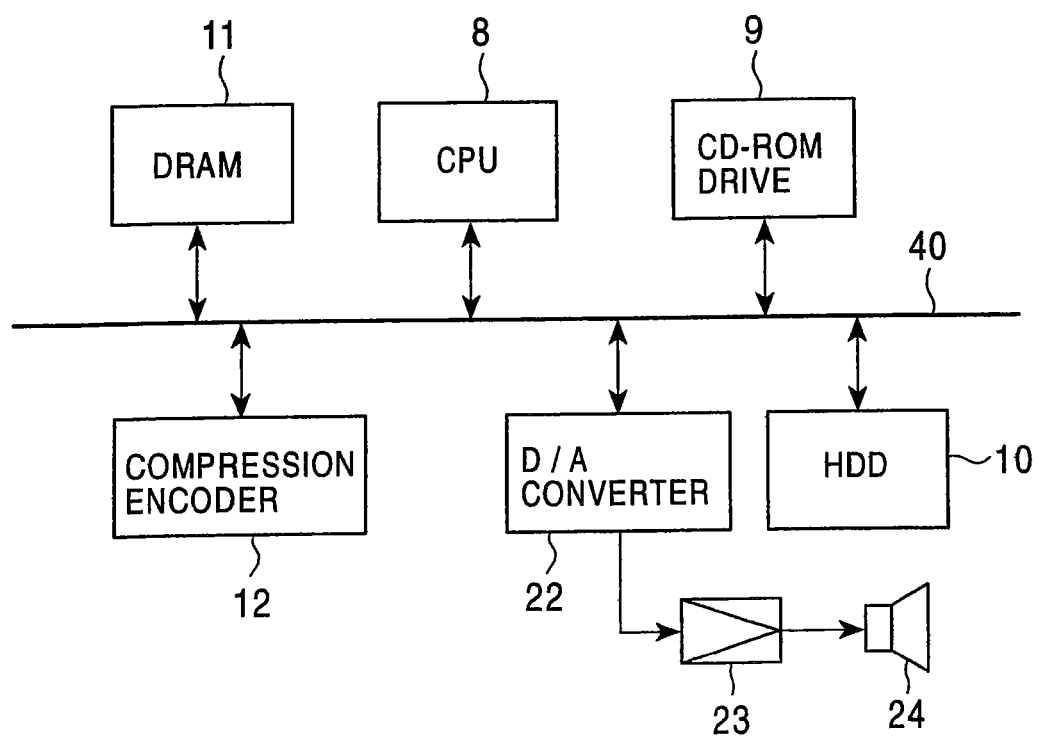
FIG. 10 is a block diagram showing a part of the entire construction of the music server which is required for performing high-rate writing from the CD into the hard disk drive (HDD) and playback of the CD.

In the present invention, playback of the CD 55 is performed in parallel with the above-described high-rate writing of the audio data from the CD 55 to the HDD 10. FIG. 10 shows a part of the entire construction shown in FIG. 2 which is required for performing the high-rate writing from the CD 55 to the HDD 10 and playback of the CD 55. Components in FIG. 10 corresponding to those in FIG. 2 are denoted by the same numerals and a detailed description thereof is not repeated here. By referring to FIG. 10, the high-rate writing from the CD 55 to the HDD 10 and direct playback of the CD 55 in the ordinary processing will be described separately.

Figure 11:
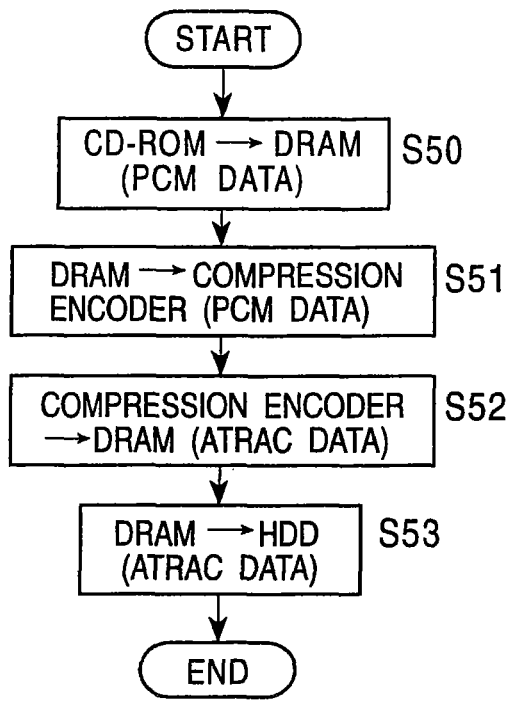
FIG. 11 is a flowchart showing a data flow in the high-rate writing process.

FIG. 11 is a flowchart showing a data flow in the high-rate writing process. First, the CD 55 is loaded in the CD-ROM drive 9, and the audio data recorded on the CD 55 is read at a predetermined rate two or more times as fast as the standard data rate prescribed for the CD 55. The read-out audio data is digital audio data according to PCM (Pulse Code Modulation). Hereinafter, this digital audio data will be referred to as PCM data. In the CD-ROM drive 9, the PCM data is read out of the CD 55 in units of frames (2368 bytes including a 16-byte header). Then, the read PCM data is supplied to the DRAM 11 via the bus 40 in step S50. The PCM data stored in the DRAM 11 is read in frame. At this time, the 16-byte header is extracted and the PCM data is read out of the DRAM 11 in units of 2352 bytes. The read-out PCM data is supplied to the compression encoder 12 via the bus 40 in step S51.

In this embodiment, the compression encoder 12 employs the ATRAC method for compression. The PCM data supplied to the compression encoder 12 is coded and compressed in accordance with the ATRAC method. Hereinafter, the data coded and compressed in accordance with the ATRA method will be referred to as ATRAC data.

The ATRAC data is outputted from the compression encoder 12 in units of blocks comprising 424 bytes and is supplied to the DRAM 11 via the bus 40 in step S52. When 77 blocks of the ATRAC data are accumulated in the DRAM 11, the accumulated data is outputted as a block of 32 kbytes as a whole after being added with a 120-byte header. This block is supplied to the HDD 10 from the DRAM 11 via the bus 40 and written in the HDD 10 in step S53.

Figure 12:
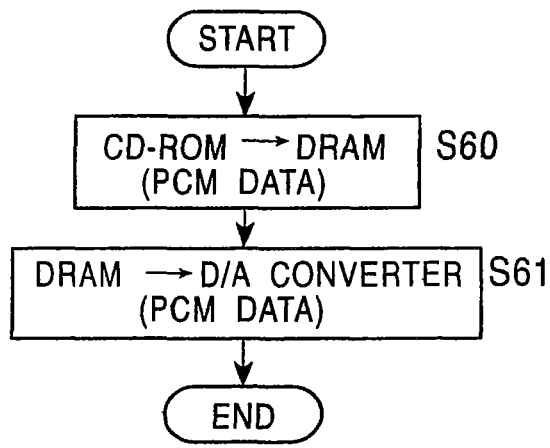
FIG. 12 is a flowchart showing a data flow in the processing for equi-rate playback of the CD.

FIG. 12 is a flowchart showing a data flow in the processing for equi-rate playback of the CD 55. First, the CD 55 is loaded in the CD-ROM drive 9, and the PCM data recorded on the CD 55 is read at the standard data rate prescribed for the CD 55 in step S60. The PCM data is read out of the CD 55 in frame units, that is, 2368 bytes including a 16-byte header. Then, the read-out PCM data is supplied in frame units to the D/A converter 22 via the bus 40 in step S61. Incidentally, since the PCM data recorded on the CD 55 is not subjected to the compression-coding process, the decompressing process by the compression decoder shown in FIG. 2 is not performed in this case.

The PCM data is converted by the D/A converter 22 into an analog audio signal and is reproduced as sounds through the speaker 24 after being amplified to a predetermined level by the amplifier 23.

In the above-described reproducing and writing processes, the present invention is intended to perform the high-rate writing into the HDD 10 and the reproduction at the equi-rate simultaneously. To this end, a large amount of the PCM data reproduced from the CD 55 for writing into the HDD 10 is stored in the DRAM 11 prior to the high-rate writing, and the stored PCM data is read in units of small amounts for playback. This method enables the CPU to access the other audio data of the CD 55.

The reproducing and writing processes executed when the high-rate writing into the HDD 10 is performed while effecting playback of the CD 55, will be first described in more detail with reference to flowcharts of FIGS. 13A, 13B and 14A, 14B. FIGS. 13A and 13B show the reproducing process. Specifically, FIG. 13A shows main processing of the playback process executed by the CPU 8, and FIG. 13B shows processing executed when an interrupt is caused in the main processing shown in FIG. 13A.

Referring to FIG. 13A, when the CD 55 is loaded in the CD-ROM drive 9 and the system is ready for writing the PCM data of the CD 55 in the HDD 10, the D/A converter 22 is first set to the playback mode in step S100, whereby the system is brought into a state capable of converting the supplied PCM data into an analog signal. In next step S101, a not-shown DMA (Direct Memory Access) controller for controlling the DRAM 11 for playback is set into an operation start state.

In step S102, the CD 55 is played back and a predetermined amount of the PCM data reproduced from the CD 55 is transmitted to the DRAM 11 and stored in a playback data area of the DRAM 11. Then, the PCM data is read out of the DRAM 11 and supplied to the D/A converter 22. In next step S103, the CPU 8 waits for an interrupt indicating that the PCM data stored in the DRAM 11 for playback has been all read out of the same. For example, the DRAM 11 is always monitored by a DMA controller for controlling the DMA, and an interrupt is generated to the CPU 8 when a free space of the playback data area exceeds a predetermined value.

Upon reaching step S103 where the CPU 8 waits for an interrupt, the process goes to a playback interrupt flow shown in FIG. 13B. When the DMA controller generates an interrupt to the CPU 8 in step S104 representing an interrupt standby state, the process goes to step S105 where it is determined whether the playback data from the CD 55 has run out. If not run out, the process goes to step S106 where a predetermined amount of the PCM data reproduced from the CD 55 is transferred to the DRAM 11 and stored in the playback data area prepared within the DRAM 11. Then, the PCM data stored in the DRAM 11 is read out of the DRAM 11 and supplied to the D/A converter 22.

The processing to write the PCM data reproduced from the CD 55 in the HDD 10 will be described with reference to FIGS. 14A and 14B. FIG. 14A shows main processing of the writing process executed by the CPU 8, and FIG. 14B shows processing executed when an interrupt is caused in the main processing shown in FIG. 14A. Referring to FIG. 14A, when the CD 55 is loaded in the CD-ROM drive 9 and the system is ready for writing the PCM data of the CD 55 in the HDD 10, the compression encoder 12 is first set to an operation start state in step S110, whereby the system is brought into a state capable of coding and compressing the supplied PCM data.

In next step S111, a not-shown DMA controller is set into an operation start state for transferring the ATRAC data, coded and compressed by the compression encoder 12, from the DRAM 11 to the HDD 10. Then, in step S112, another not-shown DMA is set into an operation start state for transferring the PCM data, reproduced from the CD 55 and stored in the DRAM 11, to the compression encoder 12 from the DRAM 11.

In next step S113, the CD 55 is played back and a predetermined amount of the PCM data reproduced from the CD 55 is transmitted to the DRAM 11 and stored in a write data area of the DRAM 11. Then, in step S114, the CPU 8 waits for an interrupt indicating that the PCM data stored in the DRAM 11 for recording has been all read out of the same. As described above, the DRAM 11 is always monitored by the DMA controller, and an interrupt is generated to the CPU 8 when a free space of the write data area exceeds a predetermined value.

Upon reaching step S114 where the CPU 8 waits for an interrupt, the process goes to a writing interrupt flow in FIG. 14B. When the DMA controller generates an interrupt to the CPU 8 in step S115 representing an interrupt standby state, the process goes to step S116 where it is determined whether the write data from the CD 55 has run out.

If it is found in step S116 to be not run out, the process goes to step S117. In step S117, a predetermined amount of the PCM data reproduced from the CD 55 is transferred to the DRAM 11 and stored in the write data area prepared, for example, within the DRAM 11. Then, the PCM data stored in the DRAM 11 is read out of the DRAM 11 and supplied to the compression encoder 12.

On the other hand, if it is determined in step S116 that the supply of the write data from the CD 55 has completely ended, the process goes to step S118 where the compression encoder 12 is set into an operation end state. The writing process from the CD 55 to the HDD 10 is thereby ended.

Additionally, the above-described playback interrupt process and writing interrupt process are set such that the playback interrupt process has higher priority than the writing interrupt process. Also, the main processing of the writing process shown in FIG. 14A is controlled to be started after the main processing of the playback process shown in FIG. 13A has entered the interrupt standby state.

Figure 15:
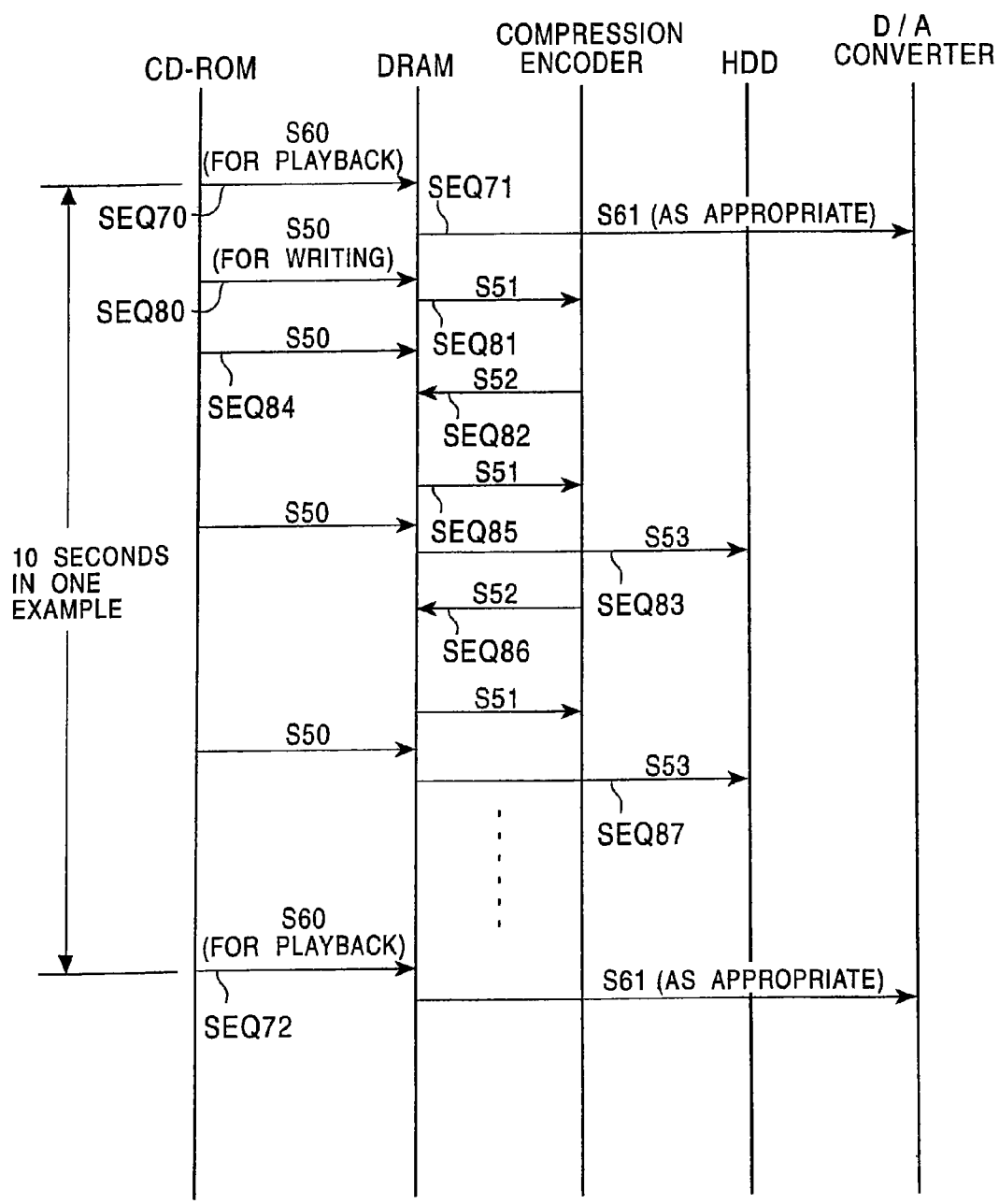
FIG. 15 is a sequence chart showing one example of how data flows in various components in more detail.

FIG. 15 is a sequence chart showing one example of data flows in various components in more detail. Sequences shown in FIG. 15 correspond respectively to steps S50-S53, S60 and S61 described above. First, the PCM data for playback is read out of the CD 55 by high-rate reproduction for 10 seconds and accumulated in the DRAM 11 (SEQ70). The PCM data accumulated in the DRAM 11 is read in small amounts. The read PCM data is supplied to the D/A converter 22 and reproduced to sounds after being converted into an analog signal (SEQ71). At the timing at which the PCM data accumulated in the DRAM 11 for 10 seconds has been all read, a next set of the PCM data is read out of the CD 55 (SEQ72).

FIG. 15 shows reading the data out of the DRAM 11 only one time in sequence SEQ71. In fact, however, the data is read out of the DRAM 11 several times at appropriate timing until sequence SEQ72. Reading of the PCM data out of the DRAM 11 for playback is performed with priority so that reproduced sounds will not break off. Additionally, the term "PCM data for 10 seconds" means the PCM data that lasts for a playback time of 10 seconds when reproduced to sounds.

During the period in which playback is performed in above sequences SEQ70 and SEQ71, processing to read the PCM data out of another location on the CD 55 and to write the read data in the HDD 10 is performed in parallel. After the PCM data has been read out of the CD 55 in above sequence SEQ70, the PCM data to be written in the HDD 10 is read out of the CD 55 by next sequence SEQ80. The read PCM data is sent to the compression encoder 22 in sequence SEQ81 for the compression-coding. The ATRAC data resulted from coding and compressing the PCM data is accumulated in the DRAM 11 in sequence SEQ82. When the ATRAC data of 32 kbytes including a predetermined header is accumulated in the DRAM 11, the accumulated ATRAC data is read out of the DRAM 11 and the read ATRAC data is sent to the HDD 10 for writing.

FIG. 15 is illustrated as executing sequence SEQ82 only one time corresponding to sequence SEQ81. In fact, however, since the ATRAC data is sent in units of 424 bytes from the compression encoder 22 to the DRAM 11 as described above, sequence SEQ82 is repeated 77 times.

On the other hand, when the PCM data accumulated in the DRAM 11 for writing in above sequence SEQ81 is all read, a next set of the PCM data subsequent to the PCM data, which has been read out of the CD 55 in above sequence SEQ80, is read out of the CD 55 in sequence SEQ84 and accumulated in the DRAM 11. When the compression-coding of the PCM data by the compression encoder 22 in above sequences SEQ81 and SEQ82 is ended, the PCM data having been accumulated in the DRAM 11 in sequence SEQ84 is sent to the compression encoder 22 (SEQ85). Then, the ATRAC data coded and compressed by the compression encoder 22 is accumulated in the DRAM 11 in sequence SEQ86. When a predetermined amount of the ATRAC data is accumulated in the DRAM 11, the accumulated ATRAC data is read out of the DRAM 11 and written in the HDD 10 in sequence SEQ87.

Also, when the PCM data accumulated in the DRAM 11 in sequence SEQ85 is sent to the compression encoder 22, a next set of the PCM data is read out of the CD 55 and accumulated in the DRAM 11 (SEQ88). When transfer of the ATRAC data from the compression encoder 22 to the DRAM 11 in sequence SEQ86 is ended, the PCM data accumulated in the DRAM 11 is sent from the DRAM 11 to the compression encoder 22.

By repeating the above-described sequences, it is possible to reproduce the PCM data read out of the CD 55, and at the same time to read the PCM data from another location on the CD 55 and write the read data in the HDD 10 after the compression-coding. These reproducing and writing processes can be automatically performed by executing the processes while confirming flags indicating that transmission of the respective data has been ended.

Figure 16:
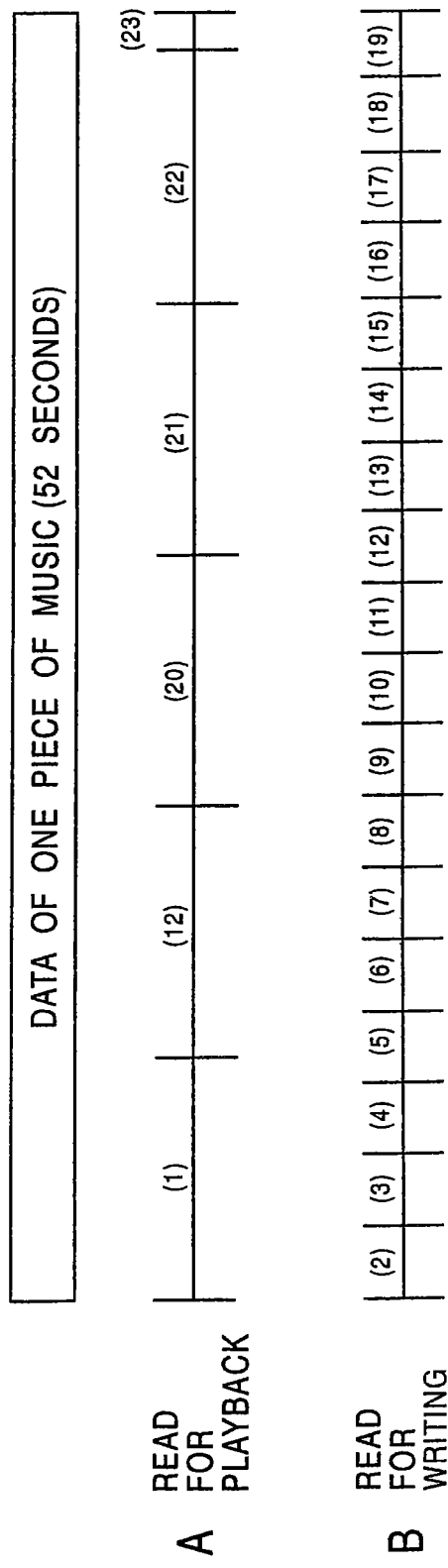
FIG. 16 is a diagram showing one example of data amounts read out of the CD in the reproducing and writing processes.

A description is now made of control of the CD-ROM drive 9 during the processing shown in FIG. 15. FIG. 16 shows one example of data amounts read out of the CD 55 by one read in the reproducing and writing processes. It is assumed that the playback time of one piece of music is 52 seconds and the compression-coding process can be executed 10 times during 10 seconds corresponding to one read for playback. The numbers assigned to respective sets of data shown in FIG. 16 represent one example of the order in which the sets of data are read.

The data of 52 seconds is read out of the CD 55 for playback in units of 10 seconds as indicated by the PCM data (1), (12), (20), (21) and (22) at A in FIG. 16. The data (23) represents the remaining data of 2 seconds. On the other hand, for writing into the HDD 10, the data is read out of the CD 55 in units of length corresponding a time required for the compression encoder 12 to execute the compression-coding process, as indicated by the PCM data (2)-(11) and (13)-(19) at B in FIG. 16.

Figure 17:
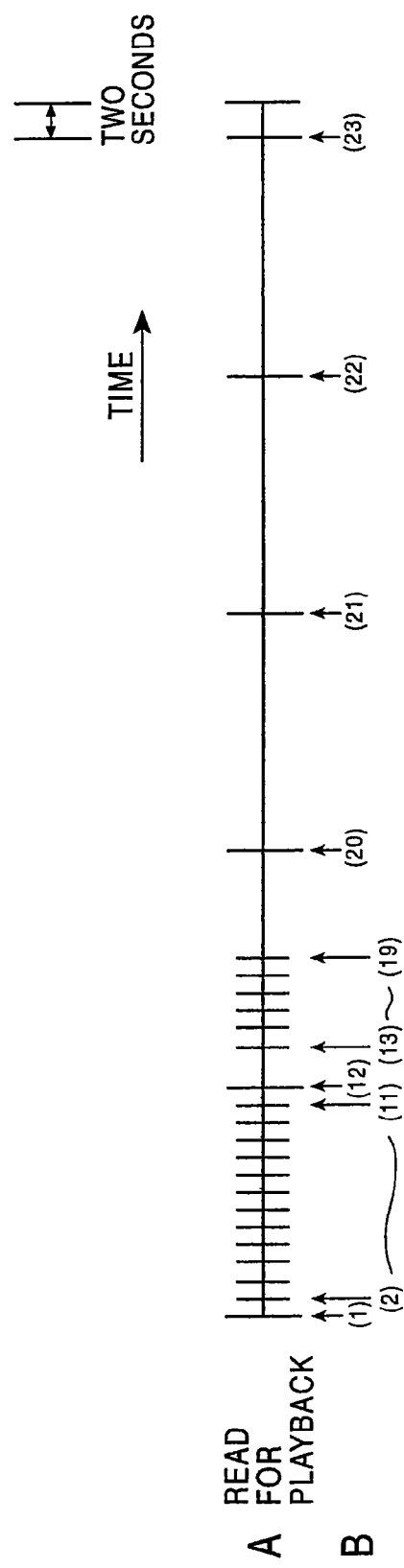
FIG. 17 is a diagram showing, on a time base, one example of reading of PCM data from the CD.

FIG. 17 shows, on the time base, one example of reading of the PCM data from the CD 55. As indicated by the numbers in FIG. 17 corresponding to those in FIG. 16, the PCM data (1) for playback is first read out of the CD 55 for 10 seconds and stored in the DRAM 11. While the PCM data (1) is being reproduced, the PCM data (2), (3), (4), . . . , (11) are intermittently read for writing into the HDD 10. The PCM data (2)-(11) are stored in the DRAM 11 whenever each set of data is read, and then written in the HDD 10 after being subjected to the compression-coding. Corresponding to the timing at which the reproduction of the PCM data (1) previously read for playback is ended, the PCM data (12) of next 10 seconds is read out of the CD 55 for subsequent playback.

In the above description, the PCM data of 10 seconds is stored in the DRAM 11 for playback. If the DRAM 11 has a sufficient capacity, however, a larger amount of the PCM data may be stored in the DRAM 11. Conversely, a smaller amount of the PCM data corresponding to 5 or 2 seconds, for example, may be stored in the DRAM 11.

Also, although the PCM data reproduced from the CD 55 is written in the HDD 10 in the above description, a recording medium as the writing source is not limited to the CD 55. By employing drive units adapted for respective recording media, a small-sized magneto-optical disk with a diameter of about 64 mm or a CD having a recording layer formed of dyes to be able to record data are also usable. Further, a semiconductor memory may be used as a writing source.

A first modification of the embodiment will be described below. In the above-described embodiment, the PCM data recorded on the CD 55 is stored in the HDD 10 while playback of the CD 55 is performed using the PCM data read out of the CD 55 directly as it is. In this first modification, the PCM data read out of the CD 55 is written in the HDD 10 after being subjected to the compression-coding, and the ATRAC data written in the HDD 10 is decoded for reproduction when playback of the CD 55 is to be performed in parallel with the writing into the HDD 10.

Figure 18:
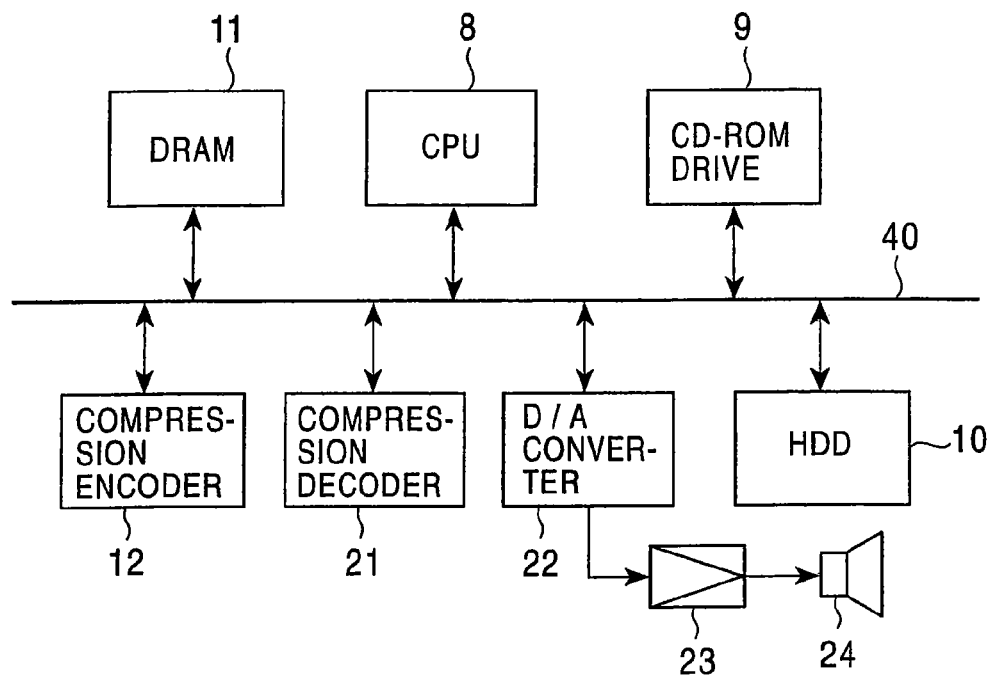
FIG. 18 is a block diagram showing one example of construction adaptable for a first modification.

For decoding the data that has been reproduced from the CD 55 and written in the HDD 10 after being subjected to the compression-coding, this first modification has a different data flow from the above-described embodiment. FIG. 18 shows one example of construction adaptable for the first modification. The compression decoder 21 is added to the construction of FIG. 10. Note that components in FIG. 18 corresponding to those in FIG. 10 are denoted by the same numerals and a detailed description thereof is not repeated here.

The high-rate writing into the HDD 10 is executed in the same manner as the above-described processing shown in FIG. 11, and therefore the high-rate writing process is not described here.

Figure 19:
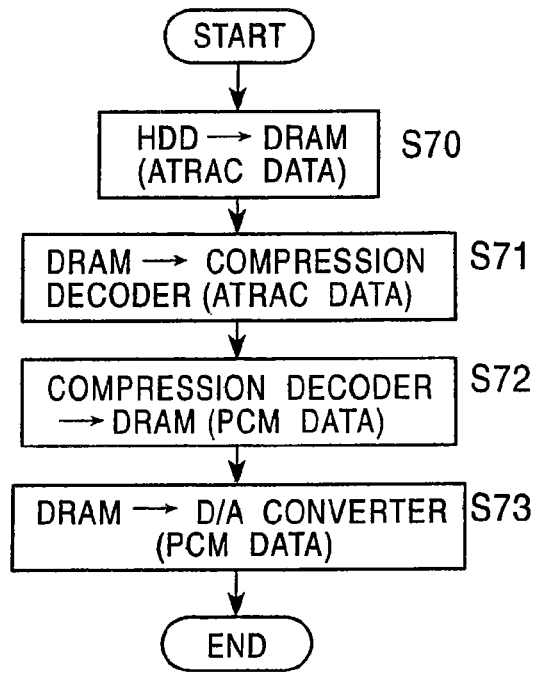
FIG. 19 is a flowchart for explaining one example of a data flow in the reproducing process executed during high-rate writing into the HDD according to the first modification.

A data flow in the reproducing process executed in parallel with the high-rate writing into the HDD 10 will be described below with reference to a flowchart of FIG. 19. First, the ATRAC data written in the HDD 10 is read out of the HDD 10 in units of 32 kbytes and stored in the DRAM 11 step S70. Then, the ATRAC data stored in the DRAM 11 is read out of the DRAM 11 in units of 424 bytes and supplied to the compression decoder 21 (step S71). Subsequently, the PCM data resulted from decoding of the ATRAC data by the compression decoder 21 is stored in the DRAM 11 in units of 2352 bytes in step S72. The PCM data is read out of the DRAM 11 in units of 2352 bytes and supplied to the D/A converter 22 for conversion into an analog audio signal in step S73.

Figure 20:
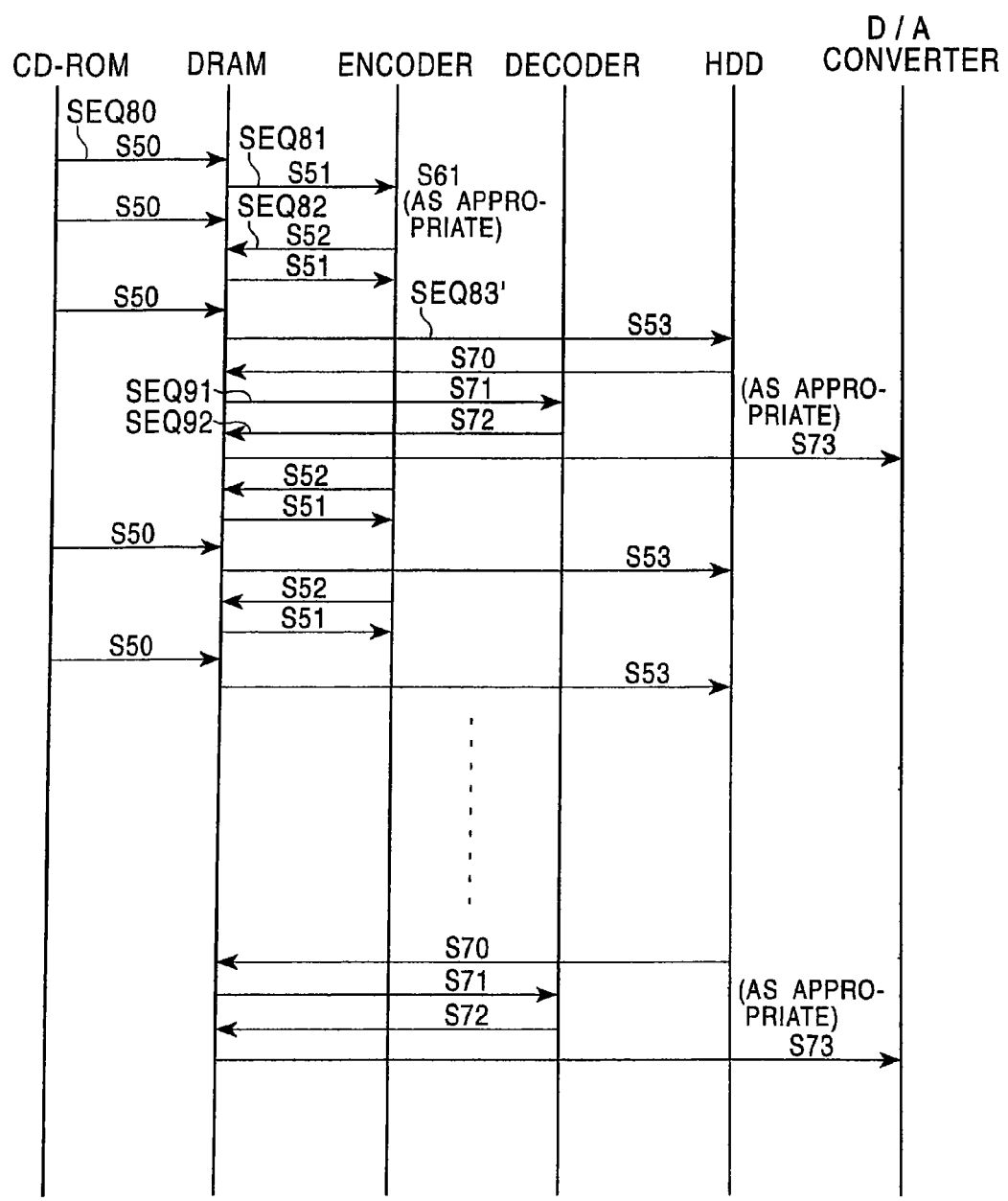
FIG. 20 is a sequence chart showing one example of data flows in various components in more detail according to the first modification.

FIG. 20 is a sequence chart showing one example of data flows in various components of the first modification in more detail. Sequences shown in FIG. 20 correspond respectively to steps S50-S53 and S70-S73 described above. In this first modification, the processing to reproduce the PCM data from the CD 55 at a high data rate and write the reproduced PCM data in the HDD 10 after the compression-coding thereof is executed in the same manner as the above-described one shown in FIG. 15.

The reproducing process in parallel with the writing into the HDD 10 is executed in this first modification as follows.

The reproducing process is started after the PCM data reproduced from the CD 55 by first sequence SEQ80 has been subjected to the compression-coding and the resulting compressed data has been written in the HDD 10 in sequence SEQ83'. After sequence SEQ83', the ATRAC data written in the HDD 10 is read in sequence SEQ90 and stored in the DRAM 11. The ATRAC data stored in the DRAM 11 is read in sequence SEQ91 and supplied to the compression decoder 21. The ATRAC data supplied to compression decoder 21 is decoded into PCM data which is then stored in the DRAM 11 in sequence SEQ92. The PCM data stored in the DRAM 11 is read at appropriate timing in sequence SEQ93 and supplied to the D/A converter 22.

In the above sequences, the processing of the sequence SEQ93 (step S73) is set to have top priority so that reproduced sounds will not break off. To this end, when the PCM data stored in the DRAM 11 to be read for step S73 has become smaller than a predetermined amount, the processing of steps S70-S72 is executed upon an interrupt generated during the writing process of steps S50-S53.

A second modification of the embodiment will be described below. In this second modification, audio data is provided as having been subjected to the compression-coding in advance and recorded on a recording or storage medium such as a CD-ROM, and the audio data is read out of the CD-ROM for writing into the HDD 10. In the following description, it is assumed that the audio data recorded on the CD-ROM is coded and compressed using the compression-coding method in accordance with Layer 3 of the MPEG 1 (Moving Picture Experts Group 1), hereinafter referred to as MP3. In other words, audio data, hereinafter referred to as MP3 data, having been coded and compressed in accordance with MP3 beforehand is recorded on a CD-ROM, for example, and then supplied to the user. The user can obtain an analog audio signal through steps of decoding the MP3 data read out of a CD-ROM into PCM data and D/A-converting the PCM data into an analog audio signal.

Figure 21:
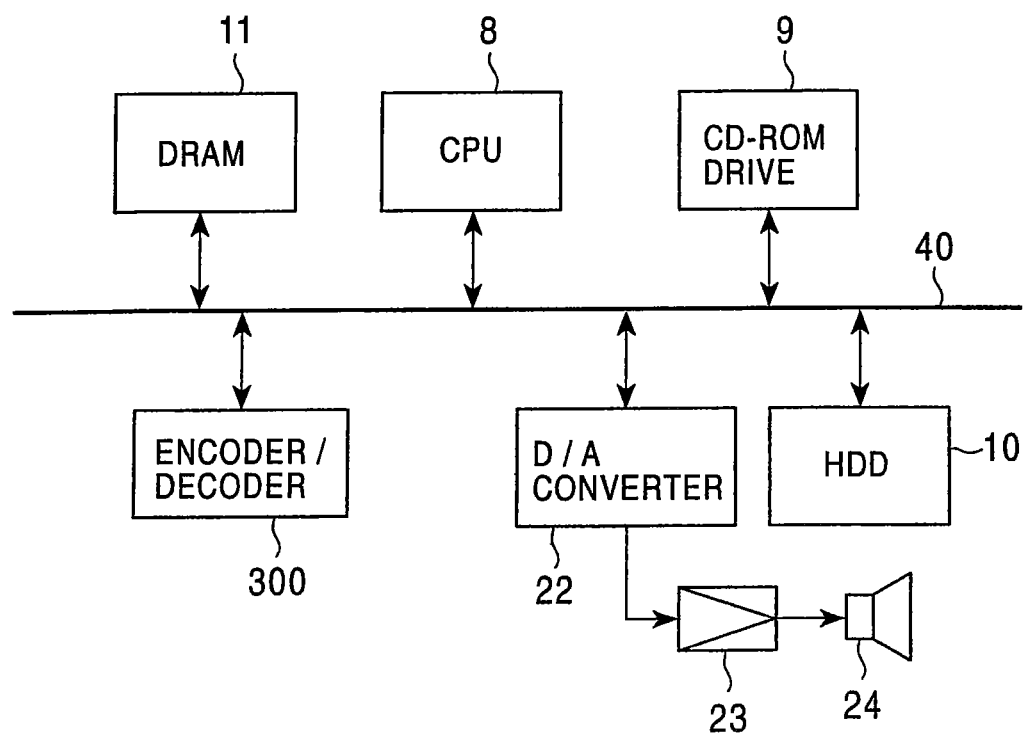
FIG. 21 is a block diagram showing one example of construction adaptable for a second modification.

FIG. 21 shows one example of construction adaptable for the second modification. This construction differs from the construction of FIG. 10 in that an encoder/decoder 300 for decoding the MP3 data and for coding and compressing the PCM data in accordance with the ATRAC method is employed instead of the compression decoder 21 for performing the decoding process in accordance with the ATRAC method. Note that components in FIG. 21 corresponding to those in FIG. 10 are denoted by the same numerals and a detailed description thereof is not repeated here.

Figure 22:
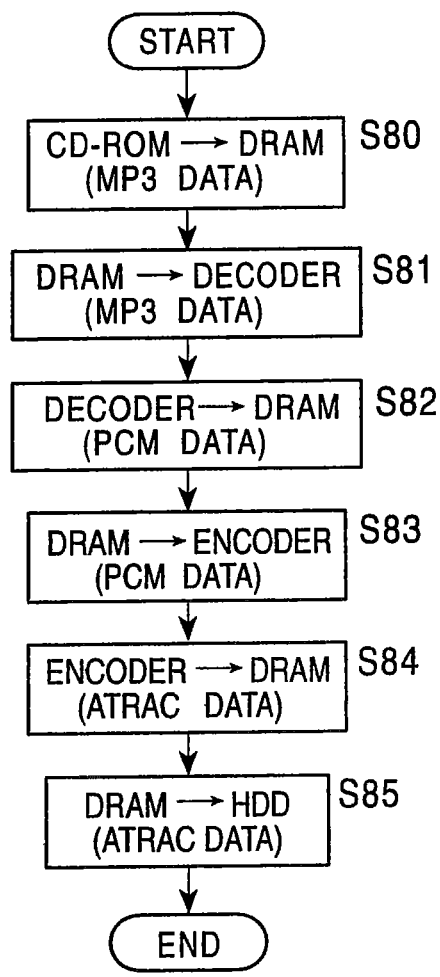
FIG. 22 is a flowchart showing one example of a data flow in the writing process according to the second modification.

FIG. 22 is a flowchart showing one example of a data flow in the writing process. First, a CD-ROM including MP3 data recorded thereon is loaded in the CD-ROM drive 9, and the MP3 data recorded on the CD-ROM is read. Then, the read MP3 data is supplied to the DRAM 11 via the bus 40 and stored in the DRAM 11 in step S80. The MP3 data is read out of the DRAM 11 and supplied to the encoder/decoder 300 in step S81.

PCM data resulted from decoding of the MP3 data by the encoder/decoder 300 is supplied to the DRAM 11 in step S82. The PCM data read out of the DRAM 11 is supplied to the encoder/decoder 300 again in step S83 for compression-coding into ATRAC data. The ATRAC data is supplied from the encoder/decoder 300 to the DRAM 11 in step S84. The ATRAC data read out of the DRAM 11 is written in the HDD 10 in units of 32 kbytes in step S85.

Figure 23:
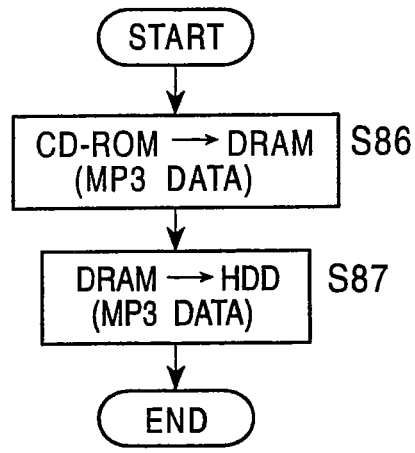
FIG. 23 is a flowchart showing one example of a data flow when MP3 data read out of a CD-ROM is directly written in the HDD without being subjected to decoding and compression-coding in accordance with the ATRAC method.

As an alternative, the MP3 data read out of the CD-ROM may be directly written in the HDD 10 without being subjected to decoding and compression-coding in accordance with the ATRAC method. In this case, as shown in FIG. 23 by way of example, the MP3 data read out of the CD-ROM is supplied to the DRAM 11 in step S86, and when the MP3 data of 32 kbytes is accumulated in the DRAM 11, the MP3 data is read out of the DRAM 11 and written in the HDD 10 in step S87.

Figure 24:
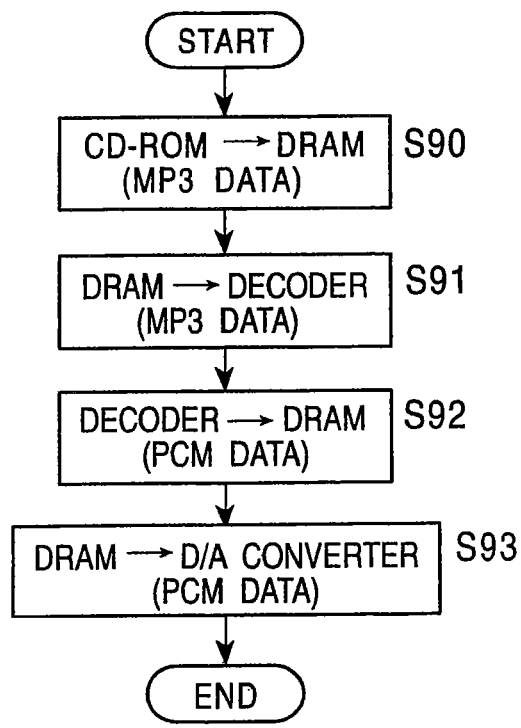
FIG. 24 is a flowchart showing a data flow in the reproducing process of the MP3 data recorded on the CD-ROM.

FIG. 24 is a flowchart showing a data flow in the reproducing process of the MP3 data recorded on the CD-ROM. First, the MP3 data recorded on the CD-ROM is read out of the CD-ROM and stored in the DRAM 11 in step S90. Then, the MP3 data stored in the DRAM 11 is read therefrom and supplied to the encoder/decoder 300 in step S91. PCM data resulted from decoding of the MP3 data by the encoder/decoder 300 is stored in the DRAM 11 in step S92. The PCM data read out of the DRAM 11 is supplied to the D/A converter 22 for conversion into an analog audio signal in step S93.

Figure 25:
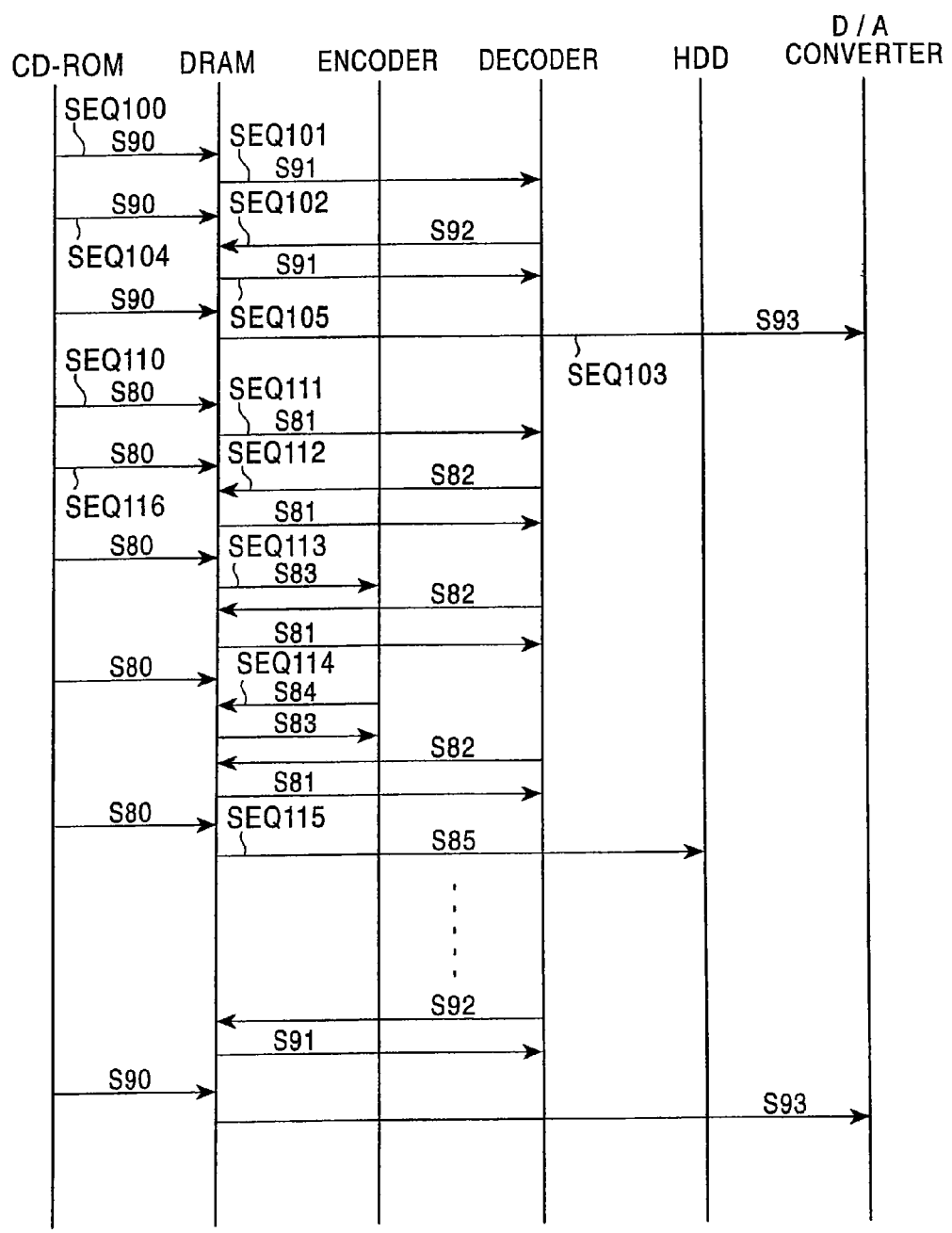
FIG. 25 is a sequence chart showing one example of how data flows in various components in more detail according to the second modification.

FIG. 25 is a sequence chart showing one example of data flows in various components in more detail according to the second modification. FIG. 25 represents the case where the MP3 data recorded on a CD-ROM is decoded into PCM data, and the PCM data is coded and compressed in accordance with the ATRAC method for writing into the HDD 10. Accordingly, sequences shown in FIG. 25 correspond respectively to steps S80-S85 and S90-S93 described above. Further, in FIG. 25, the encoder/decoder 300 is shown as being separated into an encoder and a decoder for the sake of convenience.

In the reproducing process, the MP3 data read out of the CD-ROM is stored in the DRAM 11 in sequence SEQ100. The MP3 data is read out of the DRAM 11 and supplied to the decoder in sequence SEQ101. The PCM data resulted from decoding of the MP3 data by the decoder is stored in the DRAM 11 in sequence SEQ102. When a predetermined amount of the PCM data is stored in the DRAM 11, the PCM data is read out of the DRAM 11 and supplied to the D/A converter 22 in sequence SEQ103. This sequence SEQ103 is executed at appropriate timing so that reproduced sounds will not break off.

When the MP3 data stored in the DRAM 11 is all read in above sequence SEQ101, a next set of the MP3 data is read out of the CD-ROM and stored in the DRAM 11 in sequence SEQ104. After the end of the decoding process by the decoder in above sequence SEQ102, the read MP3 data is supplied to the decoder in sequence SEQ105.

In the writing process, when the PCM data is supplied to the D/A converter 22 and reproduction into an analog audio signal is started in above sequence SEQ103, the MP3 data read out of the CD-ROM is stored in the DRAM 11 in sequence SEQ110. Then, the MP3 data stored in the DRAM 11 is read and supplied to the decoder for decoding into PCM data in sequence SEQ111. The PCM data resulted from decoding of the MP3 data is stored in the DRAM 11 in sequence SEQ112. The stored PCM data is read out of the DRAM 11 and supplied to the encoder in sequence SEQ113. The read-out PCM data is coded and compressed into ATRAC data by the encoder and stored in the DRAM 11 in sequence SEQ114. Then, the ATRAC data stored in the DRAM 11 is read out of the DRAM 11 and written in the HDD 10 in sequence SEQ115.

When the MP3 data stored in the DRAM 11 is all read in sequence SEQ111, a next set of the MP3 data is read out of the CD-ROM and stored in the DRAM 11 in sequence SEQ116. Thereafter, a next series of process sequences are executed in a similar manner subsequent to the end of a previous series of process sequences.

In the above sequences, the processing of the sequence 103 (step S93) is set to have top priority so that reproduced sounds will not break off. To this end, when the MP3 data stored in the DRAM 11 to be read for step S93 has become smaller than a predetermined amount, the processing of steps S90-S92 is executed upon an interrupt generated during the writing process of steps S80-S85.

In the above description, the present invention is applied to the music server 50. The present invention is not limited to such an application, however, but also applicable to portable recording and playback units. For example, the portable recording and playback unit 170 shown in FIG. 6 is employed as one example of portable recording and playback units, and when high-rate writing from the CD 55 is performed in the music server 50, the contact terminal 200b is selected in the switch circuit 200 of the portable recording and playback unit 170 connected to the music server 50. The audio data read out of the CD 55 and being subjected to the compression-coding is thus written in the HDD/flash RAM 106a through the interfaces 34, 35 and the switch circuit 200. The user can also enjoy sounds reproduced from the CD 55 while the audio data is transferred from the music server 50 to the portable recording and playback unit 70.

Further, in the above description, the audio data is written in the HDD 10 using one kind of compression-coding in any of the embodiment, the first modification and the second modification. The present invention is not limited to such an example, however, and a plurality of different compression-coding methods may be optionally selected. Specifically, plural types of compression encoders and compression decoders are provided in the music server 50 to be adapted for plural kinds of compression-coding methods so that a desired one may be selected from among those compression-coding methods. Then, when the audio data is written in the HDD 10, the audio data is coded and compressed in accordance with the selected compression-coding method. In this case, a flag representing the selected compression-coding method is recorded in a predetermined area of the HDD 10 in association with the audio data written in the HDD 10 after being subjected to the compression-coding.

In the reproducing process, the compression-coding method employed in the writing process is automatically determined based on the flag set in association with the data to be reproduced, and the corresponding compression decoder is selected for decoding of the data.

Figure 26:
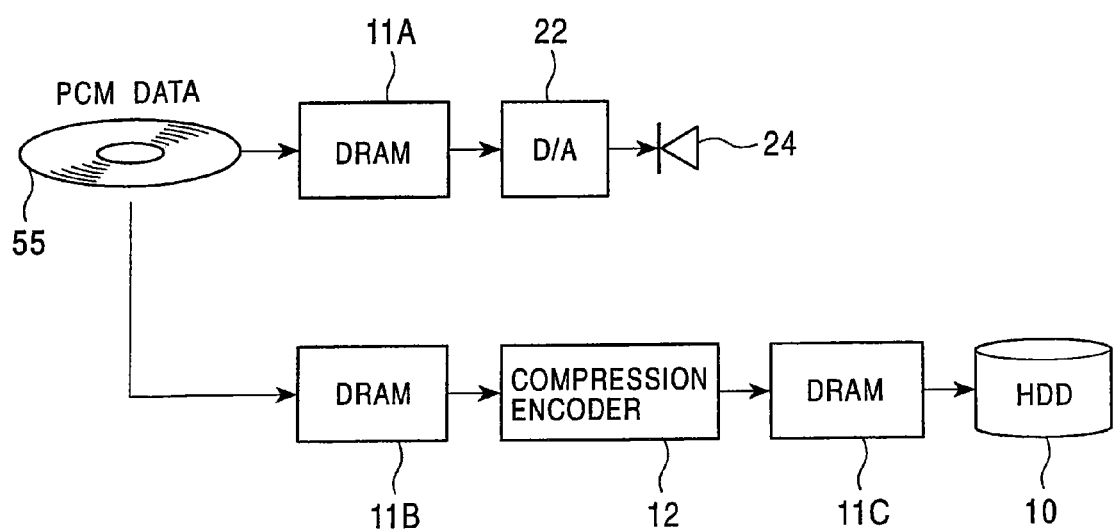
FIG. 26 is a functional block diagram of the music server of the embodiment, showing primarily a signal flow.
Figure 27:
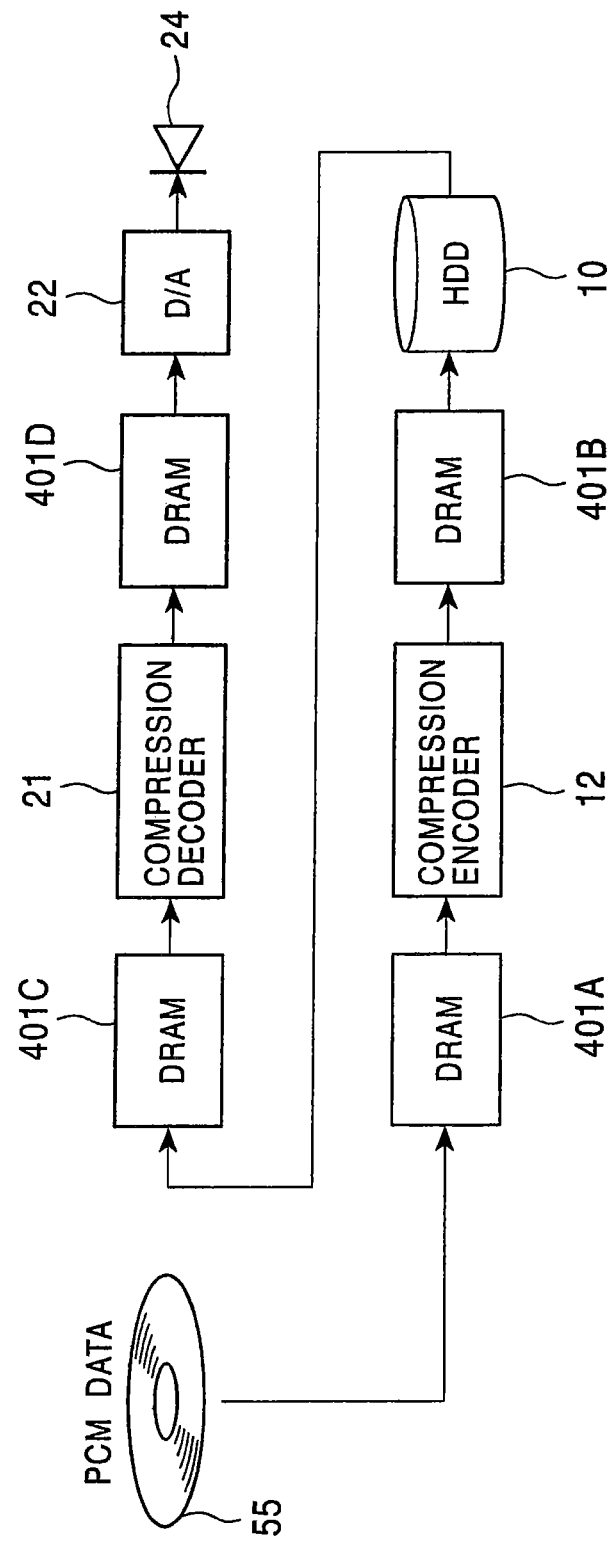
FIG. 27 is a functional block diagram of a music server according to the first modification of the embodiment, showing primarily a signal flow by way of example.
Figure 28:
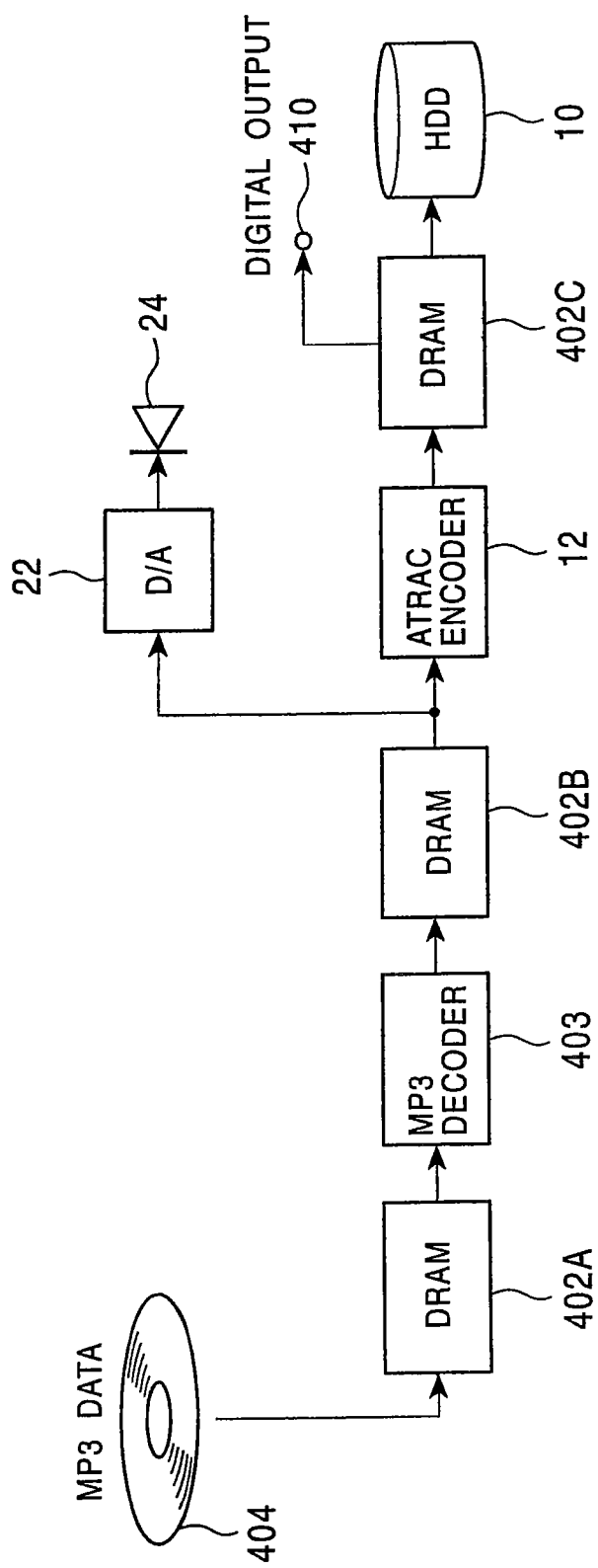
FIG. 28 is a functional block diagram of the music server according to the second modification of the embodiment, showing primarily a signal flow by way of example.
Figure 29:
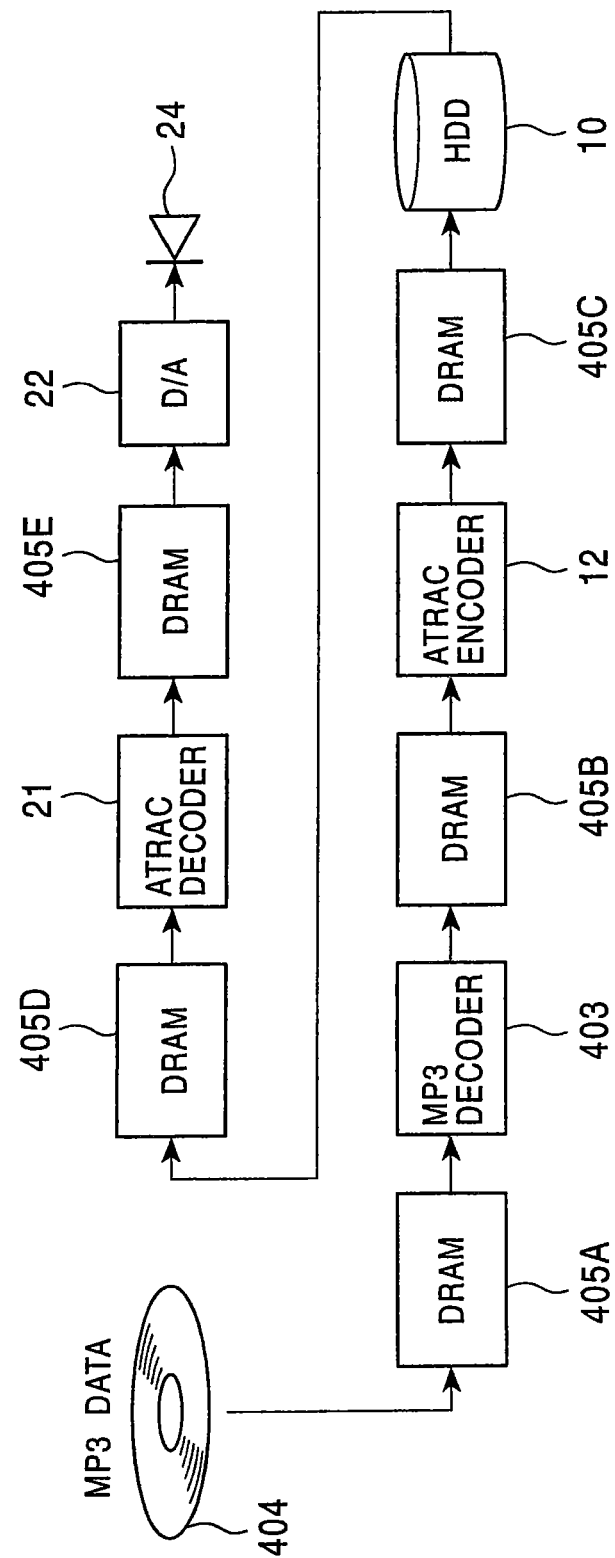
FIG. 29 is a functional block diagram of a music server according to a third modification of the embodiment, showing primarily a signal flow by way of example.
Figure 30:
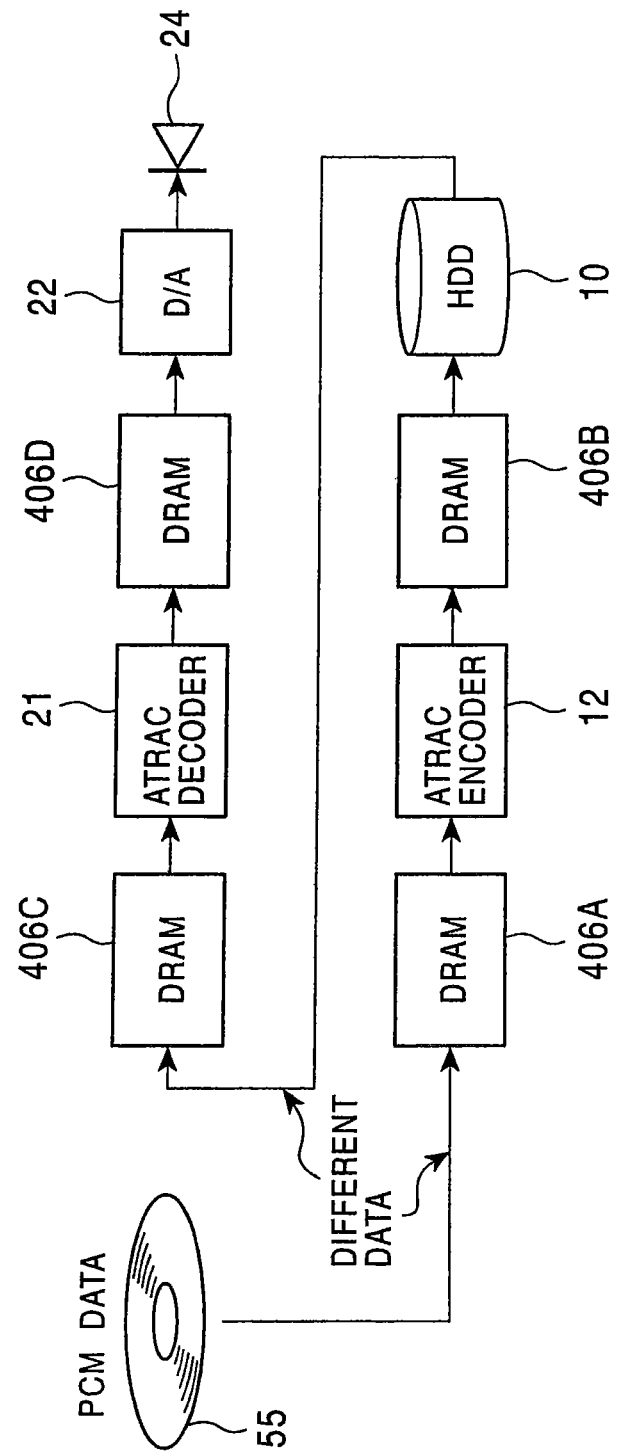
FIG. 30 is a functional block diagram of a music server according to a fourth modification of the embodiment, showing primarily a signal flow by way of example.
Figure 31:
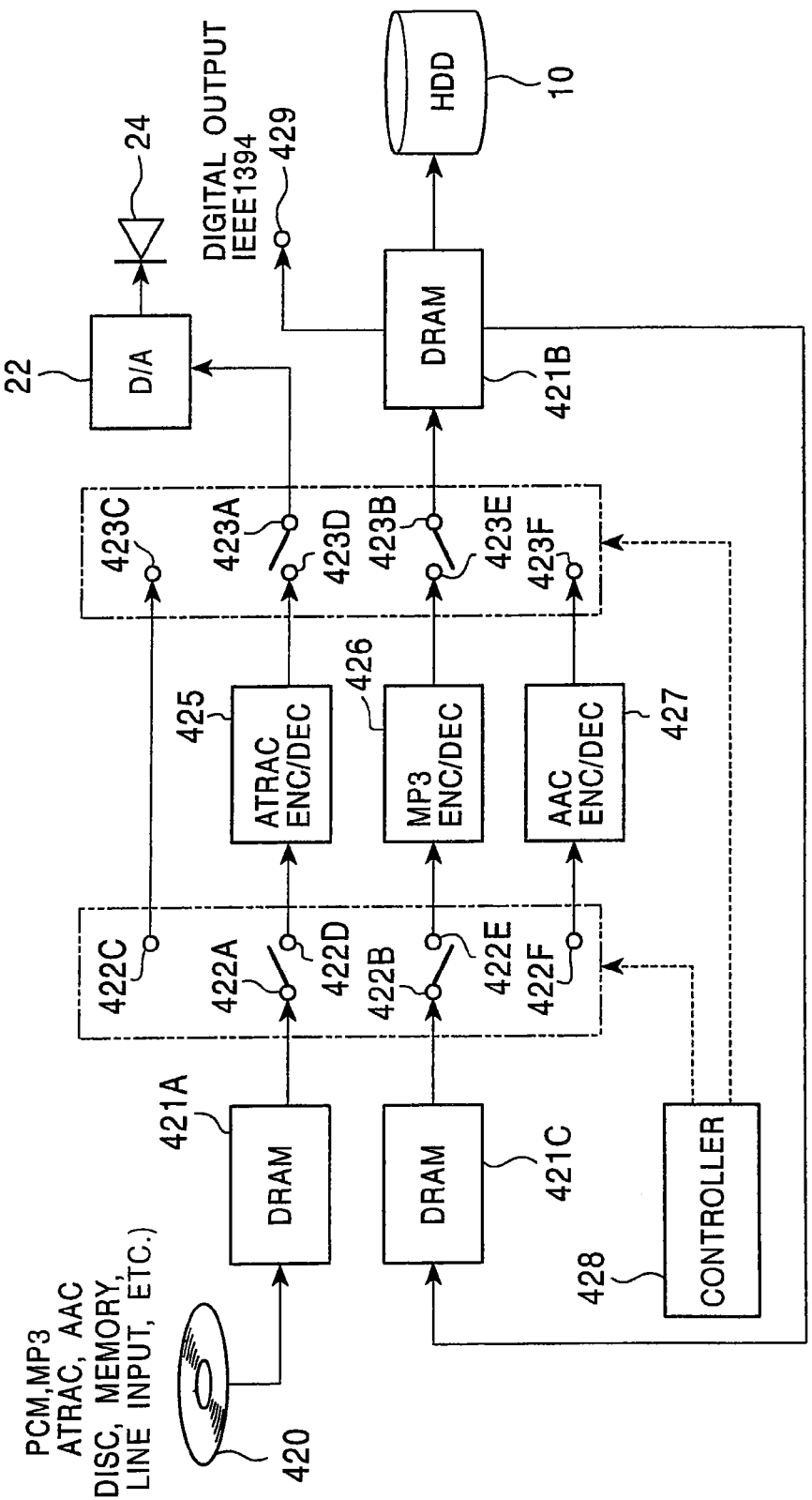
FIG. 31 is a functional block diagram of a music server according to a fifth modification of the embodiment, showing primarily a signal flow by way of example.

Next, a description will be made of the foregoing embodiment and the first and second modifications thereof with reference to the drawings written over so as to more clearly represent a signal flow. Further, a description will be made of third, fourth and fifth modifications of the foregoing embodiment. FIGS. 26, 27 and 28 are functional block diagrams of the foregoing embodiment and the first and second modifications thereof, each diagram showing primarily signal flows. Also, FIGS. 29, 30 and 31 are functional block diagrams of the third, fourth and fifth modifications of the foregoing embodiment, each diagram showing primarily a signal flow.

FIG. 26 is a functional block diagram of the music server of the embodiment, showing primarily a signal flow. FIG. 26 corresponds to FIG. 10. As also described above, PCM data read out of the CD 55 at a high bit rate in amount corresponding to a playback time of several seconds, for example, is accumulated in a DRAM 11A. The accumulated PCM data is read out of the DRAM 11A in units of blocks prescribed for the CD 55, and is converted into an analog audio signal by the D/A converter 22. Sounds are then reproduced by the speaker 24 through the amplifier 23, not shown in FIG. 26.

On the other hand, during the period from a previous read of the PCM data for playback from the CD 55 as described above to a next read for playback, reading of the PCM data for writing is performed under predetermined address control and the read PCM data is accumulated in a DRAM 11B. The PCM data accumulated in the DRAM 11B is read out little by little corresponding to the bit rate of the compressing process in the compression encoder 12. It is here assumed that the compression encoder 12 codes and compresses the PCM data in accordance with the ATRAC method. The compressed audio data having been subjected to the compression-coding in the compression encoder 12 is accumulated in a DRAM 11C. When a predetermined amount of the compressed audio data corresponding to the data write unit set for the HDD 10 is accumulated in the DRAM 11C, the compressed audio data corresponding to the data write unit set for the HDD 10 is read out of the DRAM 11C and written in the HDD 10.

The DRAMs 11A, 11B and 11C may be allocated as different areas of one DRAM 11.

In practice, the CD-ROM drive 9, not shown in FIG. 26, for playing back the CD 55, the DRAMs 11A, 11B and 11C, the compression encoder 12, the D/A converter 22, and the HDD 10 are connected to one data bus. This data bus is connected through a bridge circuit to a control bus to which the CPU 8, not shown in FIG. 26, is connected. A DMA controller is provided in each of the CD-ROM drive 9, the compression encoder 12, the D/A converter 22, and the HDD 10.

The data-bus usage right is acquired by any of the respective DMAs in the CD-ROM drive 9, the compression encoder 12, the D/A converter 22, and the HDD 10, the DMAs being controlled by the CPU so as to synchronize with each other under the task management of a real time OS (Operating System) described later. Based on the task management, though described later in detail, the write and read timings of the DRAMs 11A, 11B and 11C and the HDD 10, as well as the timings of other processing, are controlled.

The DRAMs 11A, 11B and 11C are each made up of two banks such that when one of the two banks is in a write enable state, the other is in a read enable state. Thus, each DRAM can perform write and read in parallel. The two banks are used under the task management in synchronous relation to each other with the aid of status flags indicating Full and Empty states. As a result, the switch timing between the two banks in each of the DRAMs 11A, 11B and 11C, and the timings of reading and writing data from and in each DRAM are controlled in a predetermined manner.

For example, while data is written in one bank of the DRAM 11A, data can be read out of the other bank. When the writing in the one bank or reading from the other bank is ended, both the banks are switched over under predetermined timing control so that next data is written in the other bank and the data in the one bank is read out.

Note that the bus configuration and the scheme of the task management, described above, are in common with the music servers shown in FIGS. 26 to 31.

FIG. 27 is a functional block diagram of the music server according to the first modification of the embodiment, showing primarily a signal flow by way of example. FIG. 27 corresponds to FIG. 18. In the first modification, PCM data read out of the CD 55 at a high bit rate is written in the HDD after being subjected to compression-coding. In parallel with the writing, the compressed audio data written in the HDD is decompressed to obtain a playback output.

More specifically, PCM data read out of the CD 55 at a high bit rate is accumulated in a DRAM 401A. The accumulated PCM data is read out of the DRAM 401A depending on the data processing unit set for the compression encoder 12, and is supplied to the compression encoder 12 for coding and compressing the PCM data by the ATRAC method, for example. The PCM data is coded and compressed in the compression encoder 12, and resulting compressed audio data is outputted and accumulated in a DRAM 401B. When a predetermined amount of the compressed audio data corresponding to the data write unit set for the HDD 10 is accumulated in the DRAM 401B, the compressed audio data is read out and supplied to the HDD 10 for writing therein.

On the other hand, the compressed audio data written in the HDD 10 through the above-described writing process is read out of the HDD 10 in parallel with the writing process. For example, during the period in which the compressed audio data is accumulated in the DRAM 401B in amount corresponding to the data write unit set for the HDD 10, the compressed audio data is read out of the HDD 10. The compressed audio data read out of the HDD 10 is accumulated in a DRAM 401C. The compressed audio data accumulated in the DRAM 401C is read out in units of amount corresponding to the data processing unit set for the compression decoder 21, and is supplied to the compression decoder 21.

The compressed audio data supplied to the compression decoder 21 is decompressed and outputted as PCM data. The PCM data outputted from the compression decoder 21 is accumulated in a DRAM 401D. The PCM data accumulated in the DRAM 401D is read out at a predetermined bit rate corresponding to the conversion bit rate of the D/A converter 22. The read-out PCM data is converted into an analog audio signal by the D/A converter 22 and reproduced as sounds through the speaker 24.

As with the example of FIG. 26, the DRAMs 401A-401D are each made up of two banks such that reading of data from one bank and writing of data in the other bank are executed in parallel with each other. The timings of reading and writing data from and in the CD-ROM drive 9, the HDD 10 and the DRAMs 401A-401D are controlled in a predetermined manner under the task management synchronized among the respective DMAs provided in those components. As a result, the compressed audio data is written in the HDD 10 in a predetermined manner while ensuring that the analog audio signal outputted from the D/A converter 22 will not break off. The DRAMs 401A-401D may be allocated as different areas of one DRAM 401 or constituted by four separate DRAMs.

FIG. 28 is a functional block diagram of the music server according to the second modification of the embodiment, showing primarily a signal flow by way of example. FIG. 28 corresponds to FIG. 21. In the second modification, compressed audio data inputted in the format coded and compressed by a first compression-coding method is decompressed and reproduced. Also, the decompressed PCM data is compressed by a second compression-coding method and written in the HDD 10.

It is assumed, for example, that the first compression-coding method is MP3 and the second compression-coding method is ATRAC. For the sake of brevity, in the following description, the compression encoder 12 for coding and compressing PCM data by the ATRAC method is called the ATRAC encoder 12 and the compression decoder 21 for decompressing the compressed PCM data by the same method is called the ATRAC decoder 21. Similarly, an encoder for coding and compressing data by the MP3 method is called an MP3 encoder and a decoder for decompressing the compressed data by the same method is called an MP3 decoder.

Audio data coded and compressed by the MP3 method (referred to as MP3 data hereinafter) is supplied in the form recorded on, e.g., a CD-ROM 404. The MP3 data read out of the CD-ROM 404 is accumulated in a DRAM 402A. When the MP3 data is accumulated in the DRAM 402A in amount corresponding to the data processing unit set for a MP3 decoder 403, the MP3 data accumulated in the DRAM 402A is read out and supplied to the MP3 decoder 403. The MP3 data is decompressed by the MP3 decoder 403 and outputted as PCM data, which is then accumulated in a DRAM 402B.

When the PCM data is accumulated in the DRAM 402B in amount corresponding to the data processing unit set for the ATRAC encoder 12, the accumulated PCM data is read out of the DRAM 402B and supplied to the ATRAC encoder 12. The PCM data is coded and compressed by the ATRAC encoder 12, and resulting ATRAC data is accumulated in a DRAM 402C. When a predetermined amount of the ATRAC data corresponding to the data write unit set for the HDD 10 is accumulated in the DRAM 402C, the accumulated data is read out and supplied to the HDD 10 for writing therein.

On the other hand, the PCM data accumulated in the DRAM 402B is also read out in parallel with the above writing process. The read PCM data is supplied to the D/A converter 22 for conversion into an analog audio signal, and reproduced as sounds by the speaker 24, for example, through the amplifier 23, not shown in FIG. 28.

As with the examples of FIGS. 26 and 27, the DRAMs 402A-402C are each made up of two banks. In the DRAM 402B, for example, while one bank is set to a state of reading data out of it, the other bank is set to a write enable state. The PCM data supplied from the MP3 decoder 403 is accumulated in one bank of the DRAM 402B. In parallel, from the other bank of the DRAM 402B, the PCM data is read in units of amount corresponding to the data processing unit set for the ATRAC encoder 12 and is supplied to the ATRAC encoder 12.

Also, the CD-ROM drive 9, not shown in FIG. 28, is address-controlled in a predetermined manner to read out a part of the MP3 data, which is recorded on the CD-ROM 404 and used for playback. The read-out MP3 data is processed through the DRAM 402A and the MP3 decoder 403 in the predetermined manner, and resulting PCM data is accumulated in the other bank of the DRAM 402B. The PCM data accumulated in the other bank is read out and supplied to the D/A converter 22, while the PCM data for writing is accumulated in one bank of the DRAM 402B.

The PCM data for writing is read out of the DRAM 402B and supplied to the ATRAC encoder 12 as described above. Then, The PCM data is coded and compressed by the ATRAC encoder 12, and resulting ATRAC data is accumulated in the DRAM 402C. When the ATRAC data is accumulated in the DRAM 402C corresponding to the data write unit set for the HDD 10, the accumulated ATRAC data is read out of the DRAM 402C in amount corresponding to the data write unit set for the HDD 10 and is written in the HDD 10.

In the second modification, read control from the CD-ROM 404 in the CD-ROM drive 9, control of the DRAMs 402A-402C, and write/read control of the HDD 10 are carried out with predetermined timing control under the task management synchronized among the respective DMAs provided in those components. As a result, the reproducing and writing processes are performed as described above. It is thus possible to convert MP3 data read out of the CD-ROM 404 into ATRAC data and write the ATRAC data in the HDD 10, while processing MP3 data read out of the CD-ROM 404 for playback.

Additionally, in the second embodiment, the ATRAC data accumulated in the DRAM 402C is introduced to an output terminal 410 for direct outputting to the exterior.

FIG. 29 is a functional block diagram of the music server according to the third modification of the embodiment, showing primarily a signal flow by way of example. In the third modification, compressed audio data inputted in the format coded and compressed by a first compression-coding method is decompressed. The decompressed PCM data is coded and compressed by a second compression-coding method, and then written in the HDD 10. In parallel with the above writing process, the compressed audio data written in the HDD 10 is read and decompressed for playback.

It is assumed that the first compression-coding method is MP3 and the second compression-coding method is ATRAC. Audio data coded and compressed by the MP3 method is supplied in the form recorded on the CD-ROM 404. The MP3 data read out of the CD-ROM 404 is accumulated in a DRAM 405A. When the MP3 data is accumulated in the DRAM 405A in amount corresponding to the data processing unit set for the MP3 decoder 403, the MP3 data accumulated in the DRAM 405A is read out and supplied to the MP3 decoder 403.

The MP3 data is decompressed by the MP3 decoder 403 and resulting PCM data is accumulated in a DRAM 405B. When the PCM data is accumulated in the DRAM 405B in amount corresponding to the data processing unit set for the ATRAC encoder 12, the accumulated PCM data is read out of the DRAM 405B and supplied to the ATRAC encoder 12. The PCM data supplied to the ATRAC encoder 12 is coded and compressed into ATRAC data, which is then accumulated in a DRAM 405C. When the ATRAC data is accumulated in the DRAM 405C in amount corresponding to the data write unit set for the HDD 10, the ATRAC data corresponding to the data write unit set for the HDD 10 is read out of the DRAM 405C and written in the HDD 10.

On the other hand, the ATRAC data written in the HDD 10 is read out of the HDD 10 in parallel with the above writing process. For example, during the period in which the ATRAC data is accumulated in the DRAM 405C in the amount corresponding to the data write unit set for the HDD 10, the ATRAC data is read out of the HDD 10. The ATRAC data read out of the HDD 10 is accumulated in a DRAM 405D. The ATRAC data accumulated in the DRAM 405D is read out in units corresponding to the data processing unit set for the ATRAC decoder 21, and is supplied to the ATRAC decoder 21.

The supplied ATRAC data is decompressed by the ATRAC decoder 21 and outputted as PCM data. The PCM data outputted from the ATRAC decoder 21 is accumulated in a DRAM 405E. The PCM data accumulated in the DRAM 405E is read out at a predetermined bit rate corresponding to the conversion bit rate of the D/A converter 22. The read-out PCM data is converted into an analog audio signal by the D/A converter 22 and reproduced as sounds through the speaker 24.

As with the examples of FIGS. 26 to 28, the DRAMs 405A-405E are each made up of two banks. The timings of reading the ATRAC data from the CD-ROM drive 9 and the HDD 10, as well as the timings of writing and reading data in and from the DRAMs 405A-405E are controlled in a predetermined manner under the task management synchronized among the respective DMAs provided in those components. As a result, the ATRAC data is written in the HDD 10 in a predetermined manner while ensuring that the analog audio signal outputted from the D/A converter 22 will not break off.

FIG. 30 is a functional block diagram of the music server according to the fourth modification of the embodiment, showing primarily a signal flow by way of example. The fourth modification is constructed basically in the same manner as the first modification. Specifically, compressed audio data inputted in the format coded and compressed by a first compression-coding method is decompressed. The decompressed PCM data is coded and compressed by a second compression-coding method, and then written in the HDD 10. In parallel with the above writing process, the compressed audio data written in the HDD 10 is read and decompressed for playback.

In the first modification shown, by way of example, in FIG. 27, in parallel with the process of writing data in the HDD 10, the same data as written in the HDD 10 is read for playback. By contrast, in the fourth modification, different data from that written in the HDD 10 is read out of the HDD 10 for playback.

It is assumed that some ATRAC data is written in the HDD 10 beforehand. PCM data read out of the CD 55 at a high bit rate is accumulated in a DRAM 406A. The accumulated PCM data is read out of the DRAM 406A in units of amount corresponding to the data processing unit set for the ATRAC encoder 12, and is supplied to the ATRAC encoder 12. The supplied PCM data is coded and compressed by the ATRAC encoder 12, and then outputted as ATRAC data. The ATRAC data outputted from the ATRAC encoder 12 is accumulated in a DRAM 406B. When a predetermined amount of the ATRAC data corresponding to the data write unit set for the HDD 10 is accumulated in the DRAM 406B, the ATRAC data is read out and supplied to the HDD 10 for writing therein.

On the other hand, other ATRAC data written in the HDD 10 beforehand is read out of the HDD 10 in parallel with the above writing process. For example, during the period in which the ATRAC data is accumulated in the DRAM 406B in amount corresponding to the data write unit set for the HDD 10, the other ATRAC data is read out of the HDD 10. The ATRAC data read out of the HDD 10 is accumulated in a DRAM 406C. The ATRAC data accumulated in the DRAM 406C is read out at a predetermined bit rate and supplied to the ATRAC decoder 21.

The ATRAC data supplied to the ATRAC decoder 21 is decompressed and outputted as PCM data. The PCM data outputted from the ATRAC decoder 21 is accumulated in a DRAM 406D. The PCM data accumulated in the DRAM 406D is read out at a predetermined bit rate corresponding to the conversion bit rate of the D/A converter 22. The read-out PCM data is converted into an analog audio signal by the D/A converter 22 and reproduced through the speaker 24.

As with the example of FIG. 27, the DRAMs 406A-406D are each made up of two banks. The timing of reading the data from the CD-ROM drive 9, not shown in FIG. 30, the timing of writing the data in the HDD 10, the timing of reading the ATRAC data x from the HDD, as well as the timings of writing and reading the data in and from the DRAMs 406A-406D are controlled in a predetermined manner under the task management synchronized among the respective DMAs provided in those components. As a result, the data can be read and written from and in the HDD 10 in a predetermined manner while ensuring that the analog audio signal outputted from the D/A converter 22 will not break off.

FIG. 31 is a functional block diagram of the music server according to the fifth modification of the embodiment, showing primarily a signal flow by way of example. The fifth modification includes a plurality of compression encoders and compression decoders corresponding to different compression-coding methods, and a selector for selecting input and output terminals of the plurality of compression encoders and compression decoders. The fifth modification having such an arrangement is adaptable for a plurality of compression-coding methods used to compress audio data supplied from a sound source 420, and enables a desired one of a plurality of compression-coding methods to be selected to compress PCM data supplied from the sound source 420. Also, the fifth modification makes it possible to convert the compression-coding methods used to compress audio data supplied from the sound source 420 into another one.

In the music server of FIG. 31, the sound source 420 may be not only the CD 55 or the CD-ROM 404 described above, but also a line input. As an alternative, the sound source 420 may be given by reading audio data from a semiconductor memory. In this example, PCM, ATRAC, MP3, and AAC (Advanced Audio Coding) are employed as compatible formats of audio data. As a matter of course, adaptable compression-coding methods are not limited to those ones. By preparing additional compression encoder and decoders, the audio server can be made adaptable for other compression-coding methods. For the sake of convenience, it is assumed in the following description that the sound source 420 is supplied as MP3 data recorded on a CD-ROM. The processes of decompressing the MP3 data for playback and, in parallel with the reproducing process, converting the MP3 data into ATRAC data for writing in the HDD 10 will be described below.

Incidentally, as with the examples of FIGS. 26 to 30, DRAMs 421A-421C are each made up of two banks such that when one of the two banks is in a write enable state, the other is in a read enable state.

The MP3 data read out of the sound source 420 is accumulated in one bank of the DRAM 421A. When a predetermined amount of the MP3 data is accumulated in the one bank of the DRAM 421A, the accumulated MP3 data is read out and supplied to a selector 422A. The selector 422A and later-described selectors 422B, 423A and 423B are all controlled by a controller 428. The controller 428 reads header information of the audio data accumulated in the DRAM 421A and determines, based on the read header information, whether the audio data is coded and compressed and, if so, which one of the compression-coding methods is employed. In accordance with determination results, the controller 428 outputs control signals for controlling the selectors 422A, 422B, 423A and 423B.

If the controller 428 determines that the audio data read out of the sound source 420 is coded and compressed by the MP3 method, an output terminal 422E of the selector 422A is selected. Also, in the example of FIG. 31 wherein the selectors 423A and 423B have input terminals in common, a common input terminal 423E is selected. The MP3 data read out of the DRAM 421A is supplied to an MP3 encoder/decoder 426 through the selector 422A. The supplied MP3 data is decompressed by a decoder portion of the MP3 encoder/decoder 426 and outputted as PCM data.

The PCM data outputted from the MP3 encoder/decoder 426 is supplied to the D/A converter 22 through the selector 423A having the input terminal 423E selected. The supplied PCM data is converted into an analog audio signal and reproduced as sounds through the speaker 24.

During the period in which the data is read out of one bank of the DRAM 421A, the MP3 data read out of the sound source 420 is accumulated in the other bank of the DRAM 421A. Switching-over of the one and other banks of the DRAM 421A is controlled at the predetermined timing so that the MP3 data accumulated in the other bank is read out in units of amount corresponding to, e.g., the data processing unit set for the MP3 encoder/decoder 426 and is supplied to the MP3 encoder/decoder 426 through the selector 422A.

The supplied MP3 data is decompressed by the MP3 encoder/decoder 426 into PCM data, which is then accumulated in one bank of the DRAM 421B through the selector 423B having the input terminal 423E selected. When the PCM data is accumulated in the DRAM 421B in amount corresponding to, e.g., the data write unit set for the HDD 10, the PCM data accumulated in the one bank of the DRAM 421B is read out and written in the HDD 10.

The PCM data written in the HDD 10 through the above-described writing process is read out of the HDD 10 in parallel with the writing process. For example, during the period in which a next set of PCM data is accumulated in the DRAM 421B in amount corresponding to the data write unit set for the HDD 10, the PCM data written in the HDD 10 through the above-described writing process is read out. The PCM data read out of the HDD 10 is accumulated in one bank of the DRAM 421C.

In this example, as described above, it is assumed that audio data is written in the HDD 10 after being subjected to the compression-coding by the ATRAC method. In FIG. 31, therefore, an output terminal 422D is selected in the selector 422B that has an output terminal in common with the selector 422A. The PCM data accumulated in the one bank of the DRAM 421C is read out in units of amount corresponding to, e.g., the data processing unit set for an encoder portion of an ATRAC encoder/decoder 425 and is supplied to the ATRAC encoder/decoder 425 through the selector 422B.

The PCM data supplied to the ATRAC encoder/decoder 425 is subjected to the compression-coding and resulting ATRAC data is outputted. On this occasion, an output terminal 423D of the selector 423B is selected during the period in which the PCM data read out of the one bank of the DRAM 421B is written in the HDD 10. Thus, the ATRAC data outputted from the ATRAC encoder/decoder 425 is supplied to the DRAM 421B and accumulated in the other bank thereof. Then, during the period in which the PCM data read out of the one bank of the DRAM 421B is not written in the HDD 10, the ATRAC data is read out of the other bank of the DRAM 421B and written in the HDD 10.

In the above processing, the timings of reading and writing the data from and in the DRAMs 421A, 421B and 421C, switching-over of the selector 423B, as well as the timings of reading and writing the data from and in the HDD 10 are controlled under the task management synchronized among the respective DMAs provided in those components, so that the analog audio signal outputted from the D/A converter 22 will not break off and the process of writing the data in the HDD 10 is performed in a predetermined manner.

Additionally, in the fifth embodiment, the data accumulated in the DRAM 421B can be introduced to an output terminal 429. With the provision of the output terminal 429, the digital audio data accumulated in the DRAM 421B can be directly outputted to the exterior through an IEEE 1394 interface, for example.

Also, in the above processing, the PCM data outputted from the MP3 encoder/decoder 426 and written in the HDD 10 may be erased from the HDD 10 after that PCM data has been read out of the HDD 10 and accumulated in the DRAM 421C.

Further, when writing the data in the HDD 10, the audio data supplied from the sound source 420 may be directly written in the HDD 10 in the same format by selecting an output terminal 422C in the selector 422A and an output terminal 423C in the selector 423B.

As mentioned above, the components of the music server according to the present invention can be controlled by using a real time operating system (OS). In the following, the real time OS will be briefly described and then a description will be made of the cases where control using the real time OS is applied to the above-described embodiment and the first and fifth modifications thereof.

Figure 32:
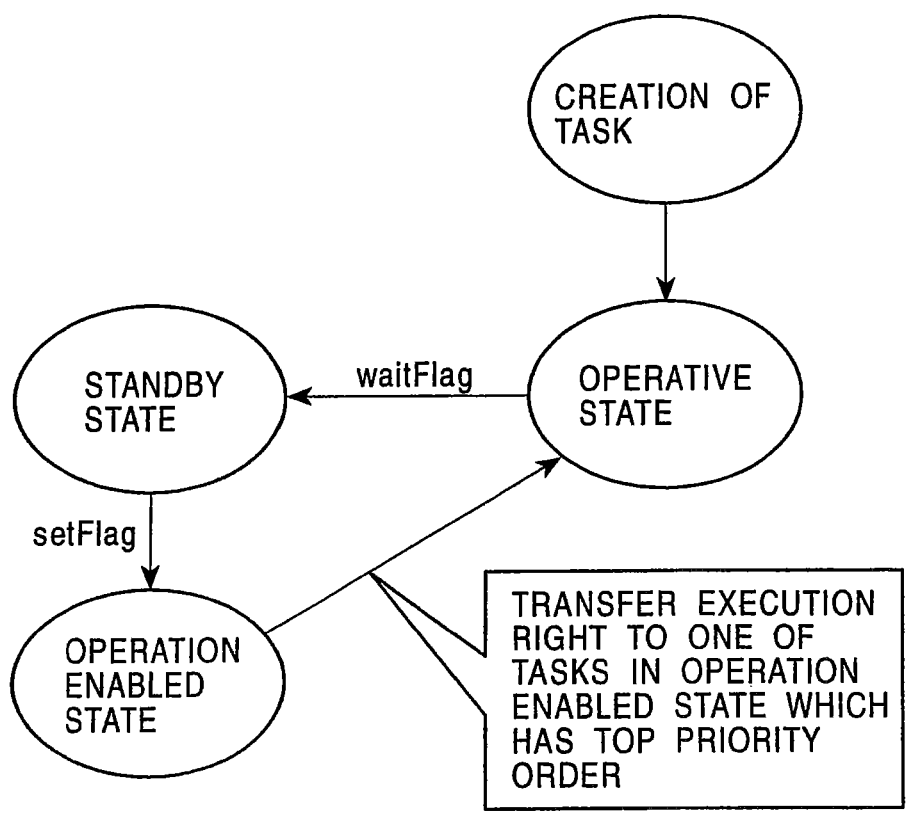
FIG. 32 is a diagram showing the basic concept of a real time operating system (OS) applicable for the present invention.

The real time OS is a multitask OS that is capable of performing a plurality of tasks at the same time and is designed so as to execute processing upon an event, that is, an external request, at a maximum speed. FIG. 32 shows the basic concept of a real time OS applicable for the present invention. Three states, that is, an operative state, a standby state, and an operation enable state, are assigned to each task. Each task is under the flag management such that a command waitFlag for instructing the task to wait for a flag is issued when the task shifts from the operative state to the standby state, and a command setFlag for setting a value to a flag is issued when the task shifts from the standby state to the operation enable state.

Further, a plurality of tasks can exist at the same time and priority orders are allocated respectively to the plurality of tasks. The real time OS transfers the execution right to one of the tasks in the operation enable state, which has the top priority order.

Thus, the real time OS is designed to be able to switch over the tasks in the operation enable state from one to another at a high speed upon the occurrence of an event. In this example of the present invention, an event is produced using only an event flag.

Figure 33:
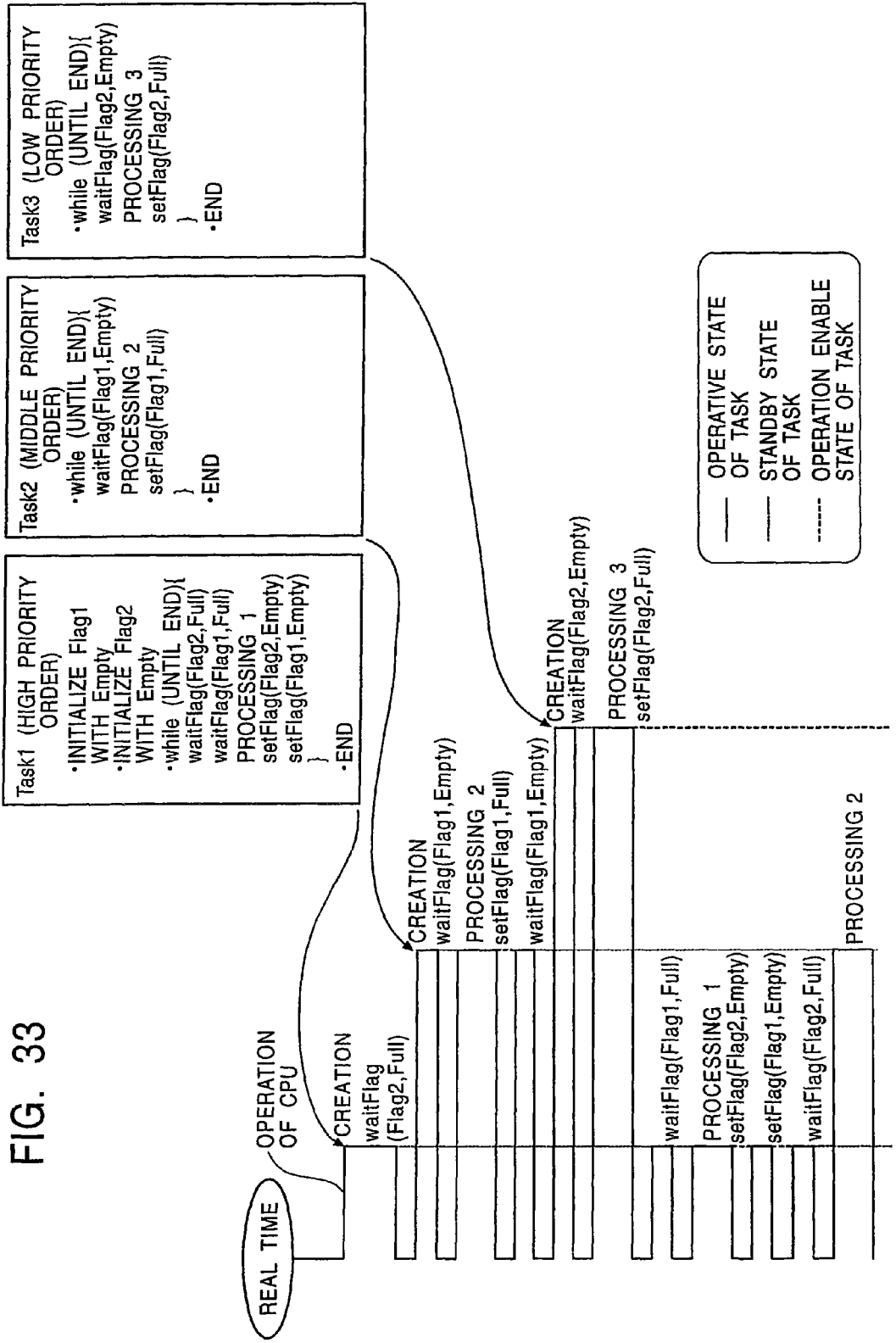
FIG. 33 is a diagram showing one example of task control for a plurality of tasks executed by the real time OS.

FIG. 33 shows one example of task control for a plurality of tasks executed by the real time OS. More specifically, FIG. 33 shows, by way of example, the case of executing tasks 1, 2 and 3 that are given respectively priority orders of "high", "middle" and "low" by the real time OS. Flag1 and Flag2 representing respectively the tasks 2 and 3 are each set to Empty or Full that indicates the status of each task.

The vertical axes in FIG. 33 represents processing executed by the real time OS, the task 1, the task 2 and the task 3 in that order from left to right. The actual operation of the CPU executed by the real time OS is represented by solid lines extending between the tasks. Also, the operative state, the standby state, and the operation enable state of each task are indicated respectively by a dotted line, a broken line and a solid line. The CPU monitors the tasks and allocates the tasks so as to execute the following processing based on values of Flag1 and Flag2.

As shown in FIG. 33, the task 1 having the top priority order first initializes the flag Flag1 with the value Empty and then initializes the flag Flag2 with the value Empty. Subsequently, the task waits for the value Full of the flag Flag2 given by the command waitFlag (Flag2, Full) and then waits for the value Full of the flag Flag1 given by the command waitFlag (Flag1, Full). Thereafter, predetermined processing 1 is executed. After the execution, the flag Flag2 is set to the value Empty by the command setFlag (Flag2, Empty) and the flag Flag1 is set to the value Empty by the command setFlag (Flag1, Empty). The above process sequence from the command waitFlag (Flag2, Full) to the command setFlag (Flag2, Empty) is repeated until it is completed.

On the other hand, the task 2 having the second priority order next to the task 1 executes processing 2 after waiting for the value Empty of the flag Flag1 given by the command waitFlag. Subsequent to the processing 2, the flag Flag1 is set to the value Empty by the command setFlag. The above process sequence of the task 2 is repeated until it is completed. A process sequence of the task 3 having the lowest priority order among the three tasks is similar to that of the task 2.

It is assumed that the above-described conditions are set. First, the task 1 having the top priority order is brought into the operative state, and the flags Flag1 and Flag2 are each set to the value Empty. Then, the command waitFlag (Flag2, Full) is issued.

At this time, the task 2 is created. The task 2 issues the command waitFlag (Flag1, Empty). With the flag Flag1 having been initialized to the value Empty by the task 1, after the task is once returned to the real time OS, the task 2 executes the processing 2 as a next process step. After the execution of the processing 2, the command setFlag (Flag1, Full) is issued to set the flag Flag1 to the value Full.

The task is once returned to the real time OS, but the command waitFlag (Flag2, Full) is not yet satisfied. Therefore, the execution right is transferred to the task 2 again and the command waitFlag (Flag1, Empty) is issued. Then, the task is returned to the real time OS, but the command waitFlag (Flag2, Full) is not yet satisfied even at this time. Accordingly, the task 2 is brought into the standby state.

Next, the task 3 is created. The task 3 issues the command waitFlag (Flag2, Empty). With the flag Flag2 having been initialized to the value Empty by the task 1, after the task is returned to the real time OS, the task 3 executes the processing 2 as a next process step. After the execution of the processing 3, the command setFlag (Flag2, Full) is issued to set the flag Flag2 to the value Full. The task 3 transits to the operation enable state.

The task is returned to the real time OS. Since the command waitFlag (Flag2, Full) is now satisfied by the task 3, a next process step is executed in the task 1 and the command waitFlag (Flag1, Full) is issued. The flag Flag1 is satisfied by the task 2, and therefore the task 1 executes processing 1 as a next process step. After the execution of the processing 1, the command setFlag (Flag2, Empty) is issued and the command setFlag (Flag1, Empty) is then issued.

The task 2 has been brought into the state of waiting for the value Empty of the flag Flag1, as described above, by the command setFlag (Flag1, Empty) issued after the execution of the processing 2. Accordingly, when the command setFlag (Flag1, Empty) is issued in the task 1, the task 2 transits to the operation enable state.

In the example of FIG. 33, the process sequence then returns to the beginning of the loop, whereupon the command waitFlag (Flag2, Full) is issued. Subsequently, the execution right is passed to the task 2 and the processing 2 is executed.

Thus, in the real time OS applicable to the present invention, the operations of the tasks are controlled by transferring status flags between the tasks and the real time OS. In this example, one status flag is transferred for each of the tasks. As a result, each task becomes simple and parallel process of multiple tasks can be easily controlled in simple fashion.

Figure 34:
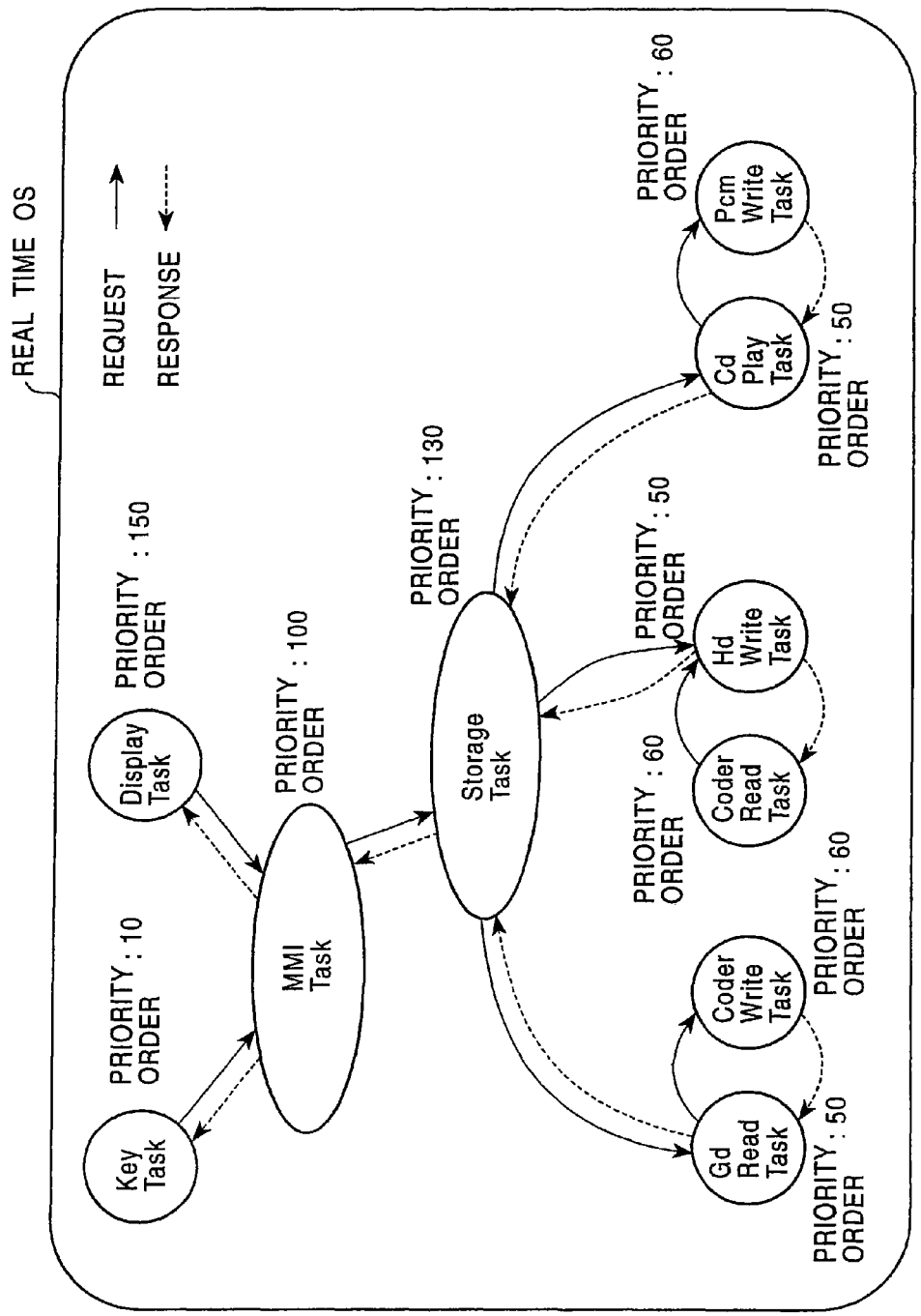
FIG. 34 is a diagram schematically showing one example of the relationship among the tasks when the real time OS is applied to the music server of the embodiment.

Also, in the real time OS applicable to the present invention, the priority orders are assigned to the tasks as described above. FIG. 34 schematically shows one example of the relationship among the tasks when the real time OS is applied to the music server according to the embodiment of the present invention. FIG. 34 also indicates the priority orders assigned to the tasks. It is assumed that the priority orders are assigned using numerals from 0 to 255, for example, and a smaller numeral represents a higher priority order. The priority orders are managed by the real time OS.

In the example of FIG. 34, a task KeyTask related to manipulation made on a control panel of the music server is set to have a top priority order assigned with a numeral 10. A task DisplayTask related to display on the display unit has a priority order assigned with a numeral 150. A task MMITask related to an MMI (Man Machine Interface) has a priority order assigned with a numeral 100. Further, a task StorageTask for handling writing and reading of compressed or non-compressed audio data in and from a storage medium has a priority order assigned with a numeral 130.

A task CdReadTask related to the process of reading audio data from the CD-ROM drive 9 for writing and writing the audio data in the DRAM 11B has a priority order assigned with a numeral 50. A task CoderWriteTask related to the process of supplying the data, which has been written in the memory by the task CdReadTask, to the compression encoder or the compression decoder has a priority order that is set a little lower than the priority order of the task CdReadTask and assigned with a numeral 60, for example.

A task HdWriteTask related to the process of writing the data read out of the DRAM 11C in the HDD 10 has a priority order assigned with a numeral 50. A task CoderReadTask related to the process of writing the data, which has been outputted from the compression encoder or the compression decoder, in the memory has a priority order that is set a little lower than the priority order of the task HdWriteTask and assigned with a numeral 60, for example.

Likewise, a task CdPlayTask related to the process of reading PCM data from the CD-ROM drive 9 for playback and writing the PCM data in the DRAM 11A has a priority order assigned with a numeral 50. A task PcmWriteTask related to the process of reading the PCM data written in the DRAM 11A and supplying the read PCM data to the D/A converter 22 has a priority order that is set a little lower than the priority order of the task CdPlayTask and assigned with a numeral 60, for example.

Thus, in each set of the tasks related to an access to the DRAM, that is, in each set of the tasks CdReadTask and CoderReadTask, the tasks HdWriteTask and CoderReadTask, and the tasks CdPlayTask and PcmWriteTask, a higher priority order is assigned to the task requiring a longer processing time.

Further, as indicated by solid and dotted arrows in FIG. 34, requests and responses are transferred between the tasks. As also seen from FIG. 34, each set of the tasks CdReadTask and CoderReadTask, the tasks HdWriteTask and CoderReadTask, and the tasks CdPlayTask and PcmWriteTask, are assigned with higher priority orders than that of the task StorageTask and executed in parallel. On this occasion, as described above, the real time OS controls the each set of the tasks based on the flags transferred between the tasks so that the executions of the tasks are synchronized with each other.

Figure 35:
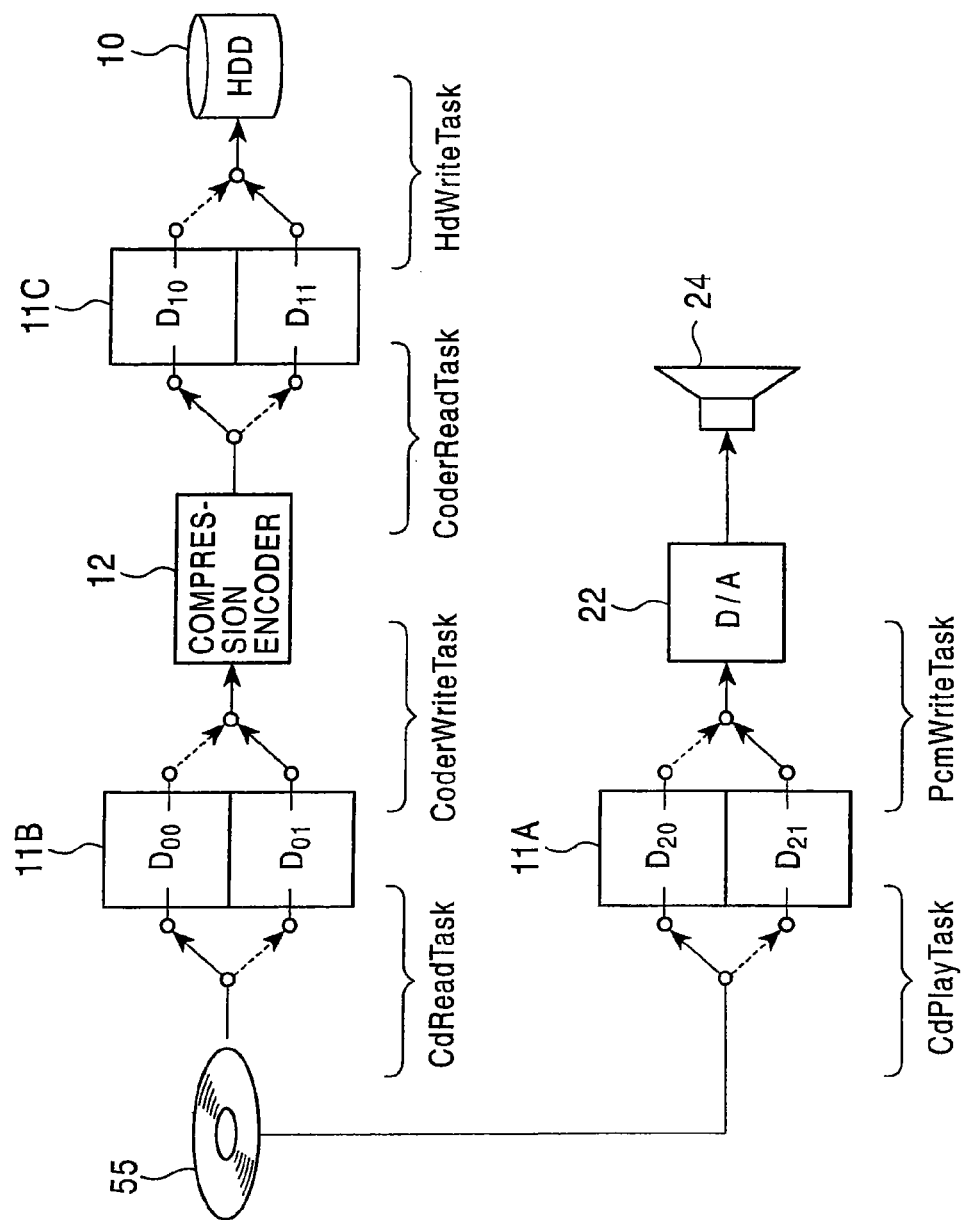
FIG. 35 is a functional block diagram representing the case where the tasks are allocated to respective components of the music server of the embodiment.

FIG. 35 is a functional block diagram representing the case where the tasks shown in FIG. 34 are allocated to respective components of the music server of the embodiment described above with reference to FIG. 26. Note that, in FIG. 35, components in common with those in FIG. 26 are denoted by the same numerals and a detailed description thereof is omitted here. Also, in FIG. 35, the DRAMs 11A, 11B and 11C in FIG. 26 are shown as clearly indicating that each DRAM is made up of two banks, i.e., banks D20 and D21, banks D00 and D01, and banks D10 and D11.

Further, the status of each component shown in FIG. 35, that is, the states of the DRAMs 11A, 11B and 11C, the compression encoder 12, the D/A converter 22, the HDD 10, and the CD-ROM drive 9, not shown in FIG. 35, for reading data from the CD 55, area always monitored by the CPU 8. The status of each of the monitored components is reflected on the tasks by the real time OS.

The above-described set of the tasks CdReadTask and CoderReadTask, the tasks HdWriteTask and CoderReadTask, and the tasks CdPlayTask and PcmWriteTask are tasks related to inputting and outputting of data to and from the DRAMs 11A, 11B and 11C, respectively. For example, the input side of the DRAM 11B is controlled by the task CdReadTask, and the output side of the DRAM 11B is controlled by the task CoderReadTask. The input side is assigned with a higher priority order than that of the output side to make control such that the banks are switched over after waiting until a predetermined amount of PCM data is accumulated in one bank of the DRAM 11B. This arrangement is similarly applied to the DRAM 11A.

In the DRAM 11C, the input side is controlled by the task CoderReadTask and the output side is controlled by the task HdWriteTask. The output side is assigned with a higher priority order than that of the input side to make control such that the banks are switched over after waiting until a compressed audio data is accumulated in one bank of the DRAM 11C in amount corresponding to the data write unit set for the HDD 10.

Figure 36:
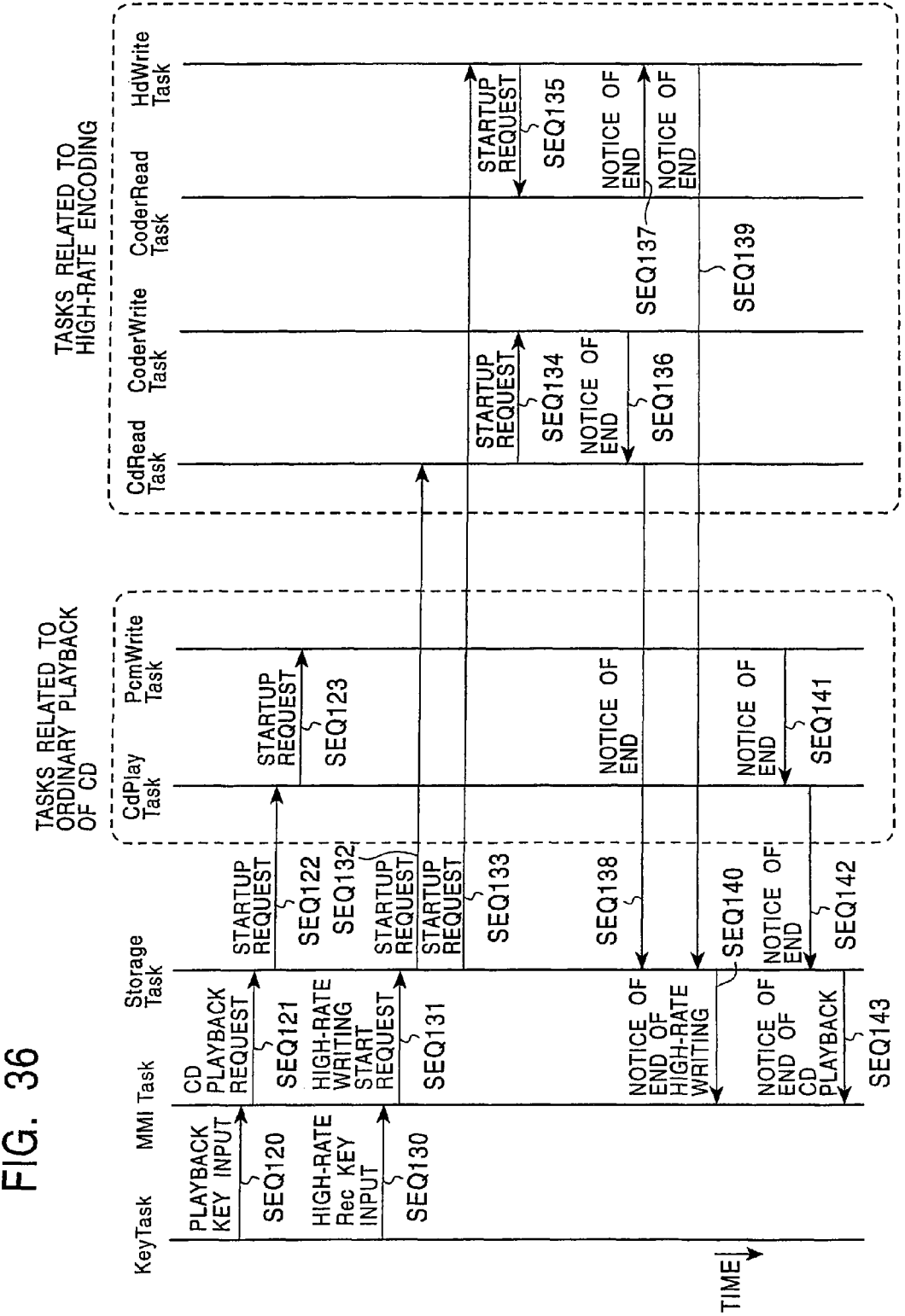
FIG. 36 is a diagram schematically showing process flows among the tasks executed in the embodiment.

FIG. 36 schematically shows process flows among the tasks corresponding to FIGS. 34 and 35. In FIG. 36, the time base is shown as representing the lapse of time in a direction from top to bottom. Transfer of requests and notices between the tasks shown in FIG. 36 is performed under the task management using the flags as described above with reference to FIG. 33. In other words, the process of transferring requests and notices between the tasks is controlled by the real time OS based on the status of the associated flags in accordance with the priority orders assigned to the tasks.

When the CD 55 loaded in the CD-ROM drive 9 is played back at the equi-rate, playback of the CD 55 loaded in the CD-ROM drive 9 is instructed upon a playback key input entered by the user made on the control panel. In accordance with the instruction, the event of the playback key input is noticed from the task KeyTask to the task MMITask (SEQ120). In response to the notice, a playback request for the CD 55 is noticed from the task MMITask to the task StorageTask (SEQ121).

In response to the playback request, a startup request is noticed from the task StorageTask to the task CdPlayTask (SEQ122). The PCM data recorded on the CD 55 loaded in the CD-ROM drive 9 is read out under control of the CPU 8 in accordance with the task CdPlayTask upon the startup request. The read-out PCM data is accumulated in the DRAM 11B. Also, in response to the above startup request, another startup request is noticed from the task CdPlayTask to the task PcmWriteTask (SEQ123). The PCM data accumulated in the DRAM 11A is supplied to the D/A converter 22 in a predetermined manner under control of the task PcmWriteTask.

Next, a description will be made of the high-rate writing process of coding and compressing the PCM data recorded on CD 55 under playback and writing the compressed PCM data in the HDD 10. After playback of the CD 55 is started up as described above, the high-rate writing of the PCM data is instructed by the user manipulating a high-rate Rec key that is provided in the control panel to instruct the high-rate writing. In accordance with the instruction, the event of the high-rate Rec key input is noticed from the task KeyTask to the task MMITask (SEQ130). In response to the notice, a request for starting the high-rate writing is issued from the task MMITask to the task StorageTask (SEQ131). In response to the high-rate writing request, a startup request is sent from the task StorageTask to each of the task CdRead-Task and the task HdWriteTask (SEQ132 and SEQ133).

The PCM data for writing is read out of the CD 55 under control of the CPU 8 in accordance with the task CdRead-Task to which the startup request has been noticed. The read-out PCM data is accumulated in the DRAM 11B, and at the same time, another startup request is noticed from the task CdReadTask to the task CoderWriteTask (SEQ134). These tasks control the reading of the PCM data from the CD 55 and the supply of the read-out PCM data to the compression encoder 22.

On the other hand, the task HdWriteTask, to which the startup request has been noticed, controls the reading of the compressed audio data from the DRAM 11C and the writing of the read-out compressed audio data in the HDD 10. More specifically, upon the startup request being noticed to the task HdWriteTask, a further startup request is noticed from the task HdWriteTask to the task CoderReadTask (SEQ136). The compressed audio data outputted from the compression encoder 12 is accumulated in the DRAM 11C under control of the task CoderReadTask to which the startup request has been noticed.

Also, the task HdWriteTask controls the reading of the compressed audio data from the DRAM 11C. For example, when the compressed audio data is accumulated in the DRAM 11C in an amount corresponding to the data write unit set for the HDD 10, the compressed audio data is read out of the DRAM 11C and written in the HDD 10.

When the high-rate writing of the PCM data from the CD 55 is ended, the end of the high-rate writing is noticed from the CPU 8 to the task CoderWriteTask, and a notice of end indicating the end of the high-rate writing is passed from the task CoderWriteTask to the task CdReadTask (SEQ136). Under control of the task CdReadTask which has received the notice of end, the reading of the PCM data from the CD 55 for writing is ended, whereupon a notice of end is passed from the task CdReadTask to the task StorageTask (SEQ138).

The end of the high-rate writing of the PCM data from the CD 55 is also noticed from the CPU 8 to the task Coder-ReadTask. The task CoderReadTask, which has received the notice, passes the notice of end to the task HdWriteTask (SEQ137). Then, the notice of end is passed from the task HdWriteTask, which has received the notice, to the task StorageTask (SEQ139).

In the task StorageTask, upon receiving the notice of end from each of the task CdReadTask and the task HdWriteTask, a notice of end indicating the end of the high-rate writing is passed to the task MMITask (SEQ140).

Further, in relation to the reading of the PCM data from the CD 55 for playback, when the reading of the PCM data from the CD 55 is ended, the end of the reading is noticed from the CPU 8 to the task PcmWriteTask. The task Pcm-WriteTask, which has received the notice, passes the notice of end to the task CdPlayTask (SEQ141), and the notice of end is then passed from the task CdPlayTask to the task StorageTask (SEQ142). Subsequently, the end of the equi-rate playback of the CD 55 is noticed from the task StorageTask to the task MMITask (SEQ143).

Figure 37:
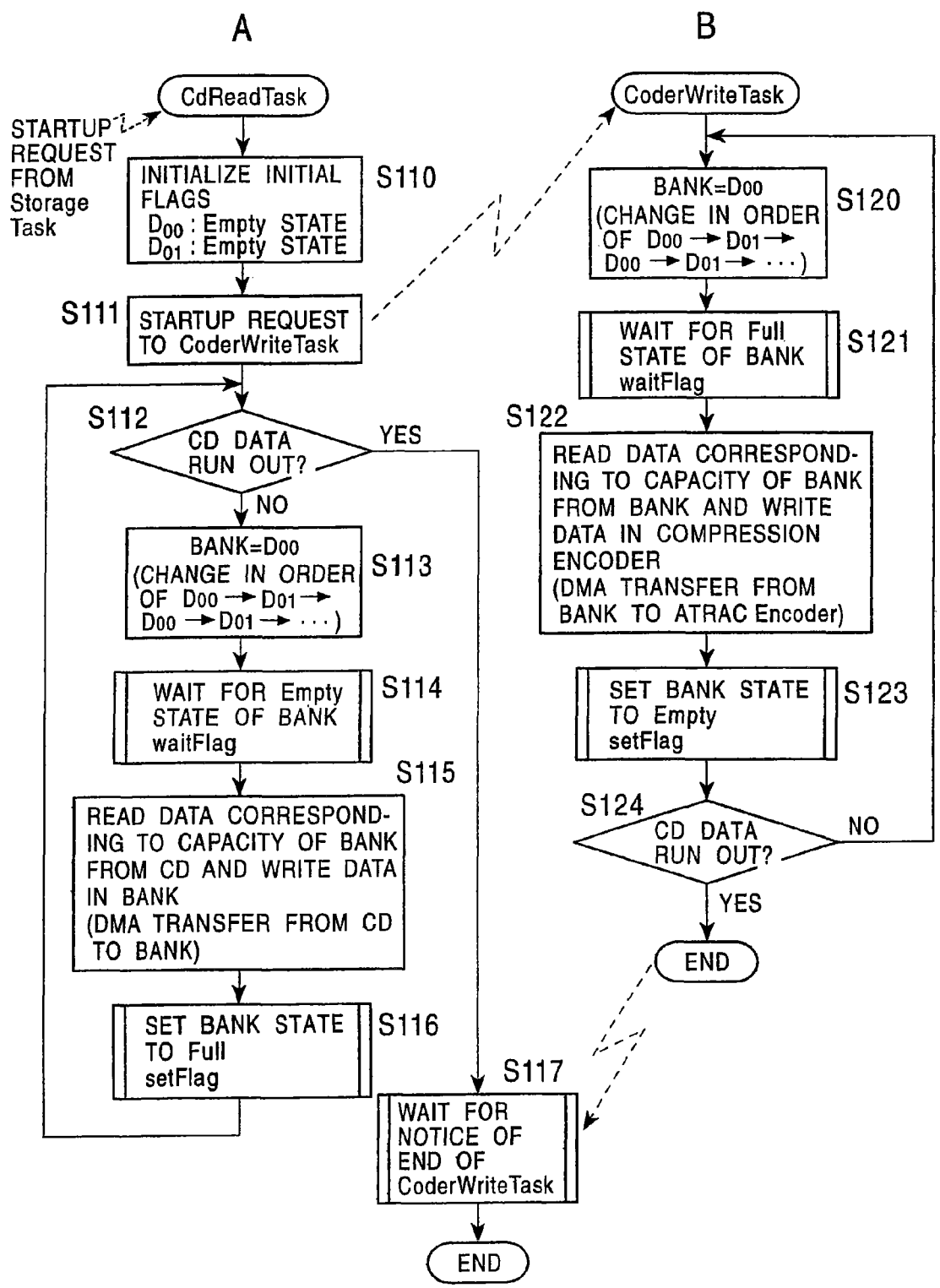
FIGS. 37A and 37B are flowcharts showing one example of processing executed by a task CdReadTask and a task CoderWriteTask.

The above-described control by the real time OS, in particular, the bank control in the DRAMs 11A, 11B and 11C, will be described in more detail with reference to flowcharts of FIGS. 37, 38 and 39. FIG. 37 is a flowchart showing one example of processing executed by the task CdReadTask and the task CoderWriteTask. Specifically, A in FIG. 37 shows the processing executed by the task CdRead-Task and B in FIG. 37 shows the processing executed by the task CoderWriteTask. Also, in A and B of FIG. 37, steps S114, S116, S117, S121 and S123 represent the processing executed by the real time OS.

In A, when the task CdReadTask receives a startup request from the task StorageTask, the status flag indicating the state of the DRAM 11B is initialized in step S110 such that one bank D00 and the other bank D01 of the DRAM 11B are each set to the Empty state indicating the relevant bank being empty. Assuming, for example, that the flag of the bank D00 is Flag00 and the flag of the bank D01 is Flag01, values of the Flag00 and Flag01 are each set to "Empty".

After the status flags of the banks of the DRAM 11B have been initialized, a startup request is issued from the task CdReadTask to the task CoderWriteTask in step S111. In response to the startup request, the processing shown in flowchart B of FIG. 37 is started. The flowchart of B will be described later.

Then, in A, it is determined in next step S112 whether the PCM data has been completely read out of the CD 55. If the reading is completed, the process flow goes to step S117 where the CPU waits for a notice of end from the task CdReadTask. Whether the PCM data has been completely read out of the CD 55 is determined, for example, by the CPU 8 monitoring the operation of the CD 55. A determination result is noticed to the real time OS.

On the other hand, if it is determined in step S112 that the reading of the PCM data out of the CD 55 is not yet completed, the process flow goes to step S113 where the bank of the DRAM 11B is set to the bank D00. With the bank setting in step S113, the two banks are alternately switched over such that the selected bank is changed in the order of bank D00, bank D01, bank D00, . . . whenever the processing started from step S112 is looped. The PCM data read out of the CD 55 by the task CdReadTask is accumulated in the bank of the DRAM 11B set in step S113.

In next step S114, the command waitFlag is issued by the task CdReadTask, and the real time OS waits for until the bank (assumed to be D00) of the DRAM 11B set in step S113 comes to the Empty state. If the bank D00 comes to the Empty state, the process flow goes to step S115.

In step S115, the PCM data is read out of the CD 55 in amount corresponding to the capacity of the bank (bank D00) of the DRAM 11B set in step S113. The read-out PCM data is DMA-transferred to the bank D00 of the DRAM 11B and written in the bank D00.

When the predetermined amount of the PCM data is written in the bank D00, the task CdReadTask issues the command setFlag in next step S116, whereby the status flag of the bank D00 is set to Full. After the completion of the flag setting, the process flow returns to step S112.

On the other hand, the processing shown in flowchart B is started following the processing in above-described step S111. More specifically, when the startup request is issued in step S111 to the task CoderWriteTask, the bank of the DRAM 11B is set to the bank D00 in step 120. With the bank setting in step S120, the two banks are alternately switched over such that the selected bank is changed in the order of bank D00, bank D01, bank D00, . . . whenever the processing is looped from step S124 described later.

In next step S121, the command waitFlag is issued by the task CoderWriteTask, and the real time OS waits for until the bank (assumed to be D00) of the DRAM 11B set in step S120 comes to the Full state. Stated otherwise, in step S121, the CPU waits for the end of the processing of step S116. If the bank D00 comes to the Full state, the process flow goes to step S122.

In step S122, the PCM data is read out of the bank (bank D00) of the DRAM 11B set in step S120 in amount corresponding to the capacity of the bank D00. The read-out PCM data is DMA-transferred to the compression encoder 12 and written in, for example, a processing memory for the compression encoder 12.

If the predetermined amount of the PCM data is read out of the bank D00 of the DRAM 11B in step S122, the process flow goes to next step S123. In step S123, the command setFlag is issued by the task CoderWriteTask and the status flag of the bank D00 is set to the Empty state.

After the end of the flag setting, the process flow goes to step S124 where it is determined whether the PCM data has been completely read out of the CD 55. If it is determined that the PCM data has not been completely read out of the CD 55, the process flow returns to step S120.

On the other hand, if it is determined in step S124 that the PCM data has been completely read out of the CD 55, a notice of end is passed from the task CoderWriteTask to the task CdReadTask, whereby a sequence of the processing shown in B of FIG. 37 is ended. Then, if the notice of end from the task CoderWriteTask is received by the task CdReadTask in above step S117, a sequence of the processing shown in A and B of FIG. 37 is ended.

Figure 38:
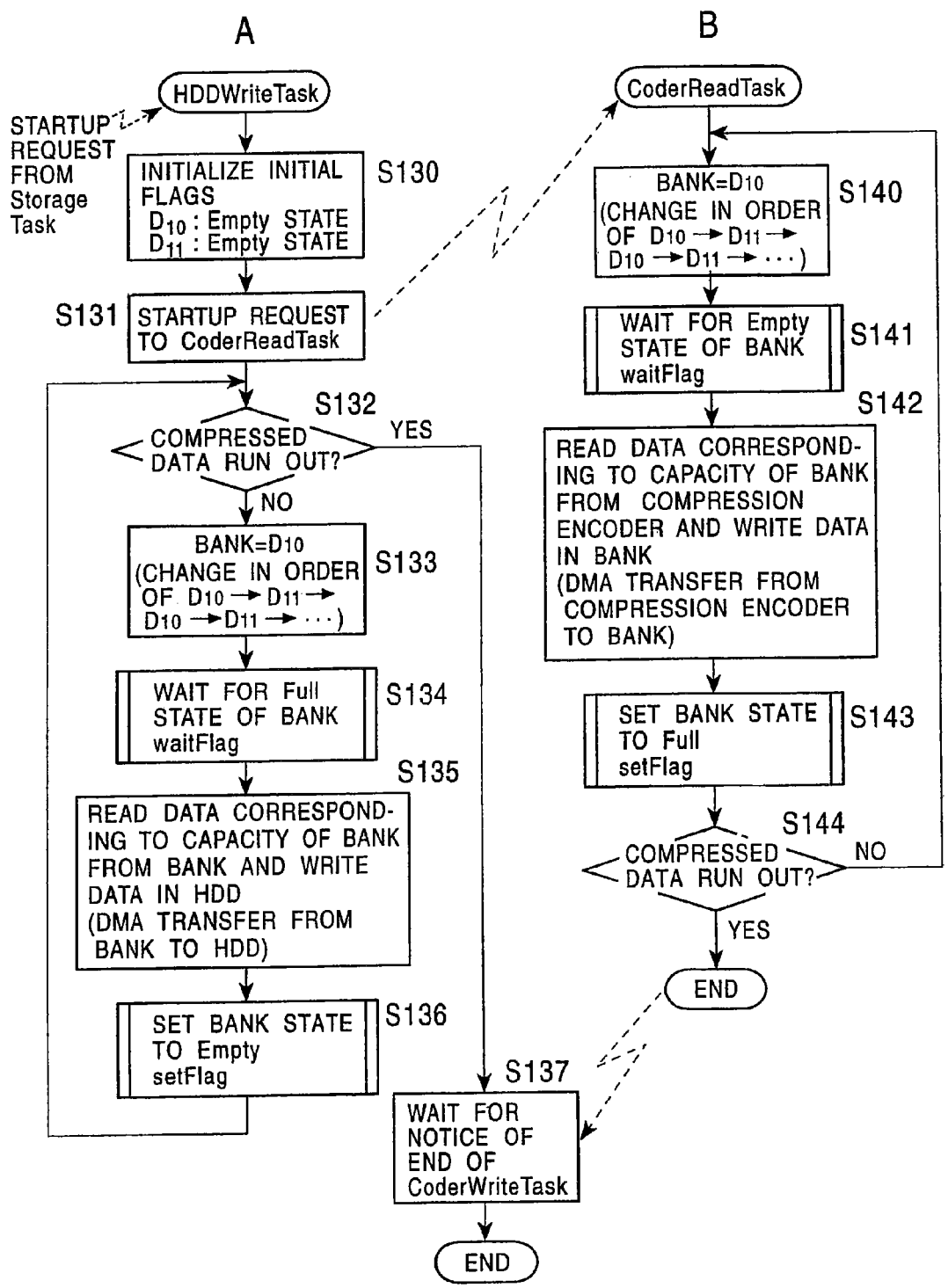
FIGS. 38A and 38B are flowcharts showing one example of processing executed by a task HdWriteTask and a task CoderReadTask.

Next, one example of the processing executed by the task HdWriteTask and the task CoderReadTask with reference to flowcharts of shown at A and B of FIG. 38. A shows the processing executed by the task HdWriteTask and B shows the processing executed by the task CoderReadTask. Note that in A and B of FIG. 38 steps S134, S136, S137, S141 and S143 represent the processing executed by the real time OS.

In A of FIG. 38, when the task HdWriteTask receives a startup request from the task StorageTask, the status flag indicating the state of the DRAM 11C is initialized in step S130 such that one bank D10 and the other bank D11 of the DRAM 11C are each set to the Empty state indicating the relevant bank being empty.

After the status flags of the banks of the DRAM 11C have been initialized, a startup request is issued from the task HdWriteTask to the task CoderReadTask in step S131. In response to the startup request, the processing shown in flowchart B of FIG. 38 is started. The flowchart of B in FIG. 38 will be described later.

Then, in A, it is determined in next step S132 whether the compressed-coding of the PCM data by the compression encoder 12 is completed and the supply of the compressed audio data from the compression encoder 12 is completed. If the supply of the compressed audio data from the compression encoder 12 is completed, the process flow goes to step S137 where the CPU waits for a notice of end from the task CoderWriteTask. Whether the PCM data has been completely coded and compressed by the compression encoder 12 is determined, for example, by the CPU 8 monitoring the operation of the compression encoder 12. A determination result is noticed to the real time OS.

On the other hand, if it is determined in step S132 that the supply of the compressed audio data from the compression encoder 12 is not yet completed, the process flow goes to step S133 where the bank of the DRAM 11C is set to the bank D10. With the bank setting in step S133, the two banks are alternately switched over such that the selected bank is changed in the order of bank D10, bank D11, bank D10, . . . whenever the processing started from step S132 is looped. The compressed audio data written in the HDD 10 by the task HdWriteTask is read out the bank of the DRAM 11C set in step S133.

In next step S134, the command waitFlag is issued by the task HdWriteTask, and the real time OS waits for until the bank (assumed to be D10) of the DRAM 11C set in step S133 comes to the Full state. If the bank D10 comes to the Full state, the process flow goes to step S135.

In step S135, the compressed audio data is read out of the bank (bank D10) of the DRAM 11C set in step S133 in amount corresponding to the capacity of the bank D10 of the DRAM 11C, and is written in the HDD 10. The compressed audio data read out of the bank D10 of the DRAM 11C is DMA-transferred to the HDD 10.

When the predetermined amount of the compressed audio data is written in the HDD 10, the task HdWriteTask issues the command setFlag in next step S136, whereby the status flag of the bank D10 of the DRAM 11C is set to Empty. After the completion of the flag setting, the process flow returns to step S132.

On the other hand, the processing shown in flowchart B of FIG. 38 is started following the processing in above-described step S131. More specifically, when the startup request is issued in step S131 to the task CoderReadTask, the bank of the DRAM 11C is set to, e.g., the bank D10 in step 140. With the bank setting in step S140, the two banks are alternately switched over such that the selected bank is changed in the order of bank D10, bank D11, bank D10, . . . whenever the processing is looped from step S144 described later.

In next step S141, the command waitFlag is issued by the task CoderReadTask, and the real time OS waits for until the bank (assumed to be D10) of the DRAM 11C set in step S140 comes to the Empty state. Stated otherwise, in step S141, the CPU waits for the end of the processing of step S136. If the bank D10 comes to the Empty state, the process flow goes to step S142.

In step S142, the compressed audio data is read out of the compression encoder 12 in amount corresponding to the capacity of the bank (bank D10) of the DRAM 11C set in step S140. The read-out compressed audio data is DMA-transferred from the compression encoder 12 to the bank D10 of the DRAM 11C and is written in the bank D10.

If the predetermined amount of the compressed audio data is written in the bank D10 of the DRAM 11C in step S142, the process flow goes to next step S143. In step S143, the command setFlag is issued by the task CoderReadTask and the status flag of the bank D10 is set to the Full state.

After the end of the flag setting, the process flow goes to step S144 where it is determined whether the compressed audio data has been completely read out of the compression encoder 12. If it is determined that the compressed audio data has not been completely read out of the compression encoder 12, the process flow returns to step S140.

On the other hand, if it is determined in step S144 that the compressed audio data has been completely read out of the compression encoder 12, a notice of end is passed from the task CoderReadTask to the task HdWriteTask, whereby a sequence of the processing shown in B is ended. Then, if the notice of end from the task CoderReadTask is received by the task HdWriteTask in above step S137, a sequence of the processing shown at A and B in FIG. 38 is ended.

Figure 39:
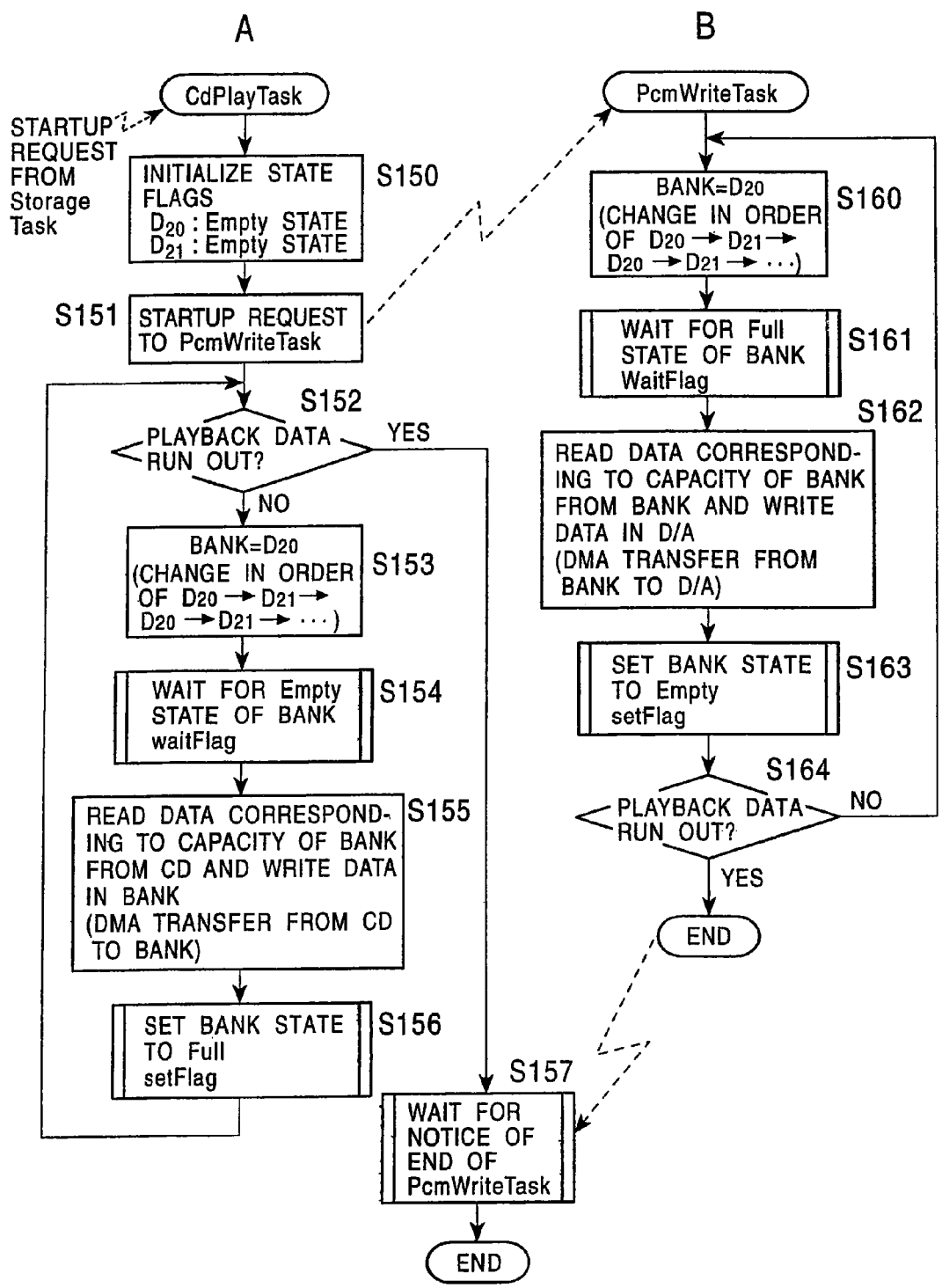
FIGS. 39A and 39B are flowcharts showing one example of processing executed by a task CdPlayTask and a task PcmWriteTask.

A and B in FIG. 39 are flowcharts showing one example of the processing executed by the task CdPlayTask and the task PcmWriteTask. A shows the processing executed by the task CdPlayTask and B shows the processing executed by the task PcmWriteTask. Note that, in A and B of FIG. 39, steps S154, S156, S157, S161 and S163 represent the processing executed by the real time OS.

In A of FIG. 39, when the task CdPlayTask receives a startup request from the task StorageTask, the status flag indicating the state of the DRAM 11A is initialized in step S150 such that one bank D20 and the other bank D21 of the DRAM 11A are each set to the Empty state indicating the relevant bank being empty.

After the status flags of the banks of the DRAM 11A have been initialized, a startup request is issued from the task CdPlayTask to the task PcmWriteTask in step S151. In response to the startup request, the processing shown in flowchart, B is started. The flowchart B of FIG. 39 will be described later.

Then, in A, it is determined in next step S152 whether the playback of the CD 55 is completed. If the playback of the CD 55 is completed, the process flow goes to step S157 where the CPU waits for a notice of end from the task CoderWriteTask. Whether the playback of the CD 55 is completed or not is determined, for example, by the CPU 8 monitoring the operation of the CD 55. A determination result is noticed to the real time OS.

On the other hand, if it is determined in step S152 that the playback of the CD 55 is not yet completed, the process flow goes to step S153 where the bank of the DRAM 11A is set to, e.g., the bank D20. With the bank setting in step S153, the two banks are alternately switched over such that the selected bank is changed in the order of bank D20, bank D21, bank D20, . . . whenever the processing started from step S152 is looped. The PCM data reproduced from the CD 55 by the task CdPlayTask is accumulated in the bank of the DRAM 11 set in step S153.

In the next step S154, the command waitFlag is issued by the task CdPlayTask, and the real time OS waits for until the bank (assumed to be D20) of the DRAM 11A set in step S153 comes to the Empty state. If the bank D20 comes to the Empty state, the process flow goes to step S155.

In step S155, the PCM data is read out of the CD 55 in an amount corresponding to the capacity of the bank (bank D20) of the DRAM 11A set in step S153. The read-out PCM data is DMA-transferred to the bank D20 of the DRAM 11A and written in the bank D20.

When the predetermined amount of the PCM data is written in the bank D20, the task CdPlayTask issues the command setFlag in next step S156, whereby the status flag of the bank D20 is set to Full. After the completion of the flag setting, the process flow returns to step S152.

On the other hand, the processing shown in flowchart B is started following the processing in above-described step S151. More specifically, when the startup request is issued in step S151 to the task PcmWriteTask, the bank of the DRAM 11A is set to the bank D20 in step 160. With the bank setting in step S160, the two banks are alternately switched over such that the selected bank is changed in the order of bank D20, bank D21, bank D20, . . . whenever the processing is looped from step S164 described later.

In next step S161, the command waitFlag is issued by the task PcmWriteTask, and the real time OS waits for until the bank (assumed to be D20) of the DRAM 11A set in step S160 comes to the Full state. Stated otherwise, in step S161, the CPU waits for the end of the processing of step S156. If the bank D20 comes to the Full state, the process flow goes to step S162.

In step S162, the PCM data is read out of the bank (bank D20) of the DRAM 11A set in step S160 in amount corresponding to the capacity of the bank D20. The read-out PCM data is DMA-transferred to the D/A converter 22 and written in, for example, a processing memory for the D/A converter 22.

If the predetermined amount of the PCM data is read out of the bank D20 of the DRAM 11A in step S162, the process flow goes to next step S163. In step S163, the command setFlag is issued by the task PcmWriteTask and the status flag of the bank D20 is set to the Empty state.

After the end of the flag setting, the process flow goes to step S164 where it is determined whether the playback of the CD 55 is completed. If it is determined that the playback of the CD 55 is not completed, the process flow returns to step S160.

On the other hand, if it is determined in step S164 that the playback of the CD 55 is completed, a notice of end is passed from the task PcmWriteTask to the task CdPlayTask, whereby a sequence of the processing shown at B is ended. Then, if the notice of end from the task PcmWriteTask is received by the task CdPlayTask in above step S157, a sequence of the processing shown in A and B of FIG. 39 is ended.

Figure 40:
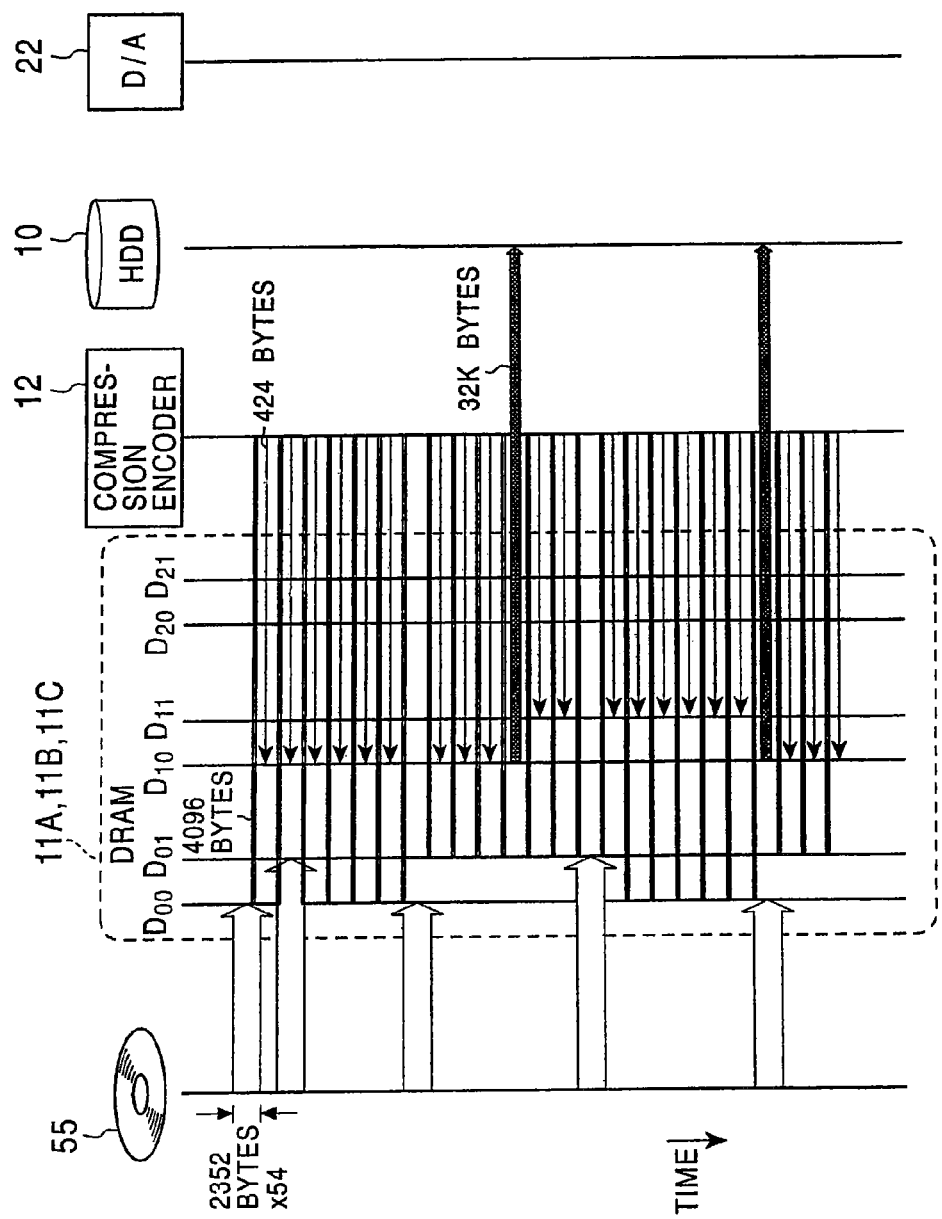
FIG. 40 is a chart showing, in more detail, one example of data flows in various components during the high-rate writing process for a CD in the embodiment, including bank switching in DRAMs.

FIG. 40 shows, in more detail, one example of data flows in various components during the high-rate writing process for the CD 55 in the embodiment, including bank switching in the DRAMs 11B and 11C. According to the CD-DA standards, PCM data is recorded on the CD 55 in record units each defined by one block of 2352 bytes. PCM data of 54 blocks, for example, is read out of the CD 55 by one read. In accordance with the above-described flowcharts of FIGS. 37 and 38, for each read from the CD 55, the PCM data read out of the CD 55 is alternately accumulated in the banks D00 and D01.

The PCM data accumulated, for example, in the bank D00 of the DRAM 11B up to the full capacity thereof is read out in units of amount corresponding to the data processing unit set for the compression encoder 12 and is supplied to the compression encoder 12. When the PCM data accumulated in the banks D00 is all read out, the bank of the DRAM 11B is switched over from the bank D00 to D01 so that the PCM data is continuously read out of the DRAM 11B.

The compression encoder 12 codes and compresses the PCM data that is supplied to it in data processing units, and outputs compressed audio data having been subjected to the compression-coding at a bit rate set for the compressed audio data. When the compression encoder 12 codes and compresses the PCM data by the ATRAC method, resulting ATRAC data is outputted in units of 424 bytes, for example. The compressed audio data outputted from the compression encoder 12 is accumulated in the bank D10 of the DRAM 11C.

When the compressed audio data is accumulated in the bank D10 up to the full capacity thereof which corresponds to the data processing unit set for the HDD 10, the bank of the DRAM 11C is switched over from the bank D10 to D11 so that the compressed audio data is continuously accumulated in the DRAM 11C. Then, the compressed audio data accumulated in the bank D10 is read out and written in the HDD 10.

Figure 41:
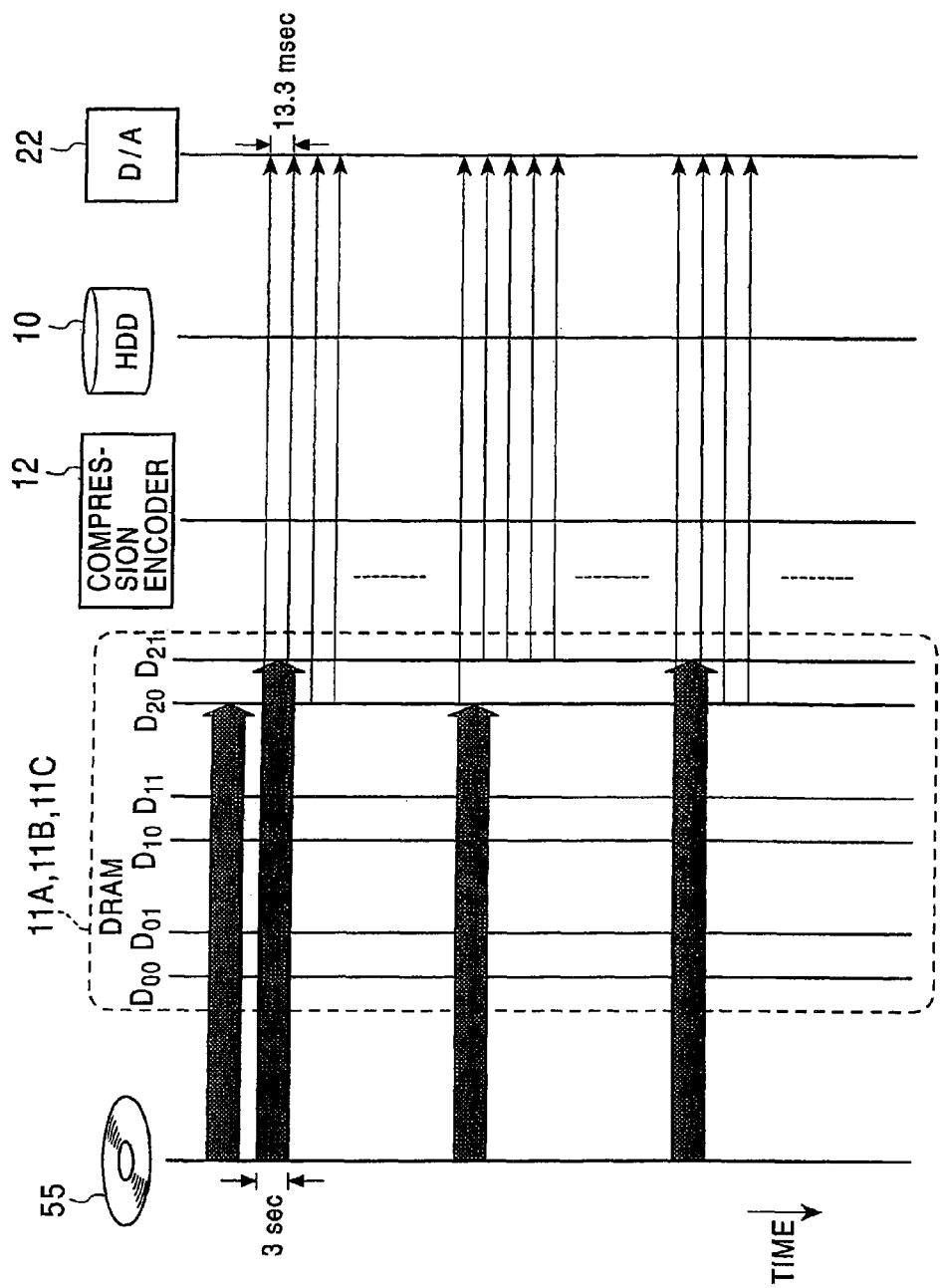
FIG. 41 is a chart showing, in more detail, one example of data flows in various components during the equi-rate playback of the CD in the embodiment, including bank switching in a DRAM.

FIG. 41 shows in more detail one example of data flows in various components during the equi-rate playback of the CD 55 in the embodiment, including bank switching in the DRAM 11A. PCM data corresponding to a playback time of 3 seconds, for example, is read out of the CD 55. The PCM data read out of the CD 55 is accumulated, for example, in the banks D20 of the DRAM 11A. When the predetermined amount of the PCM data is accumulated in the bank D20, the bank of the DRAM 11A, in which the PCM data is to be accumulated, is switched over from the bank D20 to D21 so that the PCM data corresponding to next 3 seconds is accumulated in the bank D21. Then, the PCM data is read out of the bank D20 for each block for recording in the CD 55, i.e., in units of 2352 bytes. The intervals of the reading of the PCM data out of the DRAM 11A is 13.3 msec. The read-out PCM data is supplied to the D/A converter 22.

Thus, the processing is controlled by alternately switching over two banks of each of the DRAMs 11A, 11B and 11C, and synchronizing the timings of switching over the banks among the DRAMs 11A, 11B and 11C. The synchronous control is performed, as described above, through flag control with one flag allocated to each task. As a result, the reading of data out of the CD 55 for the high-rate encoding, see FIG. 40, and the reading of data out of the CD 55 for the ordinary playback, see FIG. 41, for example, can be controlled in a manner out of interference with each other.

Figure 42:
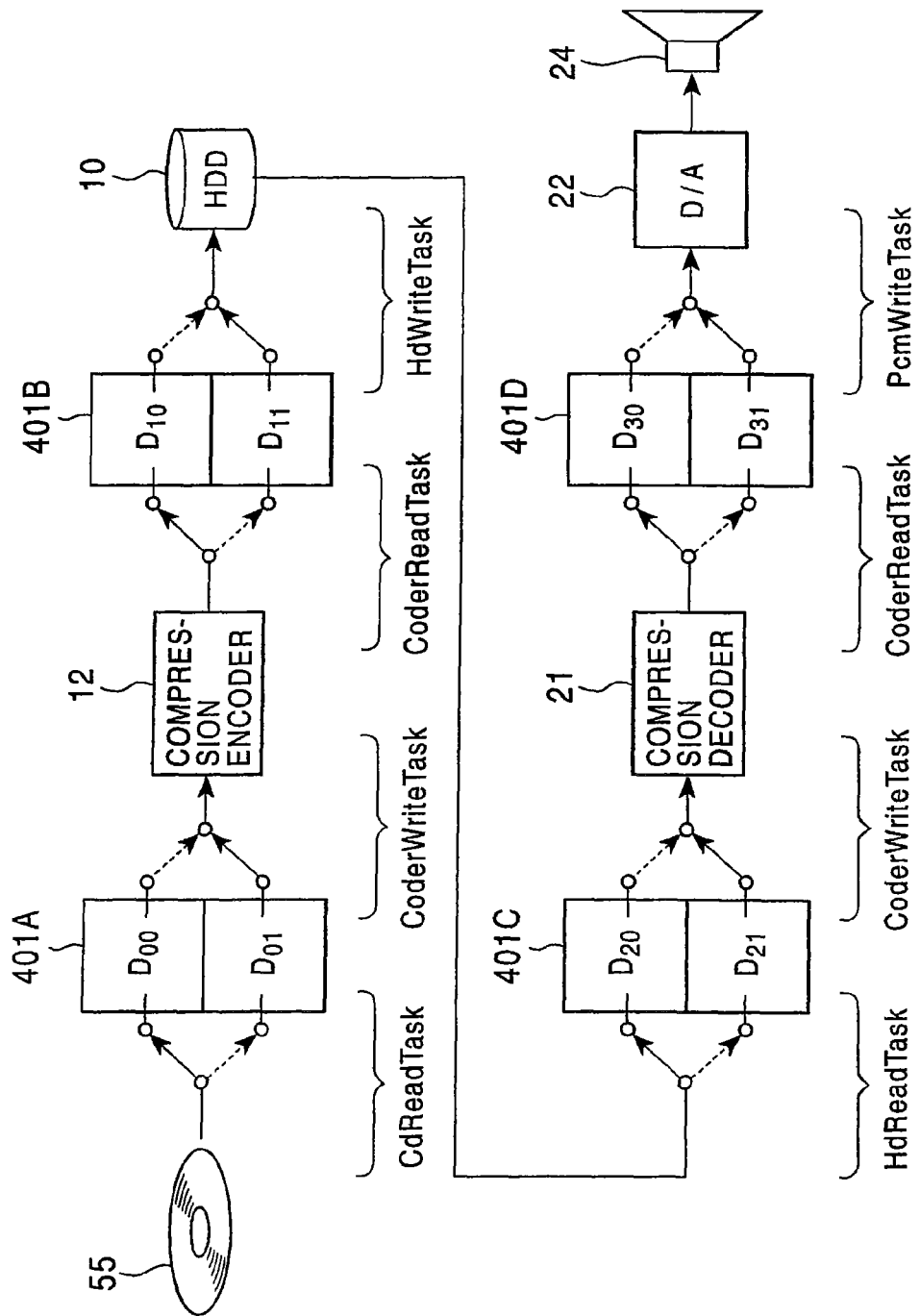
FIG. 42 is a functional block diagram representing the case where the tasks are allocated to respective components of the music server according to the first modification of the embodiment.

FIG. 42 is a functional block diagram representing the case where the tasks shown in FIG. 34 are allocated to respective components of the music server according to the first modification of the embodiment described above with reference to FIG. 27. Note that, in FIG. 42, components in common with those in FIG. 27 are denoted by the same numerals and a detailed description thereof is omitted here.

In this example, as with the above, the DRAMs 401A, 401B and 401C in FIG. 27 are each made up of two banks, that is, banks D00 and D01, banks D10 and D11, and banks D20 and D21. Additionally, the DRAM 401D in FIG. 27 is also made up of two banks, that is, banks D30 and D31.

Further, in the example of FIG. 42, the processing by the compression decoder 21 is added to the example of FIG. 35, and therefore a task HdReadTask and another task CoderWriteTask are added correspondingly. These tasks HdReadTask and CoderWriteTask are created in response to a startup request from the above-described task StorageTask. The priority orders of the task HdReadTask and the task CoderWriteTask are assigned to 50 and 60, respectively.

The timing of reading the compressed audio data out of the HDD 10, the timing of writing the compressed audio data in the DRAM 401C, the timing of reading the compressed audio data out of the DRAM 401C, and the timing of writing the compressed audio data in the compression decoder 21 are controlled by those tasks HdReadTask and CoderWriteTask in synch with the other tasks similarly to the above-described example of FIG. 35.

Figure 43:
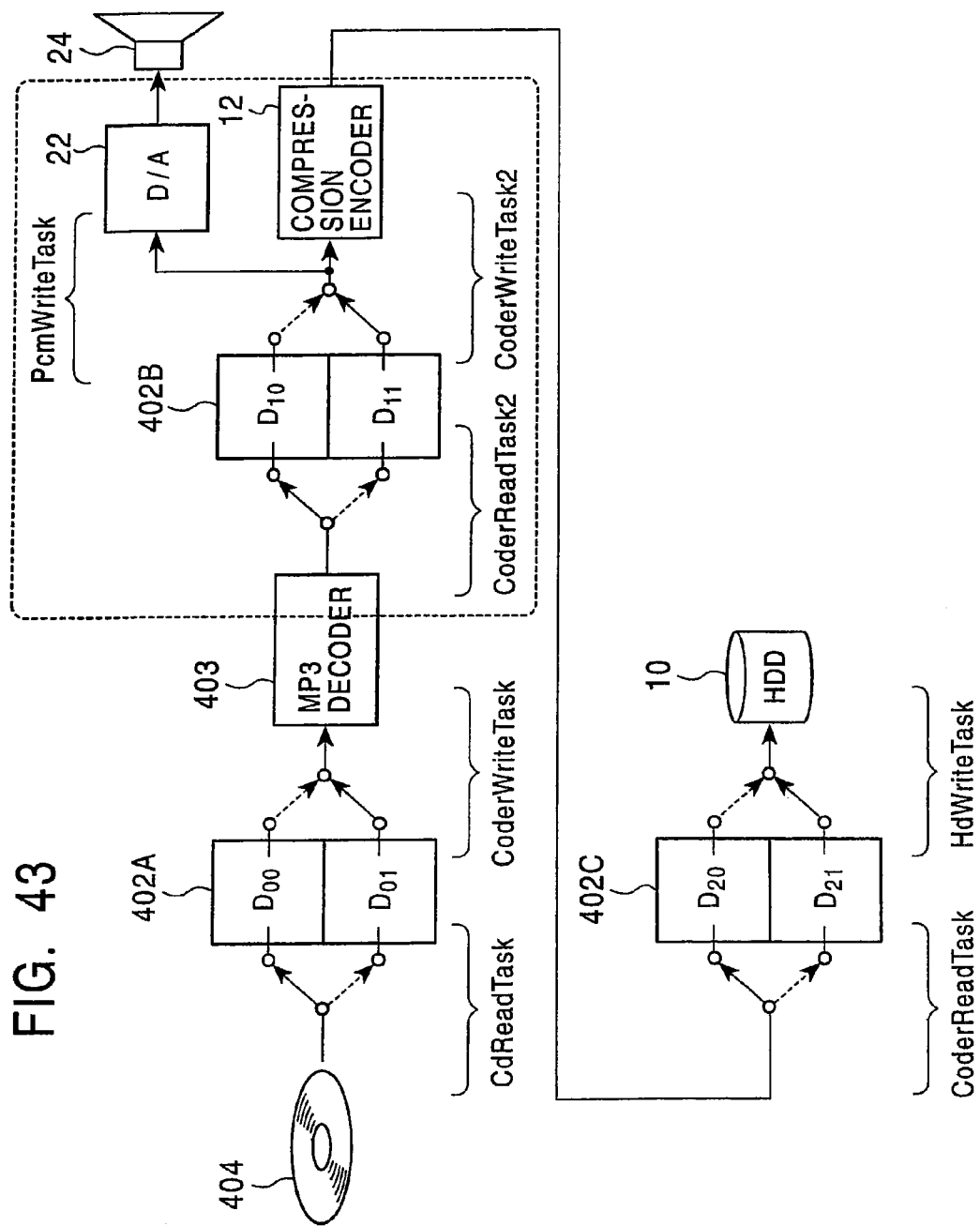
FIG. 43 is a functional block diagram representing the case where the tasks are allocated to respective components of the music server according to the second modification of the embodiment.

FIG. 43 is a functional block diagram representing the case where the tasks shown in FIG. 35 are allocated to respective components of the music server according to the second modification of the embodiment described above with reference to FIG. 28. Note that, in FIG. 43, components in common with those in FIG. 28 are denoted by the same numerals and a detailed description thereof is omitted here. Also, in FIG. 43, the DRAMs 402A, 402B and 402C in FIG. 28 are shown as clearly indicating that each DRAM is made up of two banks, that is, banks D00 and D01, banks D10 and D11, and banks D20 and D21.

In the example of FIG. 43, the PCM data read out of the DRAM 402B is supplied to both the D/A converter 22 and the ATRAC encoder 12. To this end, two tasks CoderWriteTask2 and PcmWriteTask must be executed in parallel on the output side of the DRAM 402B.

Further, in the example of FIG. 43, the processing by the compression decoder (MP3 decoder 403) is added to the example of FIG. 35, and therefore a task CoderReadTask2 and a task CoderWriteTask2 are added correspondingly.

Figure 44:
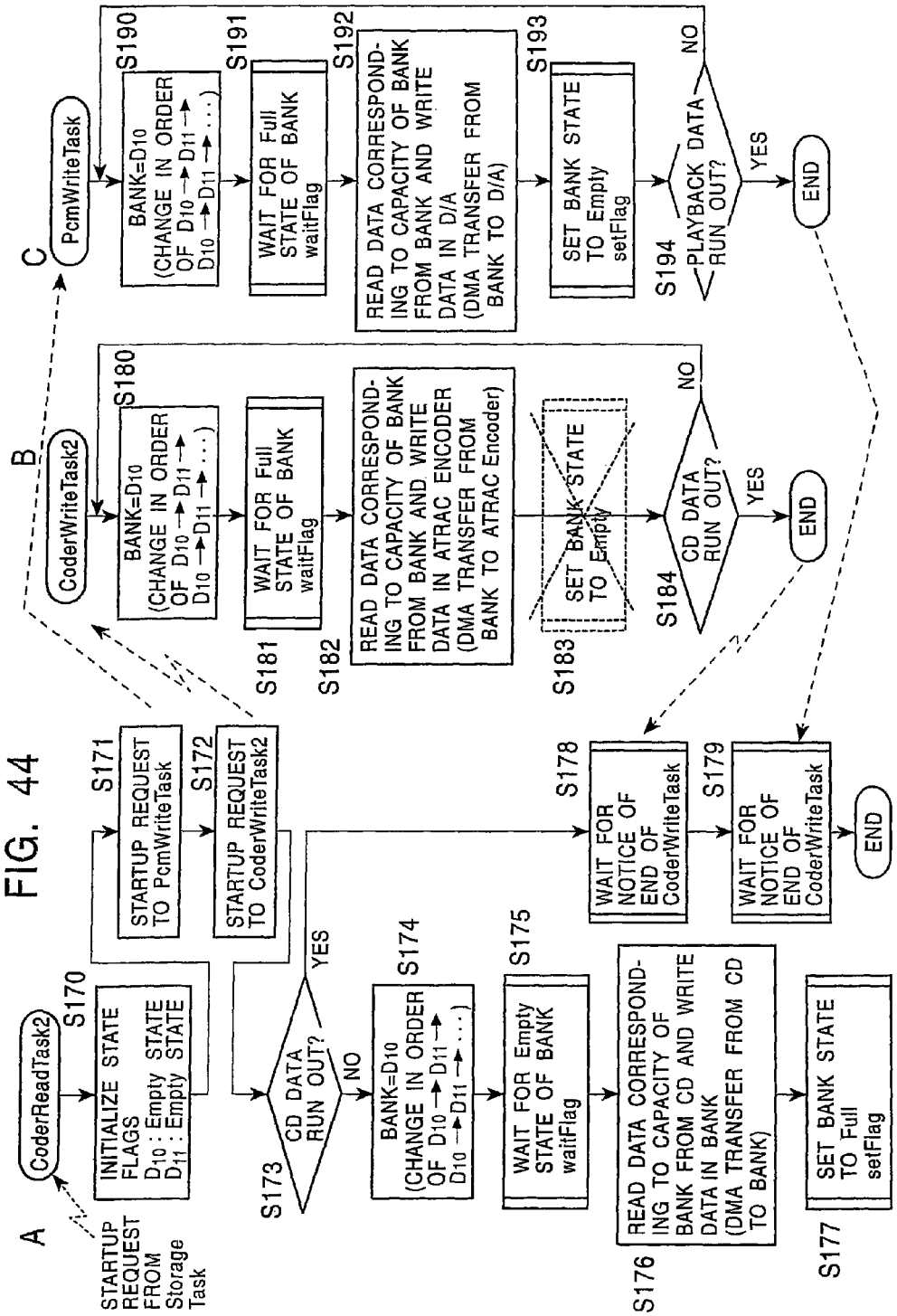
FIG. 44 includes flowcharts A, B, and C showing one example of processing executed by a task CoderReadTask2 on the input side of the DRAM, and a task CoderWriteTask2 and the task PcmWriteTask both on the output side of the DRAM.

A, B, and C of FIG. 44 are flowcharts showing one example of the processing executed by a dotted area in FIG. 43, that is, by the task CoderReadTask2 on the input side of the DRAM 402B, and the task CoderWriteTask2 and the task PcmWriteTask both on the output side of the DRAM 402B. A shows the processing executed by the task CoderReadTask2, B shows the processing executed by the task CoderWriteTask2, and C shows the processing executed by the task PcmWriteTask, respectively. Note that, in A, B, and C of FIG. 44 steps S175, S177, S178, S179, S181, S191 and S192 represent the processing executed by the real time OS.

In A of FIG. 44, when the task CoderReadTask2 receives a startup request from the task StorageTask, the status flag indicating the state of the DRAM 402B is initialized in step S170 such that one bank D10 and the other bank D11 of the DRAM 402B are each set to the Empty state indicating the relevant bank being empty.

After the status flags of the banks of the DRAM 402B have been initialized, a startup request is issued from the task CoderReadTask2 to the task CoderWriteTask2 in step S171. In response to the startup request, the processing shown in the flowchart of FIG. 44C is started. Further, a startup request is issued from the task CoderReadTask2 to the task PcmWriteTask in step S172. In response to the startup request, the processing shown in flowchart B is started. The flowcharts B and C will be described later.

Then, in A of FIG. 44, it is determined in the next step S173 whether the PCM data has been completely read out of the CD 55. If the reading of the PCM data is completed, the process flow goes to step S178 where the CPU waits for a notice of end from the task CoderWriteTask. Then, in next step S179, the CPU further waits for a notice of end from the task PcmWriteTask. Whether the PCM data has been completely read out of the CD 55 is determined, for example, by the CPU 8 monitoring the operation of the CD 55. A determination result is noticed to the real time OS.

On the other hand, if it is determined in step S173 that the PCM data has not been completely read out of the CD 55, the process flow goes to step S174 where the bank of the DRAM 402B is set to the bank D10. With the bank setting in step S174, the two banks are alternately switched over such that the selected bank is changed in the order of bank D10, bank D11, bank D10, . . . whenever the processing started from step S173 is looped. The PCM data read out of the CD 55 through the task CoderReadTask2 is accumulated in the bank of the DRAM 402B set in step S174.

In next step S175, the command waitFlag is issued by the task CoderReadTask2, and the real time OS waits for until the bank (assumed to be D10) of the DRAM 402B set in step S174 comes to the Empty state. If the bank D10 comes to the Empty state, the process flow goes to step S176.

In step S176, the PCM data is read out of the CD 55 in amount corresponding to the capacity of the bank (bank D10) of the DRAM 402B set in step S174. The read-out PCM data is DMA-transferred to the bank D10 of the DRAM 402B and written in the bank D10.

When the predetermined amount of the PCM data is written in the bank D10, the task CoderReadTask2 issues the command setFlag in next step S177, whereby the status flag of the bank D10 is set to Full. After the completion of the flag setting, the process flow returns to step S173.

On the other hand, the processing shown in flowchart B is started following the processing in above-described step S172. More specifically, when the startup request is issued in step S171 to the task CoderReadTask2, the bank of the DRAM 402B is set to the bank D10 in step 180. With the bank setting in step S180, the two banks are alternately switched over such that the selected bank is changed in the order of bank D10, bank D11, bank D10, . . . whenever the processing is looped from step S184 described later.

In the next step S181, the command waitFlag is issued by the task CoderReadTask2, and the real time OS waits for until the bank (assumed to be D10) of the DRAM 402B set in step S180 comes to the Full state. Stated otherwise, in step S181, the CPU waits for the end of the processing of step S177. If the bank D10 comes to the Full state, the process flow goes to step S182.

In step S182, the PCM data is read out of the bank (bank D10) of the DRAM 402B set in step S180 in amount corresponding to the capacity of the bank D10. The read-out PCM data is DMA-transferred to the compression encoder 12 and written in, for example, a processing memory for the compression encoder 12.

In the above-described flowchart B of FIG. 37, after the PCM data has been written in the compression encoder in step S122 corresponding to step S182 shown in the flowchart B of FIG. 44, the relevant bank is set to the Empty state by the command setFlag in next step S23. By contrast, in the flowchart B of FIG. 44, after the PCM data has been written in the ATRAC encoder 12 in step S182, the processing of step S183 corresponding to above-described step S123 is not executed. In other words, the relevant bank is not set to the Empty state.

Accordingly, after the PCM data has been written in the ATRAC encoder 12 in step S182, the process flow goes to step S184, as a next step, where it is determined whether the PCM data has been completely read out of the CD 55. If it is determined that the PCM data has not been completely read out of the CD 55, the process flow returns to step S180.

On the other hand, if it is determined in step S184 that the PCM data has been completely read out of the CD 55, a notice of end is passed from the task CoderWriteTask2 to the task CoderReadTask2, whereby a sequence of the processing shown at B in FIG. 44 is ended. Then, the notice of end from the task CoderWriteTask2 is received by the task CoderReadTask2 in above step S178, and the process flow of A in FIG. 44 goes to step S179.

Further, the processing shown in the flowchart C of FIG. 44 is started following the processing in above-described step S171. More specifically, when the startup request is issued in step S171 to the task PcmWriteTask, the bank of the DRAM 402B is set to the bank D10 in step S190. With the bank setting in step S190, the two banks are alternately switched over such that the selected bank is changed in the order of bank D10, bank D11, bank D10, . . . whenever the processing is looped from step S194 described later.

In next step S191, the command waitFlag is issued by the task PcmWriteTask, and the real time OS waits for until the bank (assumed to be D10) of the DRAM 402B set in step S190 comes to the Full state. Stated otherwise, in step S191, the CPU waits for the end of the processing of step S177. If the bank D10 comes to the Full state, the process flow goes to step S192.

In step S192, the PCM data is read out of the bank (bank D10) of the DRAM 402B set in step S190 in amount corresponding to the capacity of the bank D10. The read-out PCM data is DMA-transferred to the D/A converter 22 and written in, for example, a processing memory for the D/A converter 22.

If the predetermined amount of the PCM data is read out of the bank D10 of the DRAM 402B in step S192, the process flow goes to next step S193. In step S193, the command setFlag is issued by the task PcmWriteTask and the status flag of the bank D10 is set to the Empty state.

After the end of the flag setting, the process flow goes to step S194 where it is determined whether the playback of the CD 55 is completed. If it is determined that the playback of the CD 55 is not completed, the process flow returns to step S190.

On the other hand, if it is determined in step S194 that the playback of the CD 55 is completed, a notice of end is passed from the task PcmWriteTask to the task CdReadTask2, whereby a sequence of the processing shown at C in FIG. 44 is ended. Then, if the notice of end from the task PcmWriteTask is received by the task CoderReadTask2 in above step S179, a sequence of the processing shown in FIG. 44 is ended.

The third and fourth modifications of the embodiment, described above with reference to FIGS. 29 and 30, can also be controlled through processing basically similar to that employed in the embodiment and the first and second modifications of the embodiment, and hence a detailed description thereof is omitted here.

FIG. 45 is a functional block diagram representing the case where the tasks shown in FIG. 35 are allocated to respective components of the music server according to the fifth modification of the embodiment described above with reference to FIG. 31. Note that, in FIG. 45, components in common with those in FIG. 31 are denoted by the same numerals and a detailed description thereof is omitted here. Also, in FIG. 45, the DRAMs 421A, 421B and 421C in FIG. 31 are shown as clearly indicating that each DRAM is made up of two banks, i.e., banks D00 and D01, banks D10 and D11, and banks D20 and D21.

In the fifth modification, signal paths are arranged such that plural types of processing can be selectively performed, and the DRAMs 421A, 421B and 421C can effect plural types of functions in parallel. Accordingly, a task is also selectively started up from among a plurality of tasks in accordance with the control timing. For example, on the input side of the DRAM 421B, one of the task CoderWriteTask and the task CoderWriteTask2 is selectively started up. Also, on the output side of the DRAM 421B, one of the task HdWriteTask and the task PcmWriteTask is selectively started up. The necessary task is selectively started up by the task StorageTask case by case under control of the real time OS.

According to the present invention, as described above, the user can listen to sounds reproduced from a CD while audio data recorded on the CD is written in an HDD at a high data rate. Therefore, the user can utilize time efficiently.

Also, according to the present invention, the contents of a CD, from which audio data is written in an HDD, can be confirmed during the writing, thus keeping the user free from worry.

What is claimed is:
1. A portable apparatus, comprising:
   circuitry configured to receive processed data from an external apparatus and control storage of the processed data,
   wherein the external apparatus includes circuitry configured to:
   process inputted data, transmit the processed data to the circuitry of the portable apparatus,
receive data from said circuitry of the portable apparatus,
decompress the data received from the circuitry of the portable apparatus,
reproduce the decompressed data,
determine whether the circuitry of the portable apparatus has storage space available for the processed data;
control the circuitry of the portable apparatus to begin storage of the processed data during reproduction of the decompressed data by the external apparatus after the storage space for the processed data is determined to be available,
wherein the decompressed data and the processed data are different.

2. The portable apparatus according to claim 1, wherein the circuitry of the external apparatus is further configured to compress inputted data and produce compressed data.

3. The portable apparatus according to claim 1, wherein the circuitry of the external apparatus is further configured to convert a format of the inputted data.

4. The portable apparatus according to claim 3, wherein the inputted data of a first format is converted to a second format by the circuitry of the external apparatus.

5. The portable apparatus according to claim 1, wherein the circuitry of the external apparatus is further configured to read-out data stored in a storage medium, and to process said read-out data as the inputted data.

6. The portable apparatus according to claim 1, wherein the circuitry of the external apparatus compresses the inputted data into Moving Pictures Experts Group (MPEG) format as the processed data.

7. The portable apparatus according to claim 1, wherein the portable apparatus further includes a semiconductor memory configured to store the processed data.

8. The portable apparatus according to claim 7, further comprising:
a touch panel or a dial configured to receive a user input, and a headphone jack, and
the circuitry of the portable apparatus reproduces one of a plurality of processed data stored in the semiconductor memory based on the user input via the touch panel or the dial and outputs the reproduced data to the headphone jack.

9. The portable apparatus according to claim 7, further comprising:
a battery configured to be charged by the external apparatus when the portable apparatus receives the processed data from the external apparatus.

10. The portable apparatus according to claim 9, wherein the circuitry of the external apparatus controls a display to display icons of a plurality of the processed data of the external apparatus and transmits the processed data to the portable apparatus when one of the icons is selected by a drag and drop operation.

11. A method comprising:
receiving, by circuitry of a portable apparatus, processed data from an external apparatus;
determining, by the circuitry of the portable apparatus, whether the portable apparatus has space available to store the processed data;
controlling, by the circuitry of the portable apparatus, a start of storage of the processed data after storage space for the processed data is determined to be available;
processing, by circuitry of an external apparatus, inputted data;
transmitting, by the circuitry of the external apparatus, the processed data to the portable apparatus;
receiving, by the circuitry of the external apparatus, data from the portable apparatus;
decompressing, by the circuitry of the external apparatus, the data received from the portable apparatus; and
reproducing, by the circuitry of the external apparatus, the decompressed data,
wherein the decompressed data and the processed data are different.

12. A non-transitory computer-readable medium encoded with computer-readable instructions thereon that, when executed by circuitry, causes the circuitry to perform a method comprising:
receiving, at a portable apparatus, processed data from an external apparatus;
determining, at the external apparatus, whether the portable apparatus has space available to store the processed data;
controlling, at the portable apparatus, a start of storage of the processed data after storage space for the processed data is determined to be available;
processing, at the external apparatus, inputted data;
transmitting the processed data from the external apparatus to the portable apparatus;
receiving, at the external apparatus, data from the portable apparatus;
decompressing, at the external apparatus, the data received from the portable apparatus; and
reproducing, at the external apparatus, the decompressed data,
wherein the decompressed data and the processed data are different.

* * * * *